United States Patent
Masumura et al.

(10) Patent No.: US 10,506,212 B2
(45) Date of Patent: Dec. 10, 2019

(54) STEREOSCOPIC DISPLAY APPARATUS

(71) Applicant: Tianma Japan, Ltd., Kanagawa (JP)

(72) Inventors: Kazunori Masumura, Kanagawa (JP); Tetsushi Sato, Kanagawa (JP); Koji Shigemura, Kanagawa (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 16/243,590

(22) Filed: Jan. 9, 2019

(65) Prior Publication Data

US 2019/0149800 A1    May 16, 2019

Related U.S. Application Data

(62) Division of application No. 15/656,409, filed on Jul. 21, 2017, now Pat. No. 10,225,541.

(30) Foreign Application Priority Data

Jul. 21, 2016 (JP) .................................. 2016-143729
Apr. 28, 2017 (JP) .................................. 2017-090593

(51) Int. Cl.
*H04N 13/128* (2018.01)
*G02B 27/22* (2018.01)
*H04N 13/305* (2018.01)
*H04N 13/327* (2018.01)
*H04N 13/398* (2018.01)
*H04N 13/363* (2018.01)
*H04N 13/366* (2018.01)
*H04N 13/31* (2018.01)

(52) U.S. Cl.
CPC ....... *H04N 13/128* (2018.05); *G02B 27/2214* (2013.01); *H04N 13/305* (2018.05); *H04N 13/327* (2018.05); *H04N 13/363* (2018.05); *H04N 13/366* (2018.05); *H04N 13/398* (2018.05); *H04N 13/31* (2018.05)

(58) Field of Classification Search
CPC ..................................................... H04N 13/128
USPC ............................................................ 348/51
See application file for complete search history.

(56) References Cited

U.S. PATENT DOCUMENTS

2004/0239899 A1* 12/2004 Akiyama ............. G03B 21/145
                                                          353/122
2005/0280784 A1* 12/2005 Katase .................. G03B 21/10
                                                          353/94

FOREIGN PATENT DOCUMENTS

JP          2013-080227         5/2013

OTHER PUBLICATIONS

U.S. Appl. No. 15/656,409, filed Jul. 21, 2017.

* cited by examiner

*Primary Examiner* — Yulin Sun
(74) *Attorney, Agent, or Firm* — Young & Thompson

(57) ABSTRACT

A stereoscopic display apparatus includes: a projector of a planar shape that projects images by using light acquired by dividing light rays; an optical device of a planar shape that outputs incident light incident from a first face from a second face; and a supporting unit that supports at least one of the projector and the optical device to be in a first state or a second state in an orthogonal three-dimensional coordinate system. The optical device outputs incident light incident from a first point on a projection surface of the projector to a second point having plane symmetry with respect to a plane of the optical device as a reference.

4 Claims, 80 Drawing Sheets

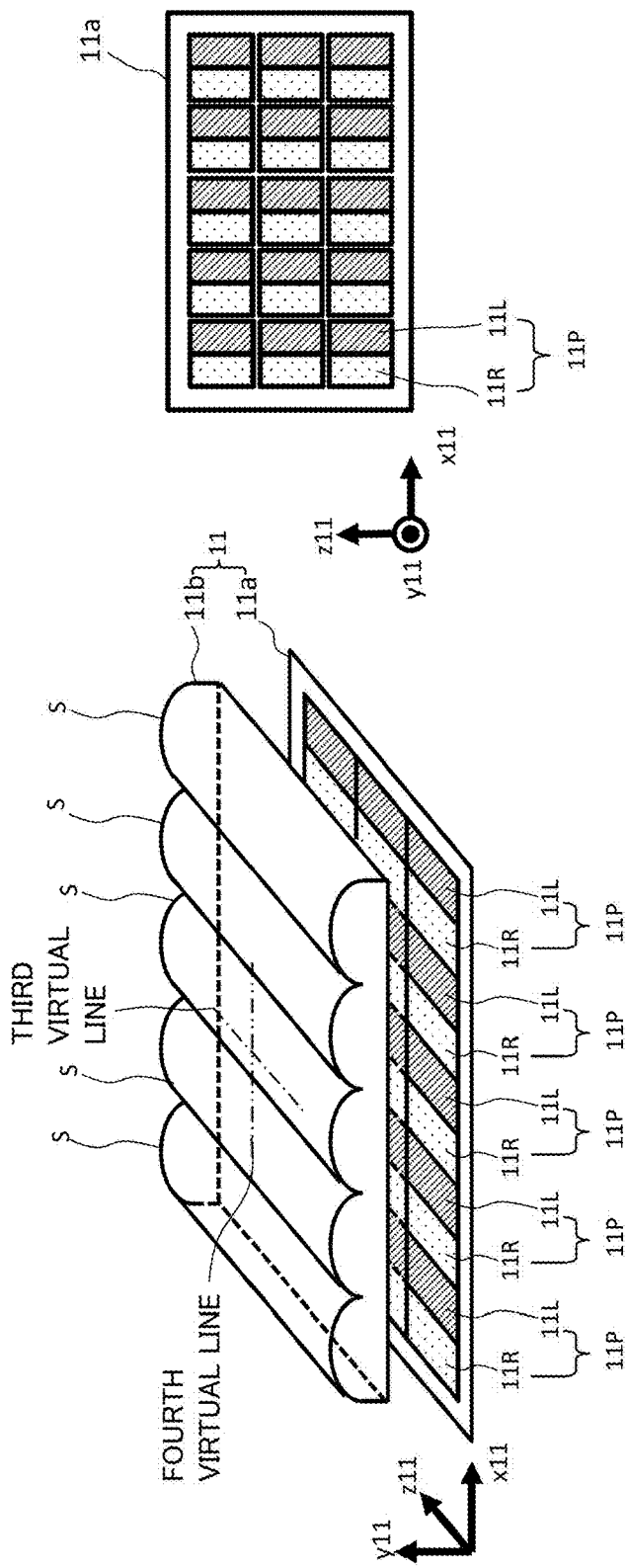

FIG. 3A
FIG. 3B
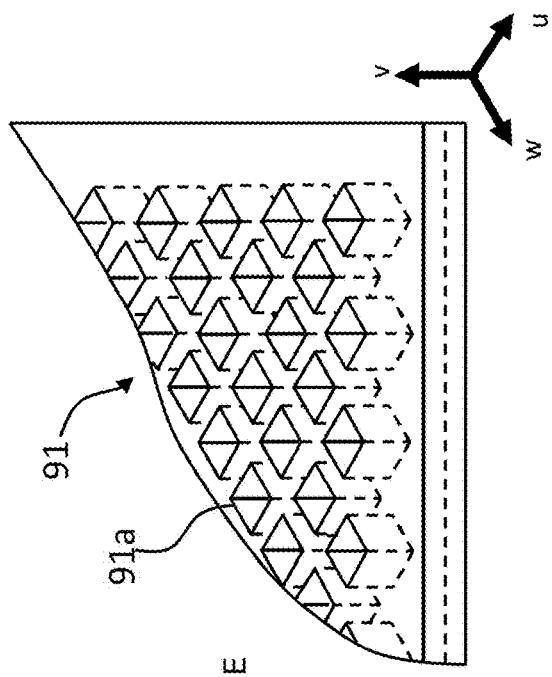
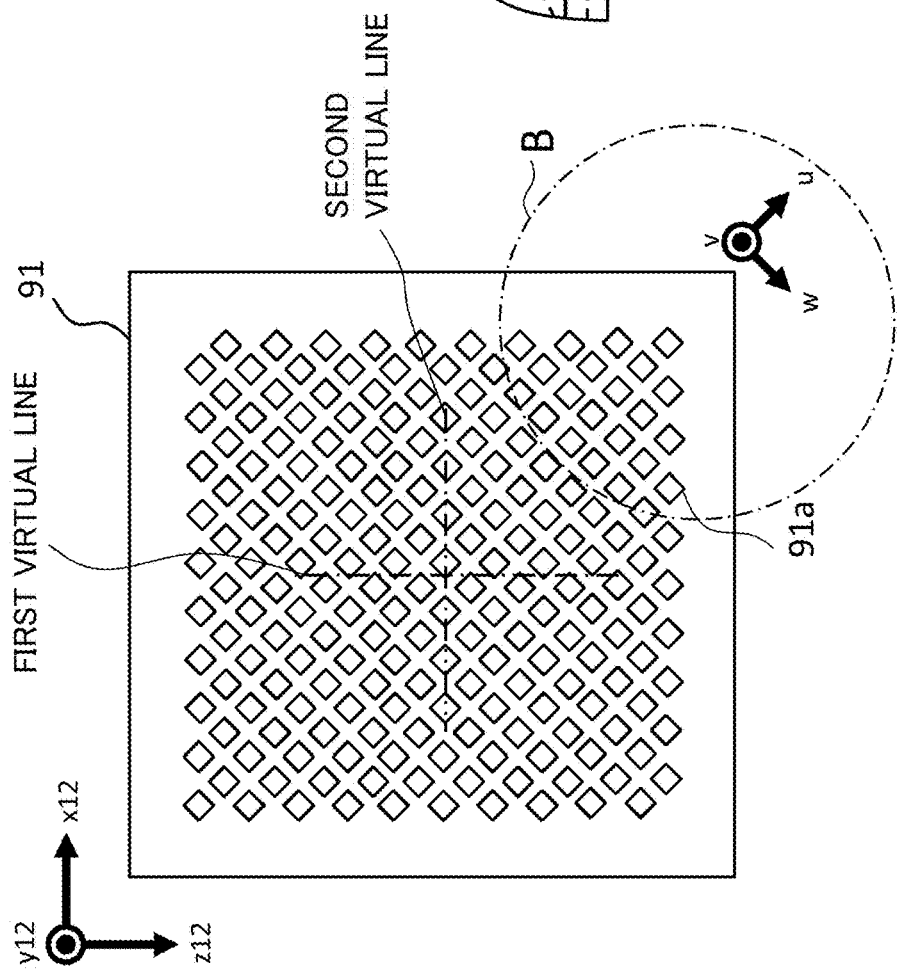

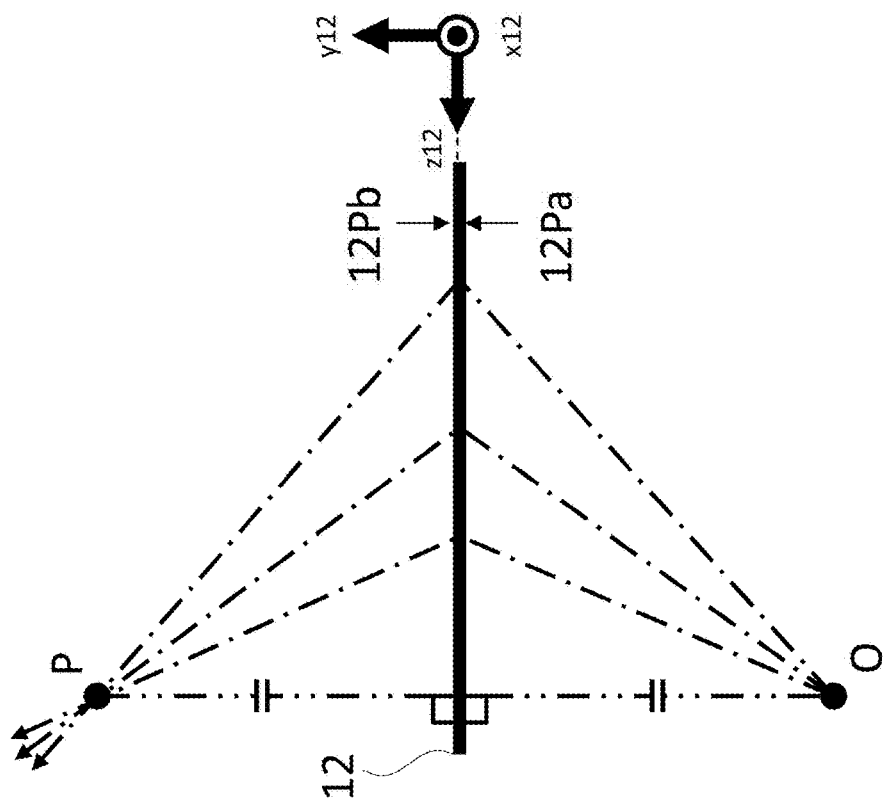
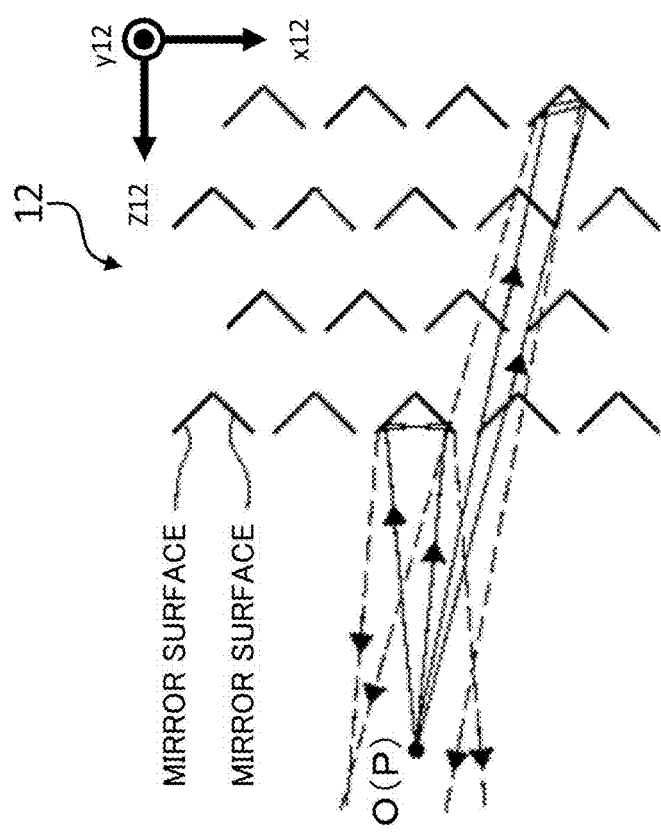
FIG. 5A
FIG. 5B

F I G. 7
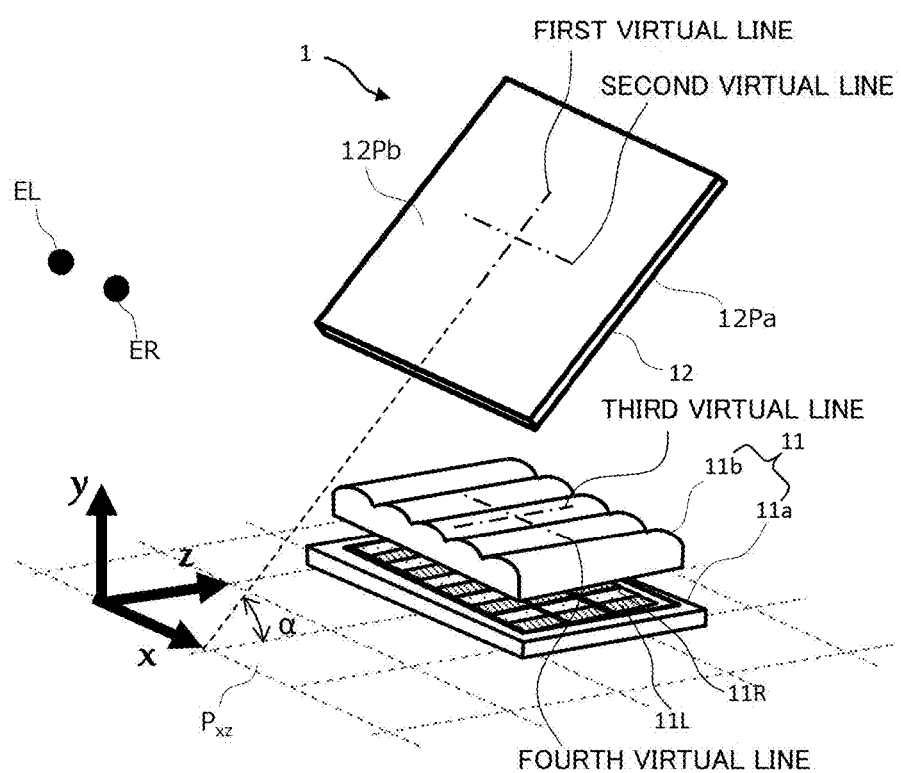

F I G. 8
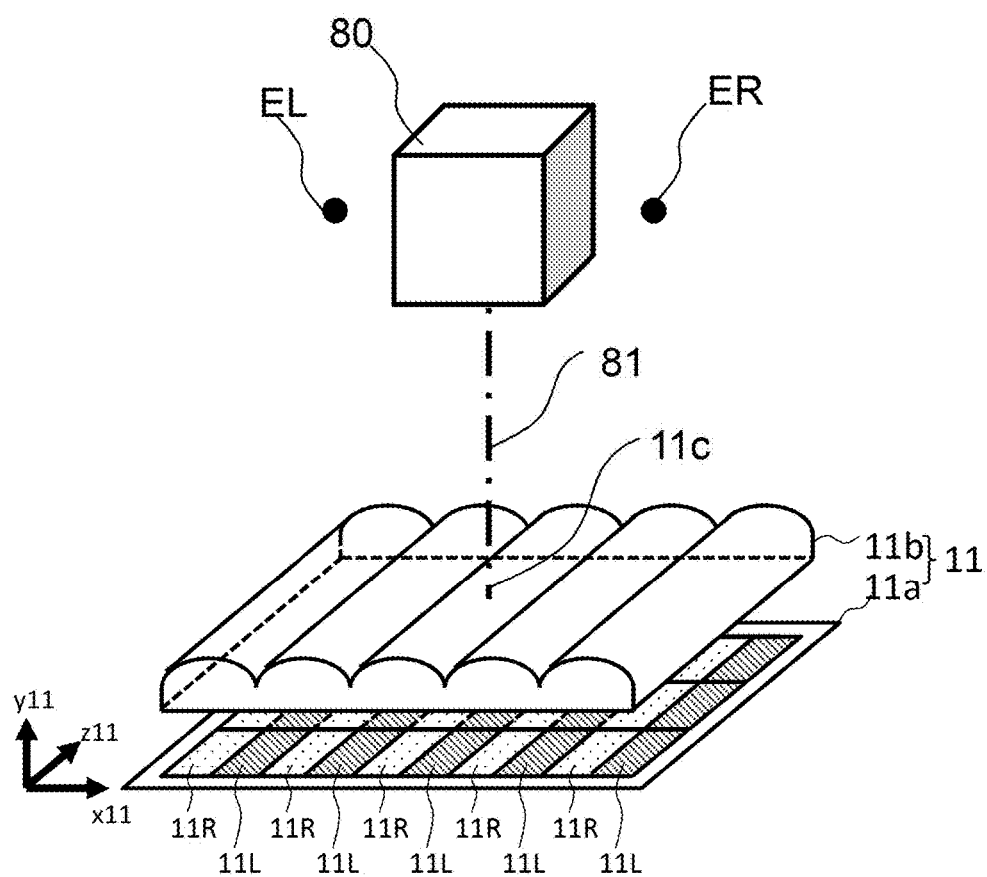

FIG. 14
| DISTANCE D | <CAPTURED IMAGES> | = | IMAGES FORMED BY PRIMARY LIGHT | + | IMAGES FORMED BY HIGH-ORDER LIGHT |
|---|---|---|---|---|---|
| OPTIMAL VISUAL RECOGNITION DISTANCE: Dop (EX. 600mm) | 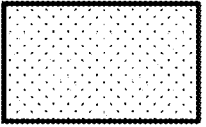 | = | 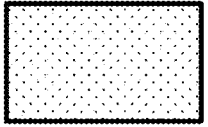 | + |  |
| 0.5 × Dop (EX. 300mm) | 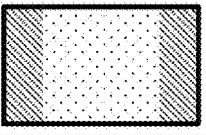 | = | 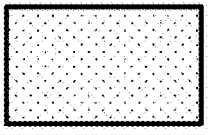 | + |  |
| 0.33 × Dop (EX. 200mm) | 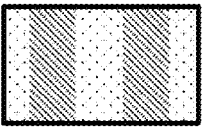 | = | 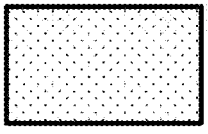 | + |  |
| 0.28 × Dop (EX. 170mm) | 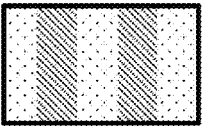 | = | 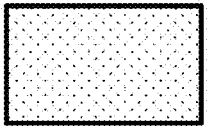 | + |  |
| 0.23 × Dop (EX. 140mm) |  | = | 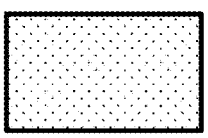 | + | 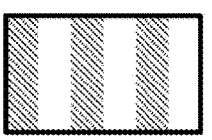 |

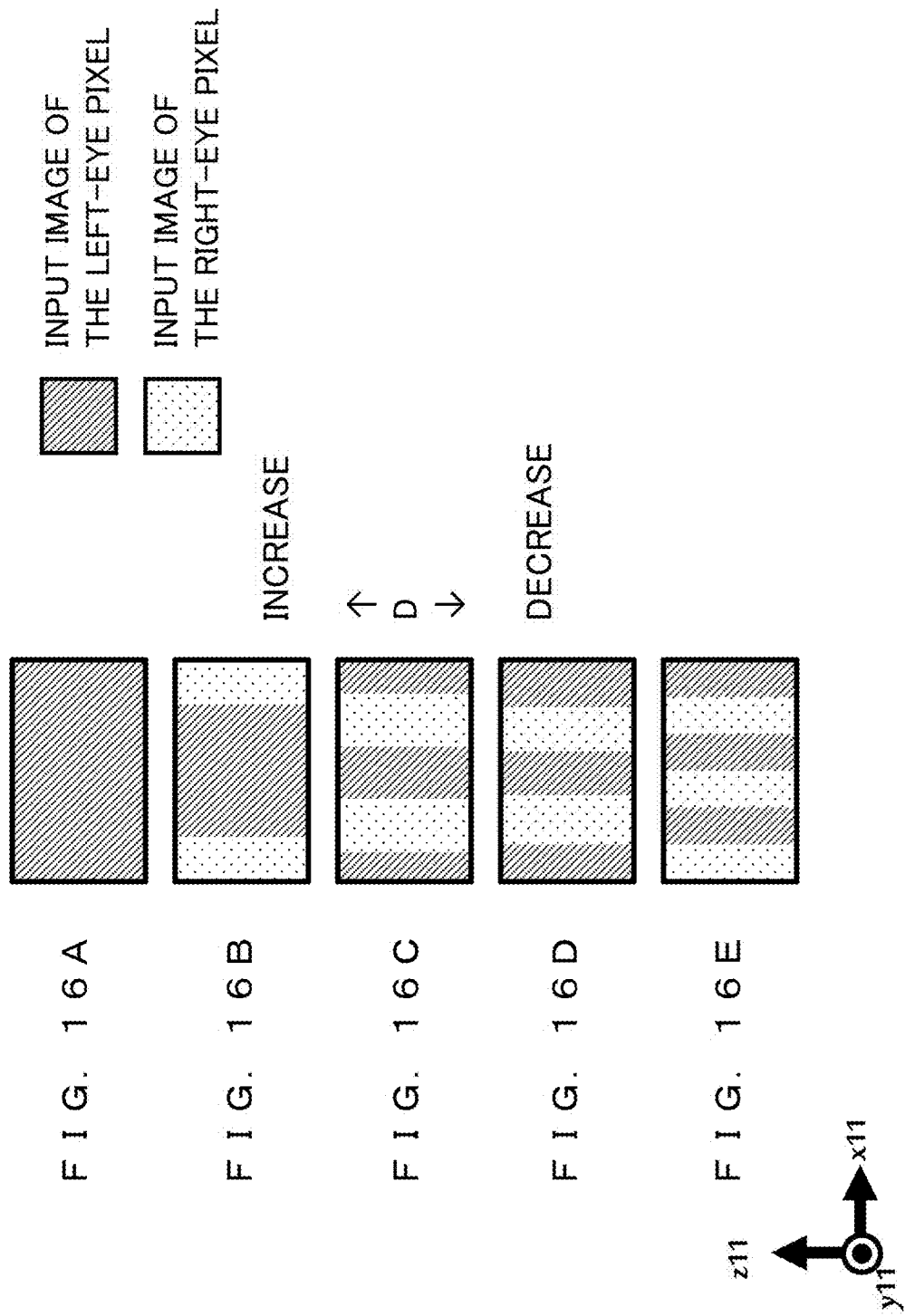

F I G. 1 7

| DISTANCE D | <CAPTURED IMAGES> | = | IMAGES FORMED BY PRIMARY LIGHT | + | IMAGES FORMED BY HIGH-ORDER LIGHT |
|---|---|---|---|---|---|
| OPTIMAL VISUAL RECOGNITION DISTANCE: Dop (EX. 600mm) | | = | | + | |
| 0.5 × Dop (EX. 300mm) | | = | | + | |
| 0.33 × Dop (EX. 200mm) | | = | | + | |
| 0.28 × Dop (EX. 170mm) | | = | | + | |
| 0.23 × Dop (EX. 140mm) | | = | | + | |

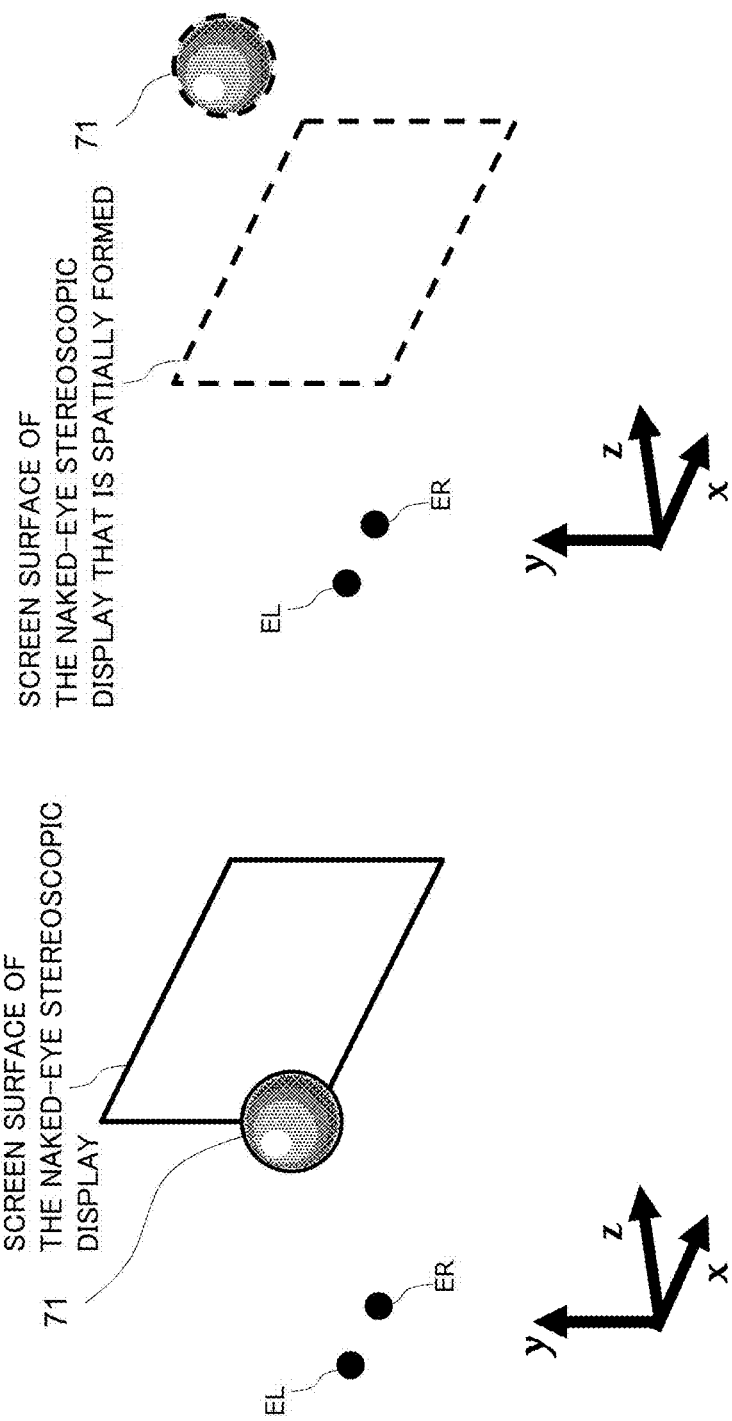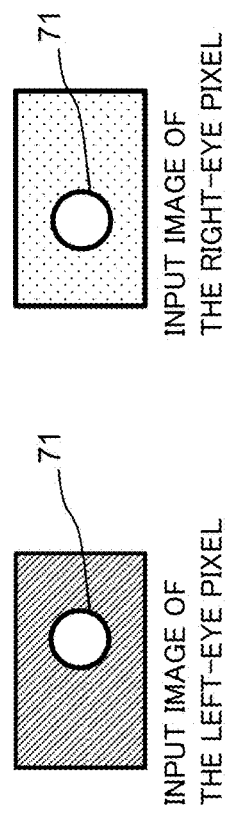

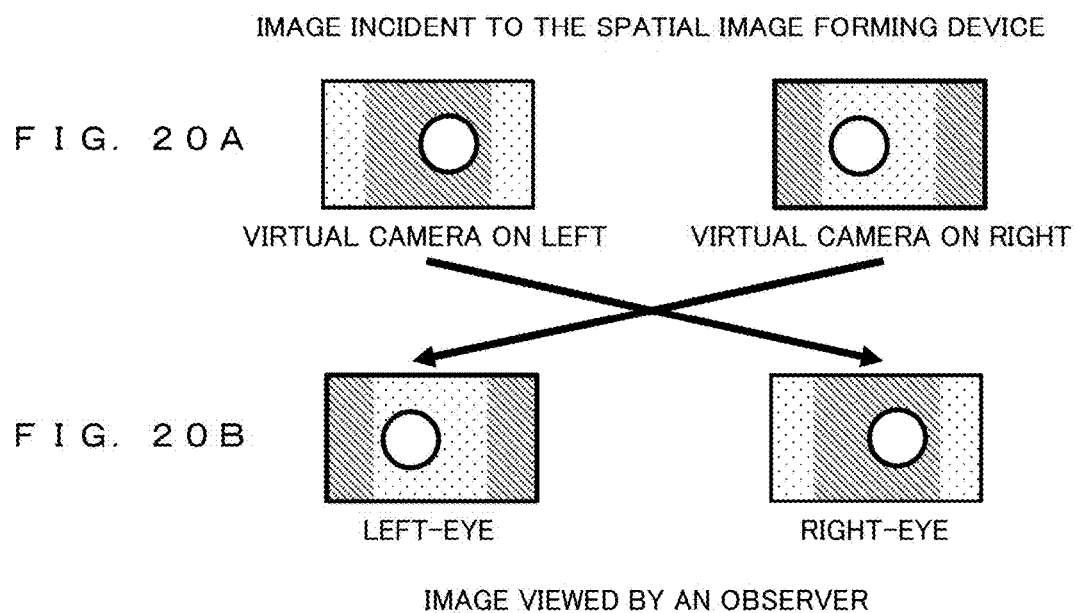

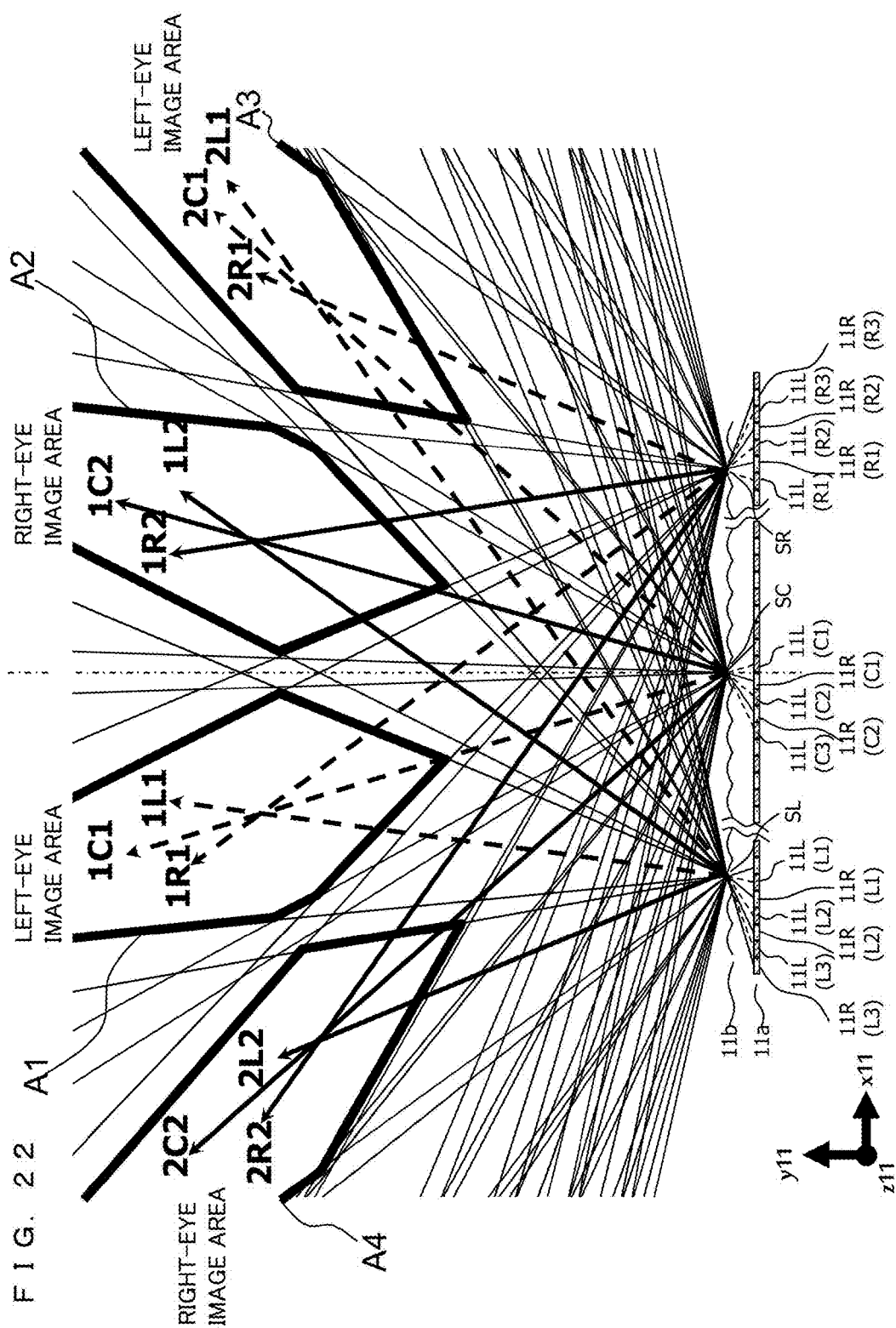

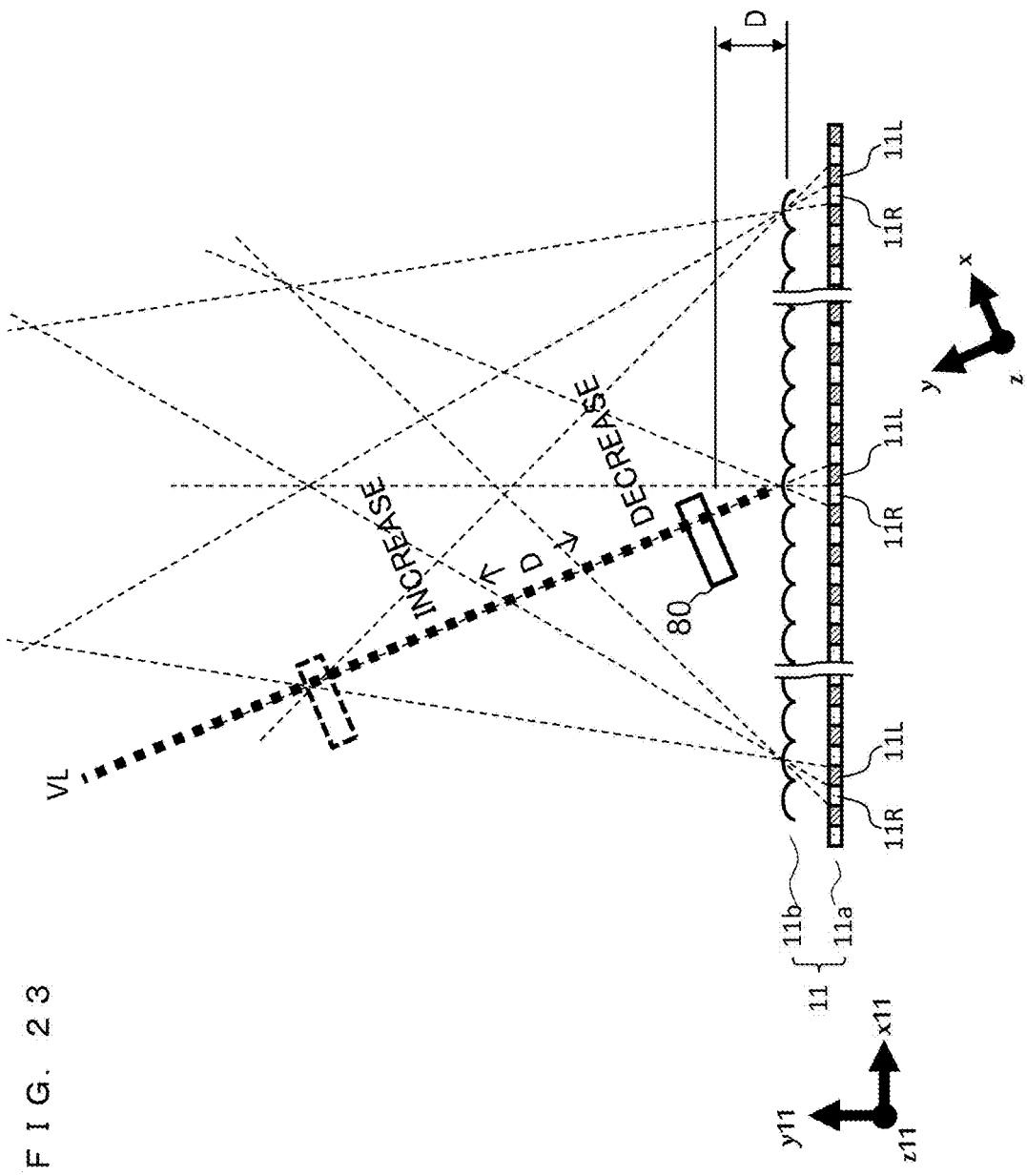

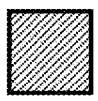 INPUT IMAGE OF THE LEFT-EYE PIXEL
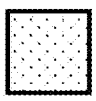 INPUT IMAGE OF THE RIGHT-EYE PIXEL
INCREASE ← D → DECREASE

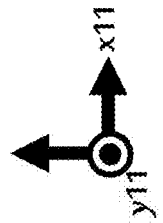

F I G. 25

| DISTANCE D | <CAPTURED IMAGES> | = | IMAGES FORMED BY SECONDARY LIGHT | + | IMAGES FORMED BY HIGH-ORDER LIGHT |
|---|---|---|---|---|---|
| OPTIMAL VISUAL RECOGNITION DISTANCE: Dop (EX. 600mm) | | = | | + | |
| 0.5 × Dop (EX. 300mm) | | = | | + | |
| 0.33 × Dop (EX. 200mm) | | = | | + | |
| 0.28 × Dop (EX. 170mm) | | = | | + | |
| 0.23 × Dop (EX. 140mm) | | = | | + | |

FIG. 28

| DISTANCE D | ⟨CAPTURED IMAGES⟩ | = | IMAGES FORMED BY PRIMARY LIGHT | + | IMAGES FORMED BY HIGH-ORDER LIGHT |
|---|---|---|---|---|---|
| OPTIMAL VISUAL RECOGNITION DISTANCE: Dop (EX. 600mm) | ▨ | = | ▨ | + | ☐ |
| 0.5 × Dop (EX. 300mm) | ▨ | = | ▨ | + | ▨ |
| 0.33 × Dop (EX. 200mm) | ▨ | = | ▨ | + | ▨ |
| 0.28 × Dop (EX. 170mm) | ▨ | = | ▨ | + | ▨ |
| 0.23 × Dop (EX. 140mm) | ▨ | = | ▨ | + | ▨ |

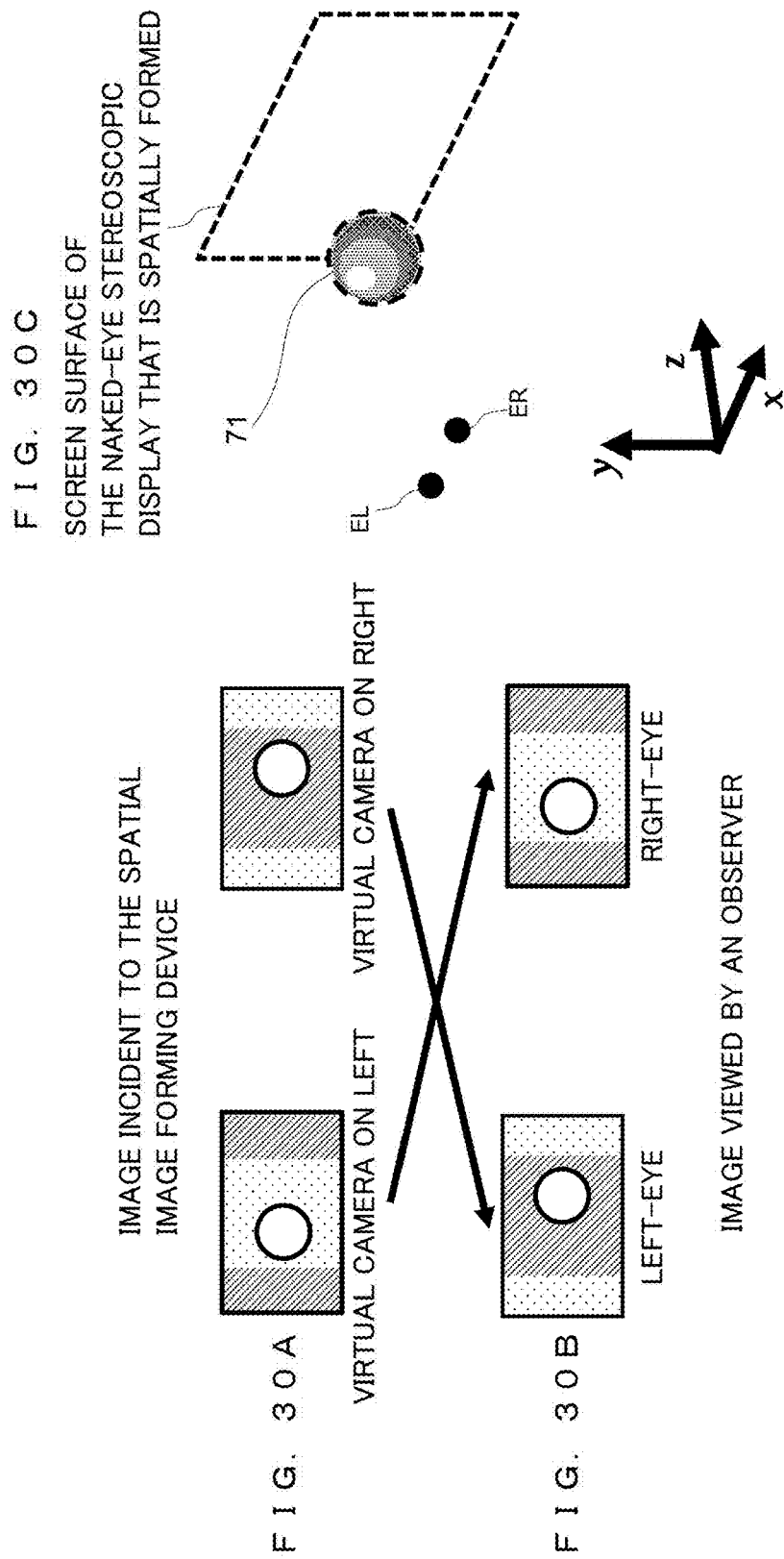

F I G. 3 1
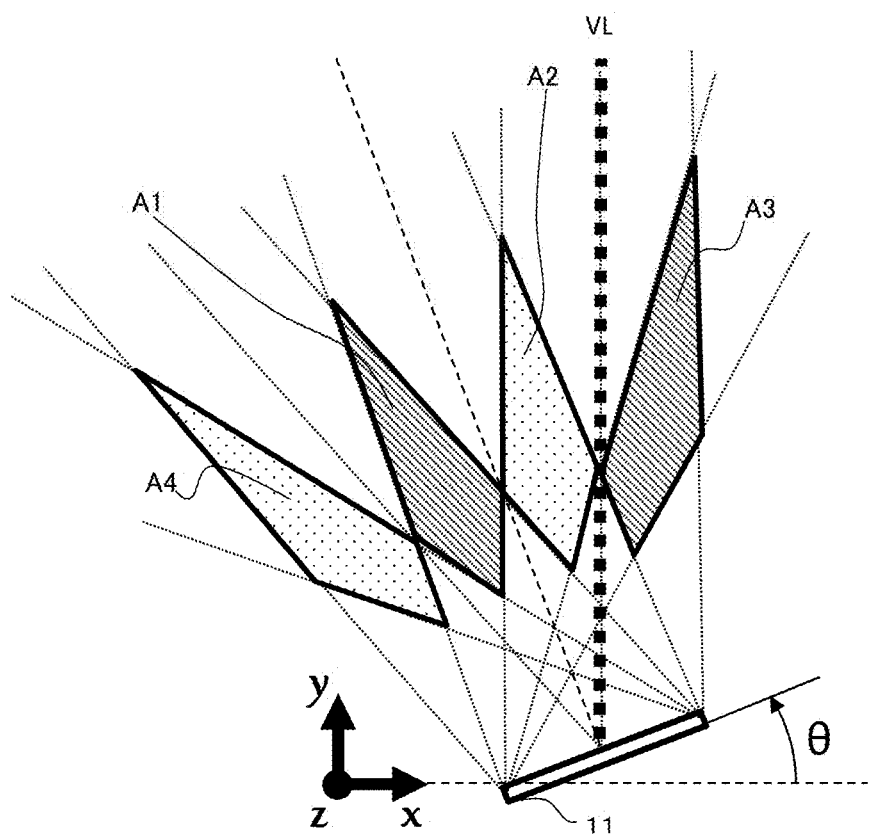

F I G. 3 2
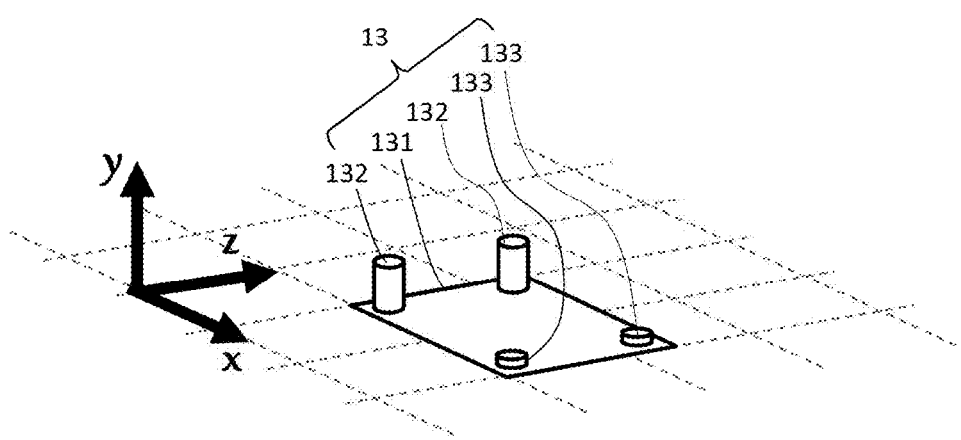

F I G. 3 3
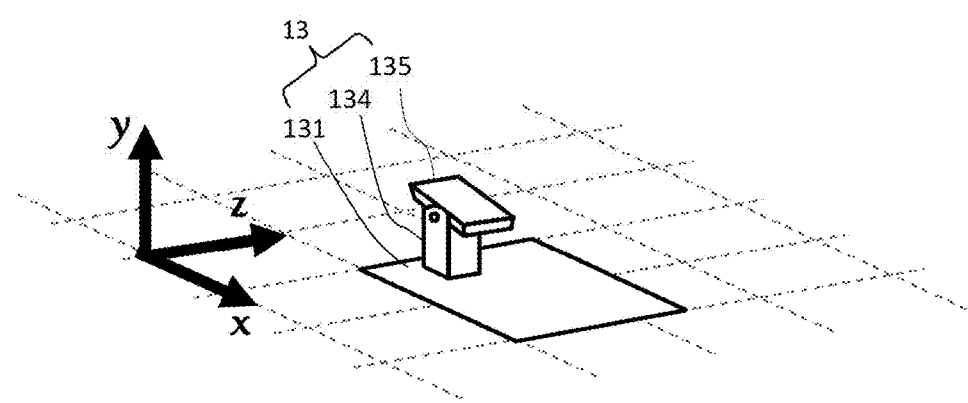

INCREASE

↑
D
↓

DECREASE

▨ INPUT IMAGE OF THE LEFT-EYE PIXEL

▨ INPUT IMAGE OF THE RIGHT-EYE PIXEL

F I G. 4 2

| DISTANCE D | CAPTURED IMAGES | = | IMAGES FORMED BY SECONDARY LIGHT | + | IMAGES FORMED BY HIGH-ORDER LIGHT |
|---|---|---|---|---|---|
| OPTIMAL VISUAL RECOGNITION DISTANCE: Dop (EX. 600mm) | | = | | + | |
| 0.5 × Dop (EX. 300mm) | | = | | + | |
| 0.33 × Dop (EX. 200mm) | | = | | + | |
| 0.28 × Dop (EX. 170mm) | | = | | + | |
| 0.23 × Dop (EX. 140mm) | | = | | + | |

FIG. 45

| DISTANCE D | <CAPTURED IMAGES> | = IMAGES FORMED BY PRIMARY LIGHT | + IMAGES FORMED BY HIGH-ORDER LIGHT |
|---|---|---|---|
| OPTIMAL VISUAL RECOGNITION DISTANCE: Dop (EX. 600mm) | | = | + |
| 0.5 × Dop (EX. 300mm) | | = | + |
| 0.33 × Dop (EX. 200mm) | | = | + |
| 0.28 × Dop (EX. 170mm) | | = | + |
| 0.23 × Dop (EX. 140mm) | | = | + |

F I G. 5 0
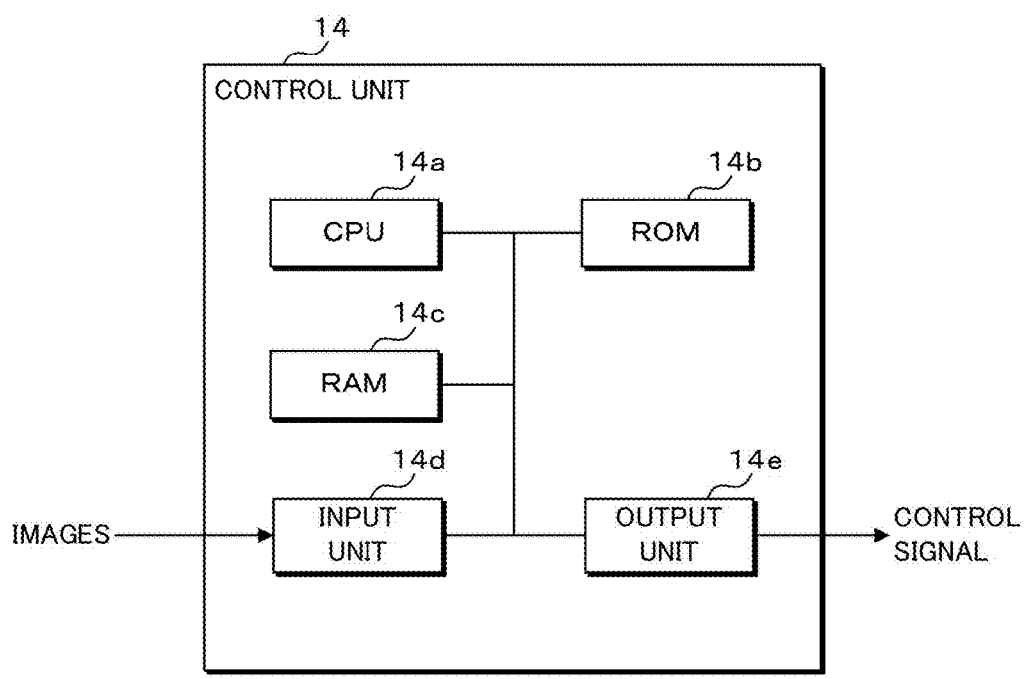

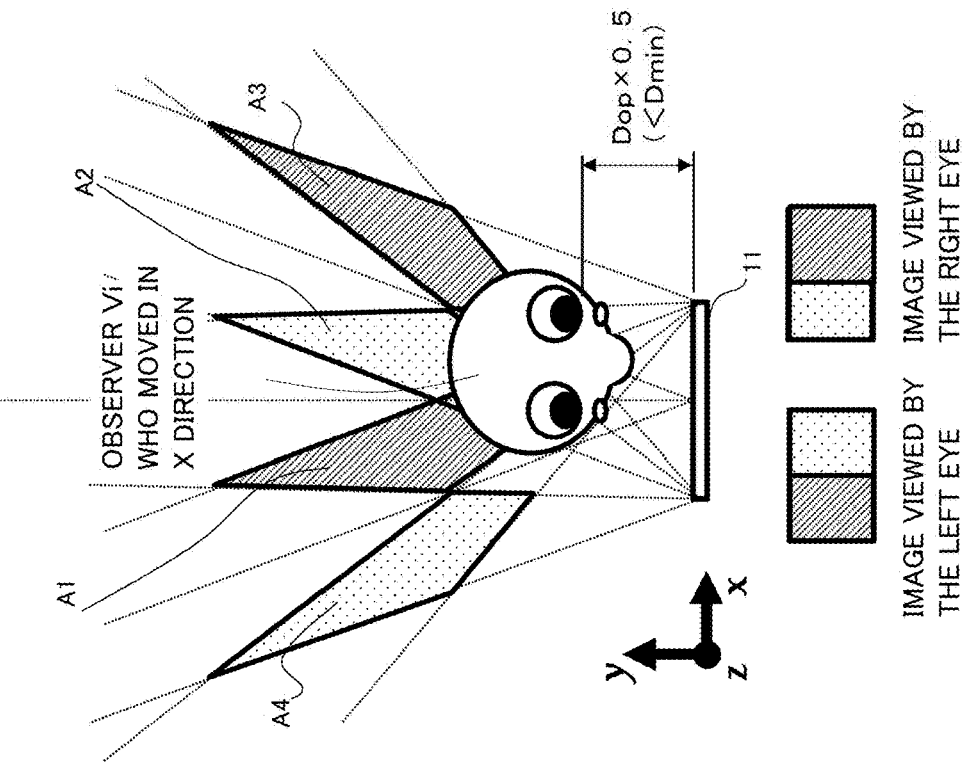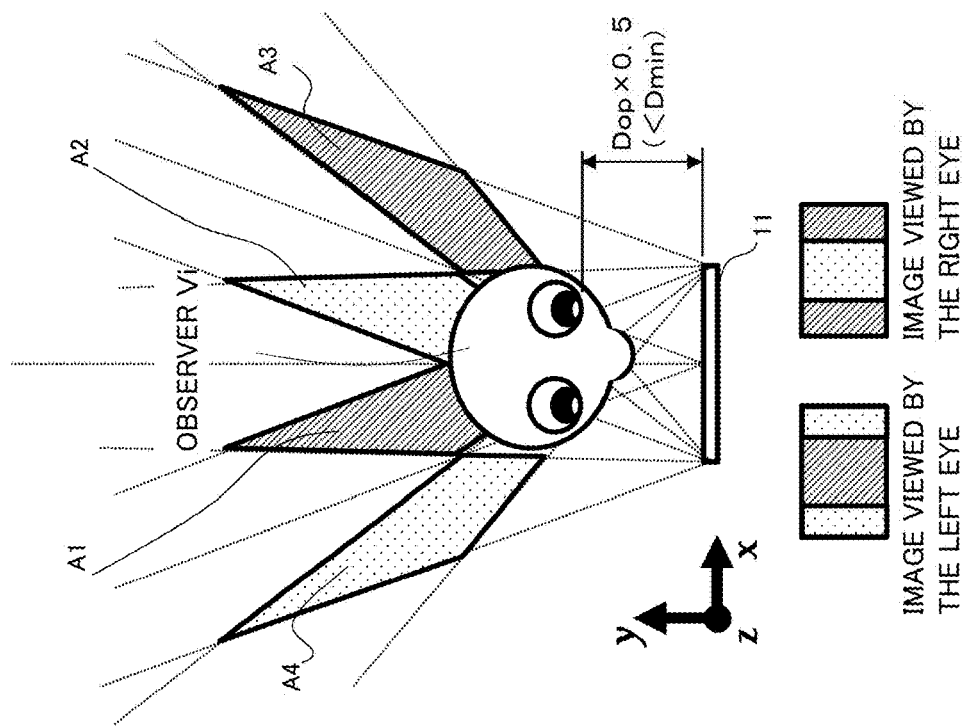

F I G. 57A

| POSITION OF AN OBSERVER | a | b | c | d | e |
|---|---|---|---|---|---|
| ΔX [mm] | -20 | -10 | 0 | 10 | 20 |
| Θ[°] | 0 | 0 | 0 | 0 | 0 |
| LEFT-EYE | | | | | |
| RIGHT-EYE | | | | | |

F I G. 57B

| POSITION OF AN OBSERVER | a | b | c | d | e |
|---|---|---|---|---|---|
| ΔX [mm] | -20 | -10 | 0 | 10 | 20 |
| Θ[°] | 0 | 0 | 0 | 0 | 0 |
| LEFT-EYE | | | | | |
| RIGHT-EYE | | | | | |

F I G. 5 8
| POSITION OF AN OBSERVER | a | b | c | d | e |
|---|---|---|---|---|---|
| ΔX [mm] | -20 | -10 | 0 | 10 | 20 |
| Θs [°] | 2 | 1 | 0 | -1 | -2 |
| LEFT-EYE |  | 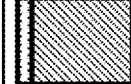 | 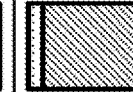 | 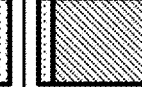 |  |
| RIGHT-EYE | 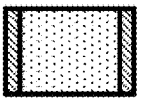 | 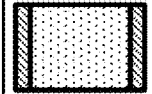 |  |  |  |

FIG. 64

| POSITION OF AN OBSERVER | a | b | c | d | e |
|---|---|---|---|---|---|
| ΔX [mm] | -20 | -10 | 0 | 10 | 20 |
| Θs [°] | 14 | 13 | 12=θ | 11 | 10 |
| LEFT-EYE | | | | | |
| RIGHT-EYE | | | | | |

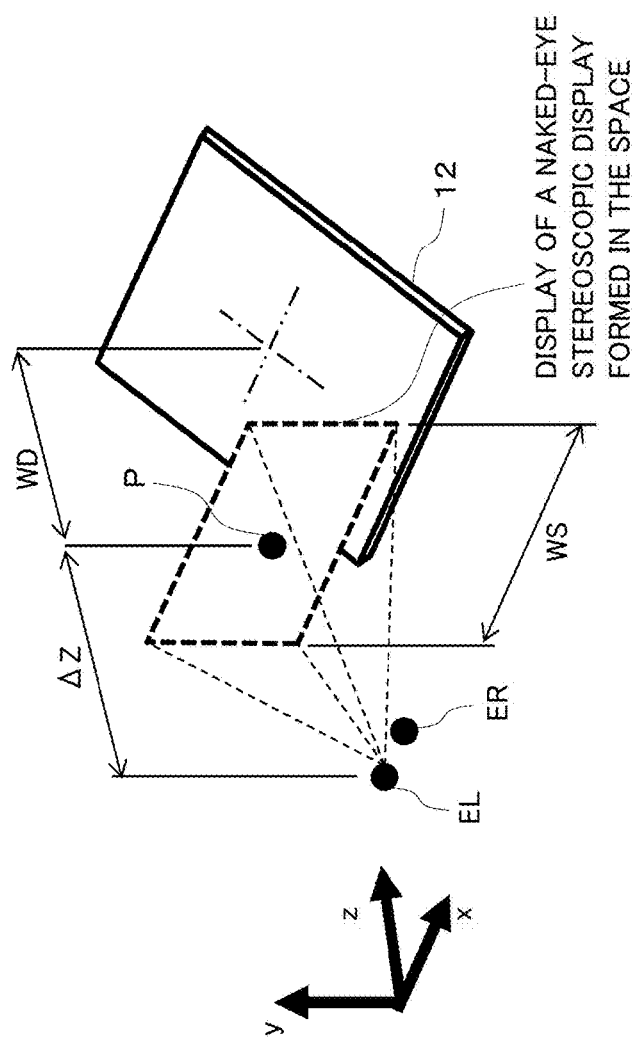
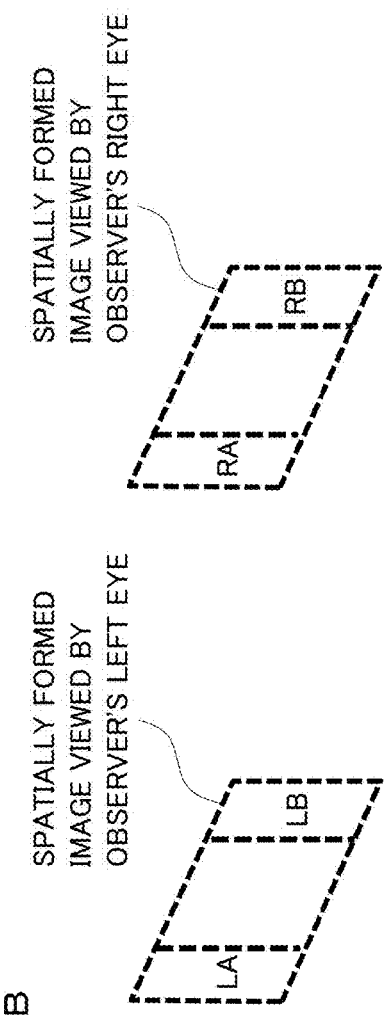
FIG. 67A
FIG. 67B

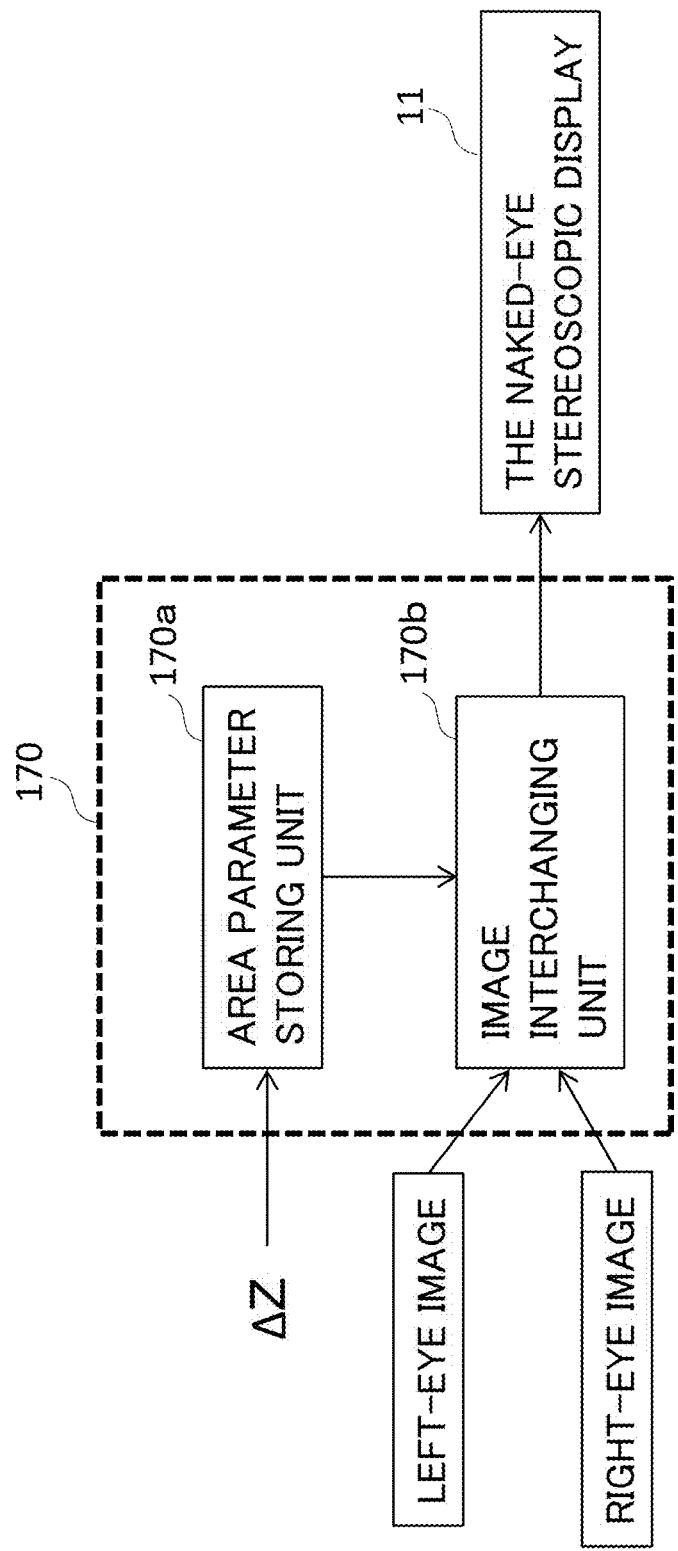

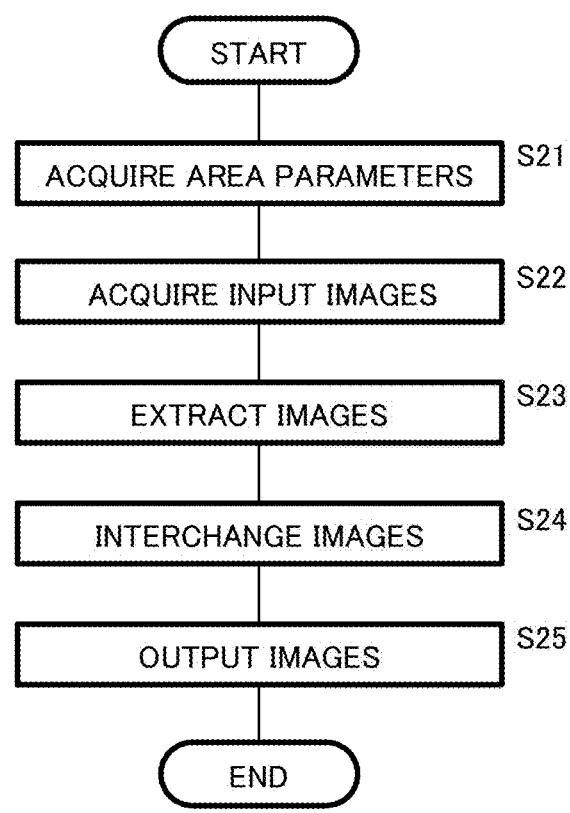
F I G. 7 1

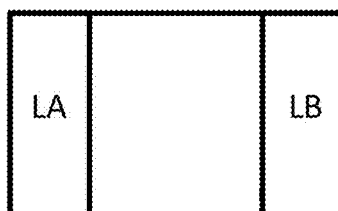
FIG. 72A
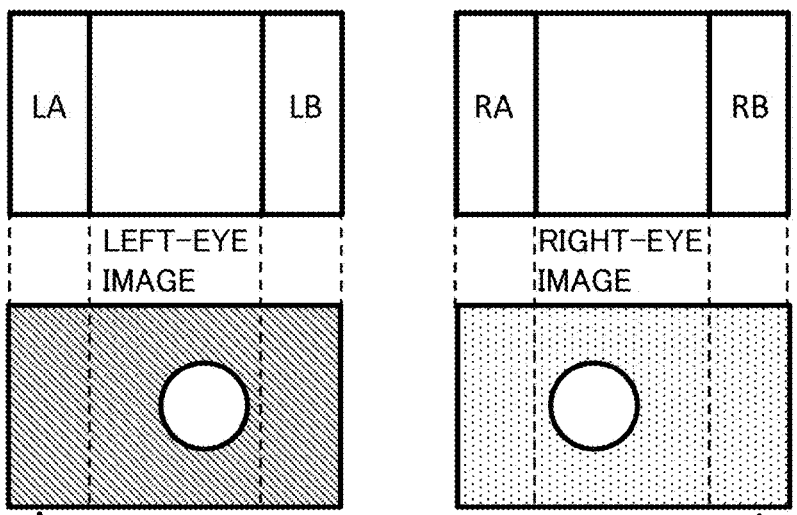
FIG. 72B
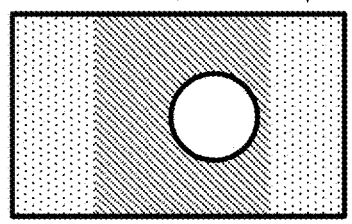
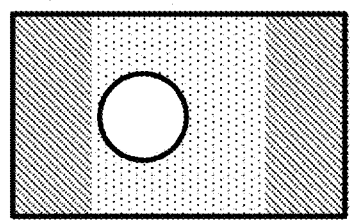
FIG. 72C
INPUT IMAGE OF
THE LEFT-EYE PIXEL
INPUT IMAGE OF
THE RIGHT-EYE PIXEL F I G. 7 3 A 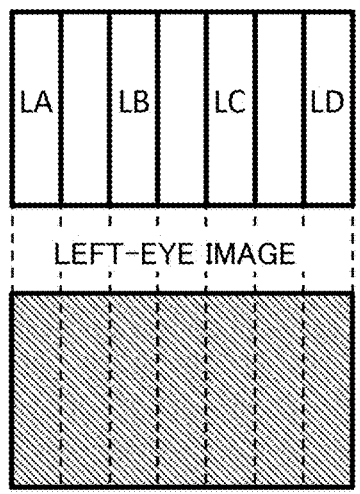 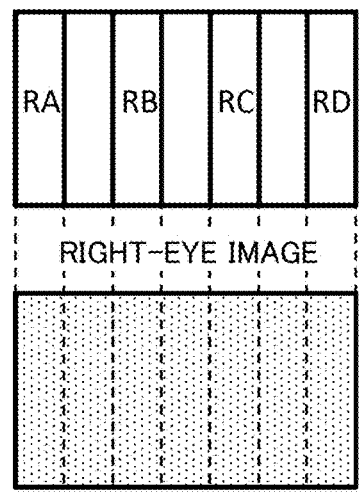
LEFT-EYE IMAGE     RIGHT-EYE IMAGE
F I G. 7 3 B
F I G. 7 3 C 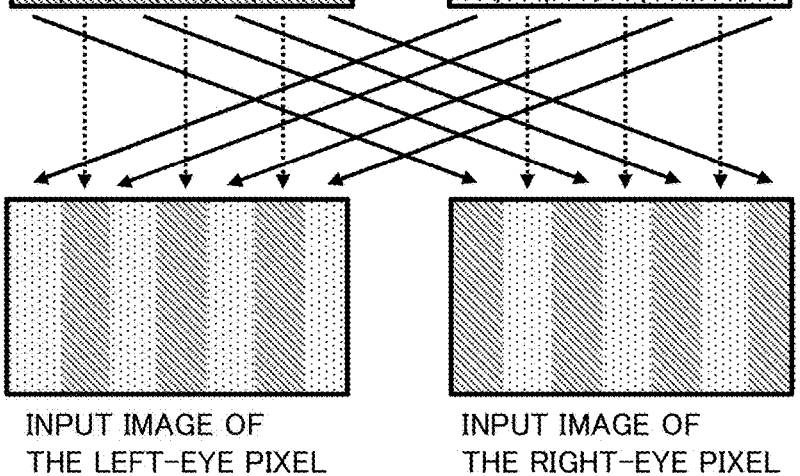
INPUT IMAGE OF
THE LEFT-EYE PIXEL
INPUT IMAGE OF
THE RIGHT-EYE PIXEL F I G. 7 4 A
LEFT-EYE IMAGE 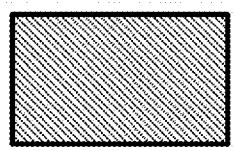
RIGHT-EYE IMAGE 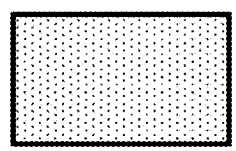
F I G. 7 4 B
IMAGE VIEWED BY
OBSERVER'S LEFT EYE 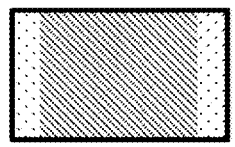
IMAGE VIEWED BY
OBSERVER'S RIGHT EYE 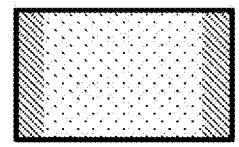
F I G. 7 4 C
IMAGE VIEWED BY
OBSERVER'S LEFT EYE 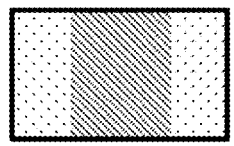
IMAGE VIEWED BY
OBSERVER'S RIGHT EYE 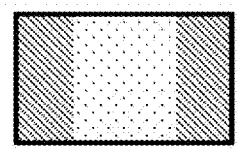

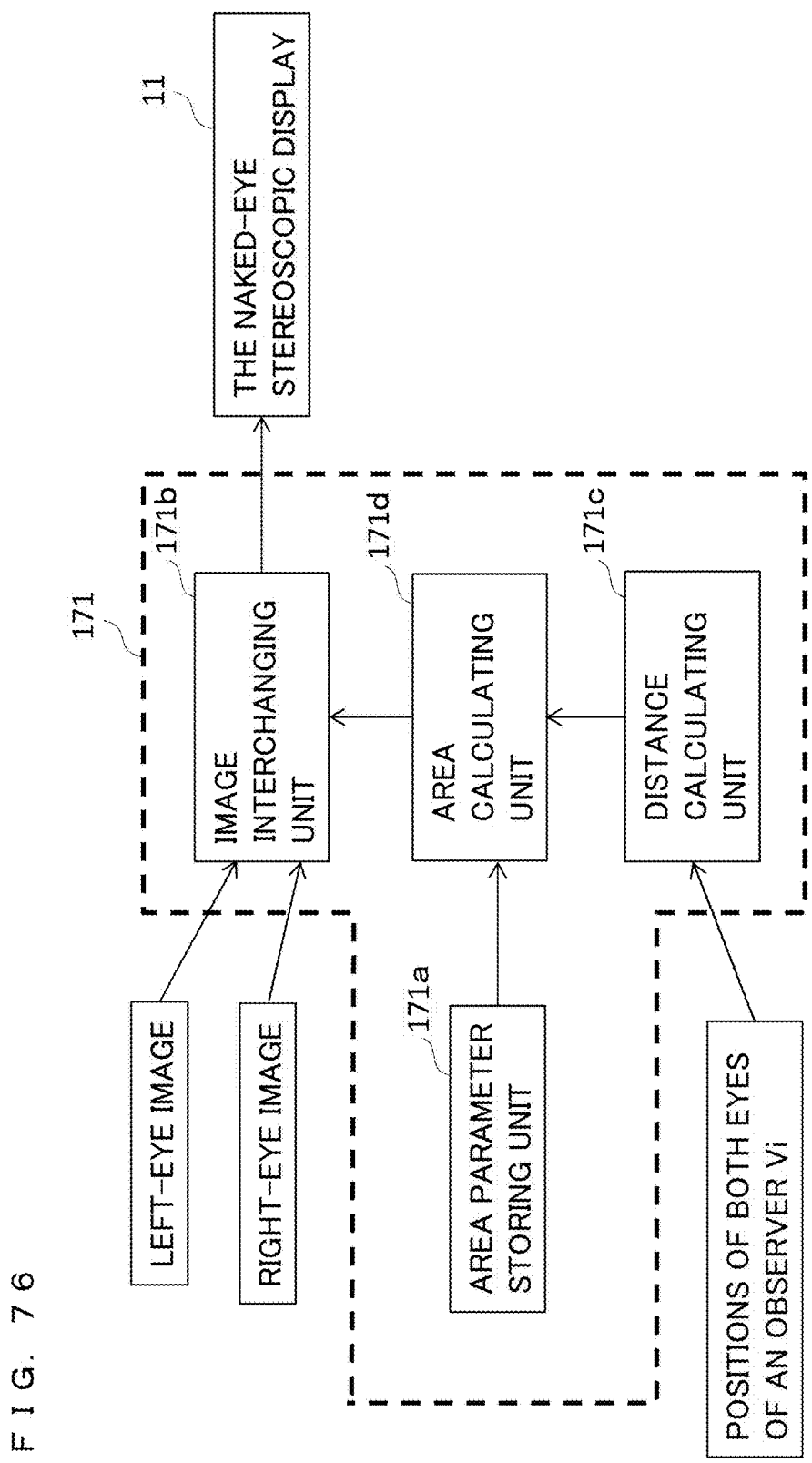

F I G. 7 7
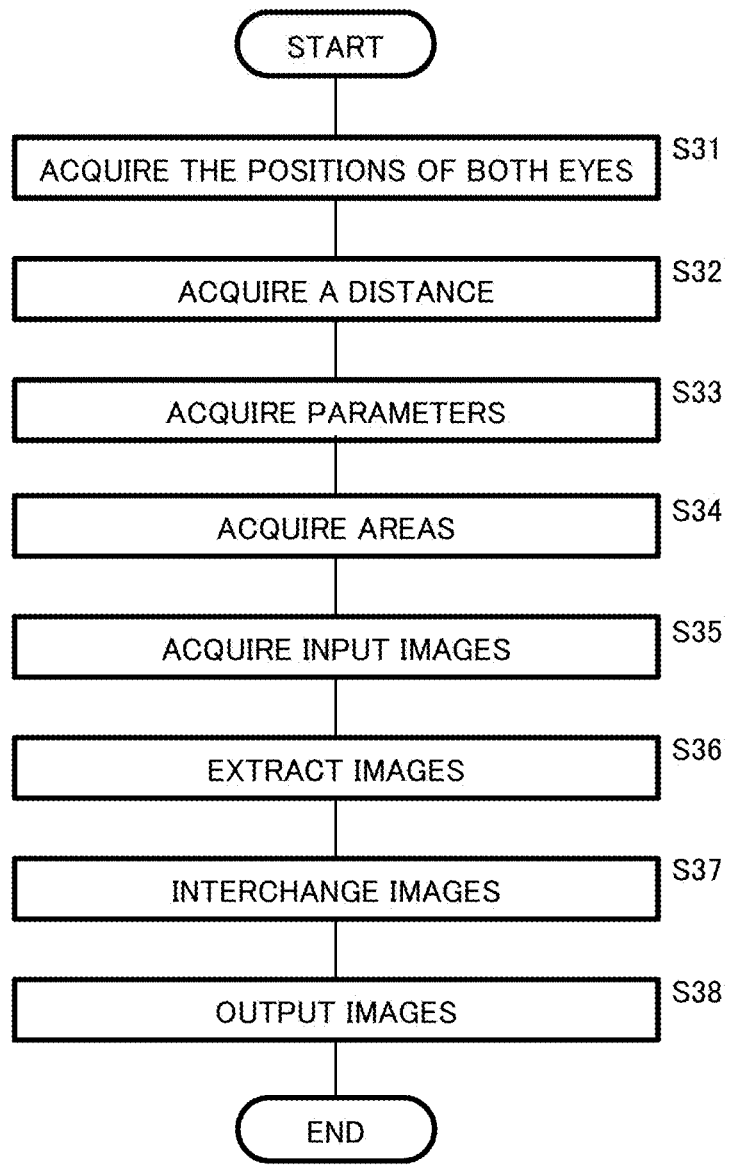

FIG. 78A 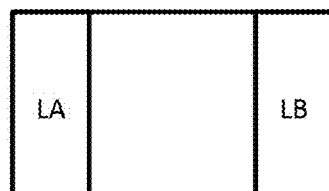 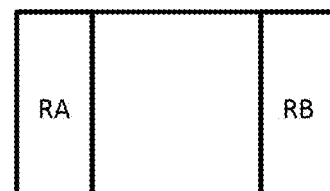
FIG. 78B 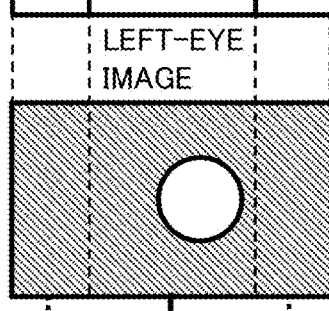 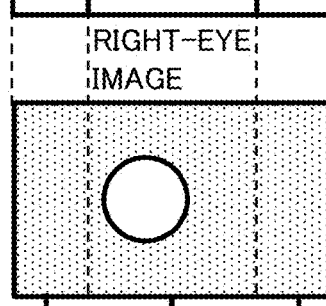
FIG. 78C 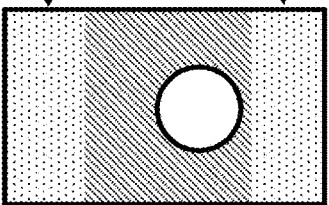 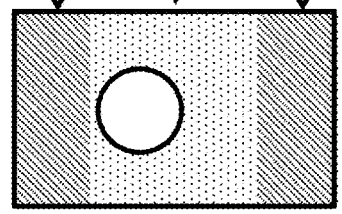
INPUT IMAGE OF THE LEFT-EYE PIXEL          INPUT IMAGE OF THE RIGHT-EYE PIXEL

FIG. 80

| Δz [mm] | ΔX [mm] | -20 | -10 | 0 | 10 | 20 |
|---|---|---|---|---|---|---|
| | Θs [°] | 10 | 11 | 12=θ | 13 | 14 |
| 400 | LEFT-EYE | | | | | |
| | RIGHT-EYE | | | | | |
| 280 | LEFT-EYE | | | | | |
| | RIGHT-EYE | | | | | |
| 160 | LEFT-EYE | | | | | |
| | RIGHT-EYE | | | | | |
| 40 | LEFT-EYE | | | | | |
| | RIGHT-EYE | | | | | |

# STEREOSCOPIC DISPLAY APPARATUS

CROSS-REFERENCE TO RELATED APPLICATION

This non-provisional application claims priority under 35 U.S.C. § 119(a) on Patent Application No. 2016-143729 filed in Japan on Jul. 21, 2016, and Patent Application No. 2017-090593 filed in Japan on Apr. 28, 2017, the entire contents of which are hereby incorporated by reference.

FIELD

The present invention relates to the configuration of a stereoscopic display apparatus acquired by combining a naked-eye stereoscopic display and a spatial image forming device and a method of controlling the stereoscopic display apparatus.

BACKGROUND

As a technique for allowing an observer to recognize a stereoscopic image, generally, a stereoscopic image display method based on binocular parallax using a difference between positions of the left eye and the right eye is used. This method is an application of the principle of stereogram that a three-dimensional stereoscopic image is recognized based on a difference between viewing methods in the brain by allowing the left eye and the right eye to visually recognize mutually-different two-dimensional images. As methods for displaying a stereoscopic image, there are a system using glasses and a naked-eye system not using glasses. As the naked-eye system, there are a two-eye system, a multiple eye system, and the like in accordance with the number of observer's viewpoints.

In order to represent a stereoscopic image based on the naked-eye system by using a two-dimensional display such as a general flat panel display, pixels displaying a left-eye image and a right-eye image are arranged in a two-dimensional display. An optical unit such as a lenticular lens having a cylindrical lens arranged therein or a parallax barrier having a slit-shaped light shielding pattern arranged therein is disposed between the two-dimensional display and an observer. Then, a method is used in which the left-eye image and the right-eye image on the screen are spatially separated so as to be visually recognized respectively by the left and right eyes.

In the technology described above, while an image is stereoscopically displayed on the screen of a two-dimensional display, a technology for displaying an image in which an object is represented as if it floats in the air has also been developed. For example, a method of stereoscopically displaying a three-dimensional image in accordance with a volume scanning method has been proposed in which a two-dimensional display is arranged to be inclined with respect to the optical axis of an imaging optical system by using the imaging optical system such as a convex lens or a concave mirror, the two-dimensional image inclining with respect to the optical axis is moved through mirror scanning, and a three dimensional image is formed by displaying a cross-section image of a display object on the two-dimensional display in synchronization with the moving two-dimensional image.

In Japanese Patent Application Laid-Open No. 2013-080227, a volume scanning-type three-dimensional air image display apparatus is disclosed which includes a real mirror image forming optical system that can form a real image of a projecting object at plane symmetrical positions with respect to one geometric plane that is a symmetrical plane as mirror images, a display that is arranged on the lower face side of the symmetrical plane and includes a display face displaying an image as the projecting object, and a drive unit that operates the display to perform movement including a component of a vertical direction with respect to the display face and, by changing an image displayed on the display face in synchronization with the operation of the display performed by the drive unit, forms the image as a stereoscopic image in a space of the upper face side of the symmetrical plane.

SUMMARY

However, according to a related technology displaying an image in which an object is represented as if it floats in the air, the scale of the display apparatus is very large. For example, in the configuration disclosed in Japanese Patent Application Laid-Open No. 2013-080227, the drive unit moving the two-dimensional display is necessary, and accordingly, there is a problem in that the size of the apparatus is large. For such a problem, a display method may be considered in which an observer is allowed to recognize a floating image in the air as a stereoscopic image by combining a spatial image forming device such as the real mirror image forming optical system described above with a display (a so-called naked eye-type stereoscopic display) in which an optical unit such as a lenticular lens is arranged in a two-dimensional display.

However, in the case of such a configuration, the inventors and the like have found a new problem that, in an image floating in the air, an area (normal viewing area) in which the depth of a 3D object is correctly displayed and an area (a reverse viewing area) in which the depth of the 3D object is reversed alternately appear, and the positions at which the normal viewing area and the reverse viewing area appear change according to the position of an observer. In the observation of a 3D object including a reverse viewing area, an observer perceives a portion in which a depth parallax and a jumping-out parallax are reversed, and accordingly, the observer is caused to have an uncomfortable feeling and an unpleasant feeling. Therefore, the display of a 3D object including a reverse viewing forces the observer to have a heavy load.

A stereoscopic display apparatus according to one aspect of the present disclosure includes: a projector of a planar shape that divides light rays into two or more directions and projects two or more images by using the divided light; an optical device of a planar shape that outputs incident light incident from a first face from a second face; and a supporting unit that supports at least one of the projector and the optical device to be in a first state or a second state in a three-dimensional coordinate system including first to third coordinate axes that are orthogonal to each other, in which the optical device outputs incident light incident from a first point on a projection surface of the projector to a second point having plane symmetry with respect to a plane of the optical device as a reference, the first state is a state in which, in a case where first and second virtual lines orthogonal to each other on the plane of the optical device and third and fourth virtual lines orthogonal to each other on the projection surface of the projector are assumed to be projected onto a first plane including the first and second coordinate axes, the first and third virtual lines overlap each other, and the second and fourth virtual lines overlap each other, and the second state is a state in which, in the third-dimensional coordinate system, the first virtual line and the third virtual line are not parallel to each other, and the second virtual line and the fourth virtual line are not parallel to each other.

The above and further objects and features will more fully be apparent from the following detailed description with accompanying drawings.

It is to be understood that both the foregoing general description and the following detailed description are exemplary and explanatory and are not restrictive of this disclosure.

BRIEF DESCRIPTION OF SEVERAL VIEWS OF DRAWINGS

FIGS. 2A and 2B are explanatory diagrams that illustrate the configurations of a naked-eye stereoscopic display and a display panel;

FIGS. 3A and 3B are diagrams that schematically illustrate the configuration of a spatial image forming device;

FIGS. 5A and 5B are explanatory diagrams that illustrate the operation principle of a spatial image forming device;

FIG. 7 is an explanatory diagram that illustrates the arrangement of a naked-eye stereoscopic display;

FIG. 8 is an explanatory diagram that illustrates an example of the arrangement of a virtual camera;

FIG. 14 is a diagram that illustrates the configurations of the captured images illustrated in FIGS. 13A to 13E;

FIGS. 16A to 16E are explanatory diagrams that illustrate images captured by a virtual camera;

FIG. 17 is a diagram that illustrates the configurations of the captured images illustrated in FIGS. 16A to 16E;

FIGS. 18A to 18C are schematic diagrams that illustrate a relation between a stereoscopic image recognized by an observer and input images;

FIGS. 20A and 20B are diagrams that illustrate reverse viewing in a combination of the naked-eye stereoscopic display and a spatial image forming device illustrated in FIG. 7;

FIG. 22 is a diagram of optical paths that illustrates a stereoscopic viewing area formed in a stereoscopic display apparatus;

FIG. 23 is an explanatory diagram that illustrates a positional relation between a virtual camera and a naked-eye stereoscopic display;

FIG. 25 is a diagram that illustrates the configurations of the captured images illustrated in FIGS. 24A to 24E;

FIG. 28 is a diagram that illustrates the configurations of the captured images illustrated in FIGS. 27A to 27E;

FIGS. 30A to 30C are schematic diagrams that illustrate a relation between a stereoscopic image recognized by an observer and input images;

FIG. 31 is an explanatory diagram that illustrates inclination arrangement of a naked-eye stereoscopic display;

FIG. 32 is a perspective view that illustrates an example of an inclination supporting unit;

FIG. 33 is a perspective view that illustrates another example of an inclination supporting unit;

FIG. 42 is a diagram that illustrates the configurations of the captured images illustrated in FIGS. 41A to 41E;

FIG. 45 is a diagram that illustrates the configuration of the captured images illustrated in FIGS. 44A to 44E;

FIG. 50 is a block diagram that illustrates the hardware configuration of a control device;

FIGS. 55A and 55B are explanatory diagrams that illustrate changes in the visual appearance of a single body of a naked-eye stereoscopic display;

FIGS. 57A and 57B are explanatory diagrams that illustrate relations between the position of an observer and images visually recognized by the observer;

FIG. 58 is an explanatory diagram that illustrates a relation between an image visually recognized by an observer and a projection area;

FIG. 64 is an explanatory diagram that illustrates a relation between the position of an observer and an image visually recognized by the observer;

FIGS. 67A and 67B are explanatory diagrams that illustrate a method of calculating areas to be interchanged with each other;

FIG. 70 is a block diagram that illustrates an example of the configuration of an input image interchanging unit;

FIG. 71 is a flowchart that illustrates the sequence of an image interchanging process performed by an input image interchanging unit;

FIGS. 72A to 72C are schematic diagrams that illustrate an example of image generation performed by an input image interchanging unit;

FIGS. 73A to 73C are schematic diagrams that illustrate an example of image generation performed by an input image interchanging unit;

FIGS. 74A to 74C are explanatory diagrams that illustrate an example of images viewed by an observer;

FIG. 76 is a block diagram that illustrates an example of the configuration of an input image interchanging unit;

FIG. 77 is a flowchart that illustrates the sequence of an image interchanging process performed by an input image interchanging unit;

FIGS. 78A to 78C are schematic diagrams that illustrate an example of image generation performed by an input image interchanging unit;

FIG. 80 is an explanatory diagram that illustrates a relation between the position of an observer and an image visually recognized by the observer.

DETAILED DESCRIPTION

Figure 1:
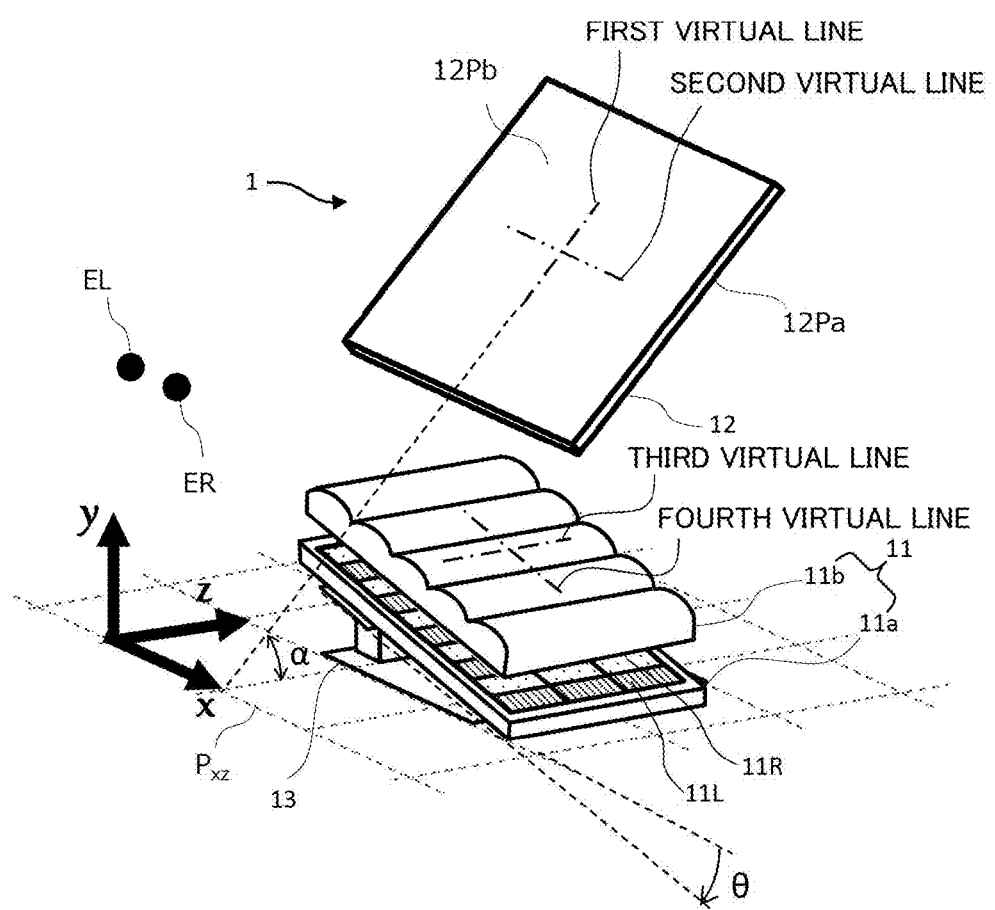
FIG. 1 is an explanatory diagram that illustrates the configuration of a stereoscopic display apparatus.

Hereinafter, embodiments will be described in detail with reference to the drawings.

In descriptions presented below, coordinate systems of three types are set. A first coordinate system is a system of three-dimensional orthogonal coordinates associated with a space in which a stereoscopic display apparatus is installed. In this three-dimensional orthogonal coordinate system, a predetermined direction of a horizontal plane is set as an x-axis direction, and a direction orthogonal to the x-axis direction on the horizontal plane is set as a z-axis direction. In addition, a vertical direction that is orthogonal to both the x-axis direction and the z-axis direction will be referred to as a y-axis direction. Here, the x-axis direction is the direction of a first coordinate axis. In addition, the direction of the x-axis is a direction (first direction) in which the left eye and the right eye of an observer are aligned.

A second coordinate system is a system of a three-dimensional orthogonal coordinates associated with a naked-eye stereoscopic display included in a stereoscopic display apparatus. In this three-dimensional orthogonal coordinate system, an x11-axis and a z11-axis direction are orthogonal to each other along a plane including the display surface of the naked-eye stereoscopic display, and the thickness direction of the naked-eye stereoscopic display is set as a y11-axis direction.

A third coordinate system is a system of three-dimensional orthogonal coordinates associated with a spatial image forming device included in a stereoscopic display apparatus. In this three-dimensional orthogonal coordinate system, an x-12 axis direction and a z12-axis direction are orthogonal to each other along a plane including one side face or the other side face of a spatial image forming device, and the thickness direction of the spatial image forming device is set as a y12-axis direction. In a case where all the coordinate systems are described in a plane or a cross-section, a blackened circle represents a direction from the front side of the sheet face toward the back side of the sheet face, and a circle of which the center is blackened represents a direction from the back side of the sheet face toward the front side of the sheet.

Here, first to fourth virtual lines used for describing the arrangement of a naked-eye stereoscopic display and a spatial image forming device will be defined. The first virtual line and the second virtual line are two virtual lines that are orthogonal to each other inside a plane in one face or the other face of the spatial image forming device. The first virtual line extends in the z12-axis direction, and the second virtual line extends in the x12-axis direction. The third virtual line and the fourth virtual line are two virtual lines that are orthogonal to each other inside a plane of a display surface of the naked-eye stereoscopic display. The third virtual line extends in the z11-axis direction, and the fourth virtual line extends in the x11-axis direction.

Embodiment 1

FIG. 1 is an explanatory diagram that illustrates the configuration of a stereoscopic display apparatus 1. In FIG. 1, an example of the positions of both eyes of an observer is illustrated as a left-eye position EL and a right-eye position ER. The stereoscopic display apparatus 1 includes a naked-eye stereoscopic display (projector) 11, a spatial image forming device (optical device) 12, and an inclination supporting unit (supporter) 13. The naked-eye stereoscopic display 11 is supported by the inclination supporting unit 13 to incline by an angle θ in the x-axis direction with respect to an xz plane Pxz. The spatial image forming device 12 is arranged on the upper side of the naked-eye stereoscopic display 11 in the y-axis direction. The spatial image forming device 12 is arranged to be inclined by an angle α in the z-axis direction with respect to an xz plane Pxz such that the first virtual line and the third virtual line overlap each other, and the second virtual line and the fourth virtual line overlap each other when projection is performed for an xz plane. The naked-eye stereoscopic display 11 is arranged on one face 12Pa side of the spatial image forming device 12, and an observer is located on the other face 12Pb side of the spatial image forming device 12.

The naked-eye stereoscopic display 11 includes a display panel 11a such as a liquid crystal display device and an optical unit (optical component) such as a lenticular lens or a parallax barrier attached to the display panel. In this embodiment, a lenticular lens 11b is employed as the optical unit.

FIGS. 2A and 2B are explanatory diagrams that illustrate the configurations of the naked-eye stereoscopic display and the display panel. FIG. 2A is a perspective view of the naked-eye stereoscopic display 11. As illustrated in FIG. 2A, the display panel 11a used in the naked-eye stereoscopic display 11 includes left-eye pixels 11L and right-eye pixels 11R. The left-eye pixels 11L display a left-eye image. The right-eye pixels 11R display a right-eye image. The left-eye pixels 11L and the right-eye pixels 11R are alternately arranged in the x11-axis direction. The lenticular lens 11b is a plate-shaped member. One face of the lenticular lens 11b is a flat face. On the other face of the lenticular lens 11b, a plurality of cylindrical lenses having a semi-cylindrical shape extending in the short-side direction are disposed along the long side direction. The lenticular lens 11b is arranged as illustrated in FIG. 2A. In other words, one face of the lenticular lens 11b faces the display panel 11a. Each of the cylindrical lenses of the lenticular lens 11b extends in the z11-axis direction. In addition, the plurality of the cylindrical lenses is arranged in the x11-axis direction.

FIG. 2B is an x11-z11 plan view of the display panel 11a configuring the naked-eye stereoscopic display 11. As illustrated in FIG. 2B, in the display panel 11a used for the naked-eye stereoscopic display 11, unit pixels 11P are arranged in the x11-axis direction and the z11-axis direction in a matrix pattern. Each of the unit pixels 11P is configured by a left-eye pixel 11L and a right-eye pixel 11R. The lenticular lens 11b may have a configuration in which a lens face is arranged on a face facing the display panel 11a. The optical unit is not limited to the lenticular lens 11b, but various optical devices capable of splitting light such as a fly-eye lens, a parallax barrier, and a prism sheet may be used. In addition, as the optical unit, for example, a gradient index (GRIN) lens using liquid crystals, a liquid crystal lens combining a convexo-concave substrate having a lens effect and liquid crystal molecules, a switching parallax barrier using liquid crystals, or the like may be used.

The spatial image forming device 12 is an optical component that forms a flat plate shape in which a floating image in the air is formed by forming an image displayed on the naked-eye stereoscopic display 11 inside a space. As this spatial image forming device 12, for example, a real mirror image forming optical system disclosed in Japanese Patent Application Laid-Open No. 2013-080227 may be employed.

FIGS. 3A and 3B are diagrams that schematically illustrate the configuration of a spatial image forming device 91. FIG. 3A is an x12-z12 plan view of the spatial image forming device 91, and FIG. 3B is a partial enlarged perspective view of a B portion of the spatial image forming device 91. The spatial image forming device 91 illustrated in FIG. 3A has planar extents in the x12-axis direction and the z12-axis direction. In the plane, a plurality of unit optical devices 91a each having a rhombus shape transmitting light from one face to the other face (or from the other face to one face) are disposed. The unit optical devices 91a are arranged in the x12-axis direction and the z12-axis direction. Here, in order to describe the partial enlarged perspective view of the B portion illustrated in FIG. 3B, a three-dimensional orthogonal coordinate system uvw is set. In the three-dimensional orthogonal coordinate system uvw, a v axis and a y12 axis are the same, and an uw plane is a plane that is parallel to x12-z12. A u axis and a w axis rotate by 45 degrees with the y12 axis used as a rotation axis. As illustrated in FIG. 3B, the spatial image forming device 91 has a thickness in the v-axis direction. In each of the unit optical devices 91a, inner wall faces that are orthogonal to each other are formed in the v-axis direction. A mirror surface treatment is performed for each of the inner wall faces.

Figure 4B:
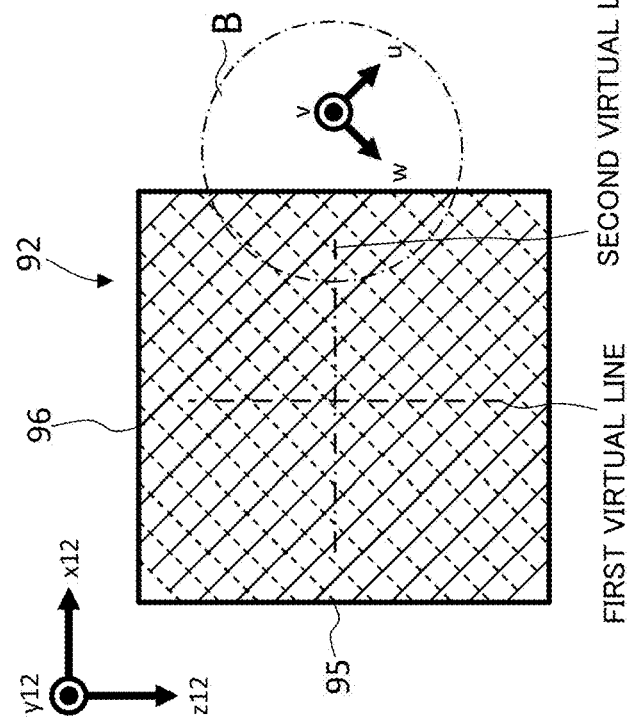
FIGS. 4A and 4B are explanatory diagrams that illustrate a different configuration of another spatial image forming device.
Figure 4A:
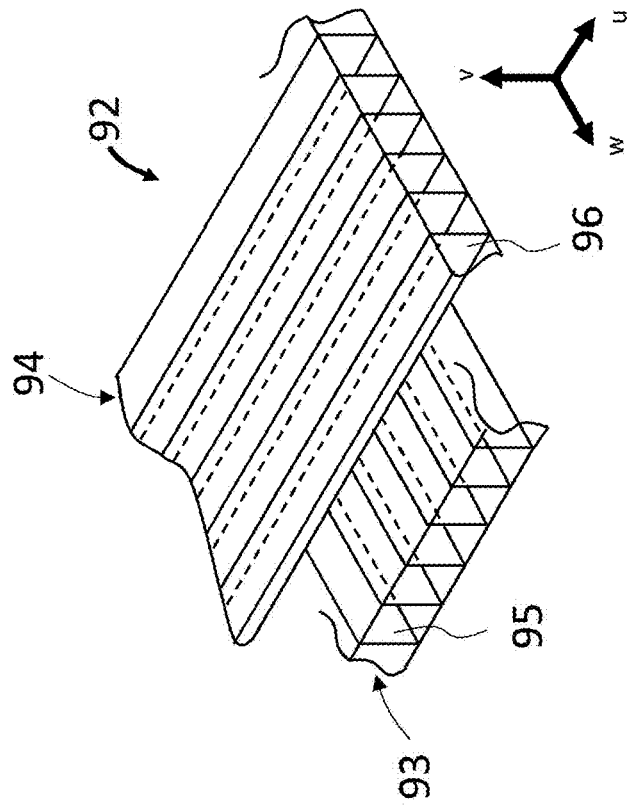

As the spatial image forming device, a device having another configuration may be used. FIGS. 4A and 4B are explanatory diagrams that illustrate a different configuration of another spatial image forming device 92. FIG. 4A is an x12-z12 plan view of the spatial image forming device 92, and FIG. 4B is a partial enlarged perspective view. As illustrated in FIG. 4A, similar to the spatial image forming device 91 illustrated in FIGS. 3A and 3B, the spatial image forming device 92 has planar extents in the x12-axis direction and the z12-axis direction. Here, in order to describe an enlarged perspective view of a B portion illustrated in FIG. 4B, similar to the case illustrated in FIG. 3B, three-dimensional orthogonal coordinate system uvw are set. As illustrated in FIG. 4B, in the spatial image forming device 92, by disposing a plurality of transparent glasses (or acrylic resins), as mirror reflection faces 95, formed to be parallel to a plane including a v axis and a w axis at equal intervals in the u-axis direction, a first device 93 is formed. In addition, in the spatial image forming device 92, by disposing a plurality of transparent glasses (or acrylic resins), as mirror reflection surfaces 96, formed to be parallel to a plane including a u axis and the v axis at equal intervals in the w-axis direction, a second device 94 is formed. In an uw plane, the faces of the first device 93 and the second device 94 are arranged to be close to each other in the v-axis direction such that a direction in which the mirror reflection faces 95 are arranged and a direction in which the mirror reflection faces 96 are arranged intersect with each other at 90 degrees. As above, the plurality of rhombus-shaped unit optical devices transmitting light from one face to the other face (or from the other face to one face) of the spatial image forming device 92 are formed.

FIGS. 5A and 5B are explanatory diagrams that illustrate the operation principle of the spatial image forming device 12. FIG. 5A illustrates optical paths of light that is incident to the spatial image forming device 12 and exits of a case where the spatial image forming device 12 is seen in the y12-axis direction. FIG. 5B illustrates optical paths of a case where the spatial image forming device 12 is seen in the x12-axis direction. As illustrated in FIG. 5A, light that is randomly emitted from a certain light source O travels in the direction of an arrow denoted by a solid line and is incident to the spatial image forming device 12. The light incident to the spatial image forming device 12 is reflected by one mirror surface formed in the spatial image forming device 12. The reflected light is further reflected by the other mirror surface that is adjacent and orthogonal to the one mirror surface so as to be light traveling in the direction of an arrow denoted by a dotted line. In FIG. 5A, for the simplification of description, the spatial image forming device 12 is illustrated in a schematic shape. However, since an actual mirror surface is very fine, incident light and exiting light approximately overlap each other. For this reason, as illustrated in FIG. 5B, in a case where a light source O is arranged on one face 12Pa side of the spatial image forming device 12, a part of light incident to the one face 12Pa of the spatial image forming device 12 is reflected by an internal mirror surface of the spatial image forming device 12 twice. The light emitted from the light source that is reflected twice is light passing through a position P of plane symmetry for the light source O with respect to the spatial image forming device 12. Accordingly, an image displayed on the display panel 11a is formed as a real image at the position of plane symmetry with respect to the spatial image forming device 12. Accordingly, this real image can be observed as a floating image in the air.

In addition, in a case where the spatial image forming device described with reference to FIGS. 3A and 3B or FIGS. 4A and 4B is used, the display surface of the display panel 11a and one face of the spatial image forming device 12 are arranged in parallel to face each other. In that case, light rays emitted from the display panel 11a exit from the other face 12Pb without being reflected by a mirror surface formed vertically with respect to the face of the spatial image forming device 12 even when incident from the one face 12Pa of the spatial image forming device 12. For this reason, an image displayed on the display panel 11a is not formed as a real image at a position of plane symmetry with respect to the spatial image forming device 12. Accordingly, it is necessary to incline one face of the spatial image forming device 12 with respect to the display surface of the display panel 11a.

Figure 6:
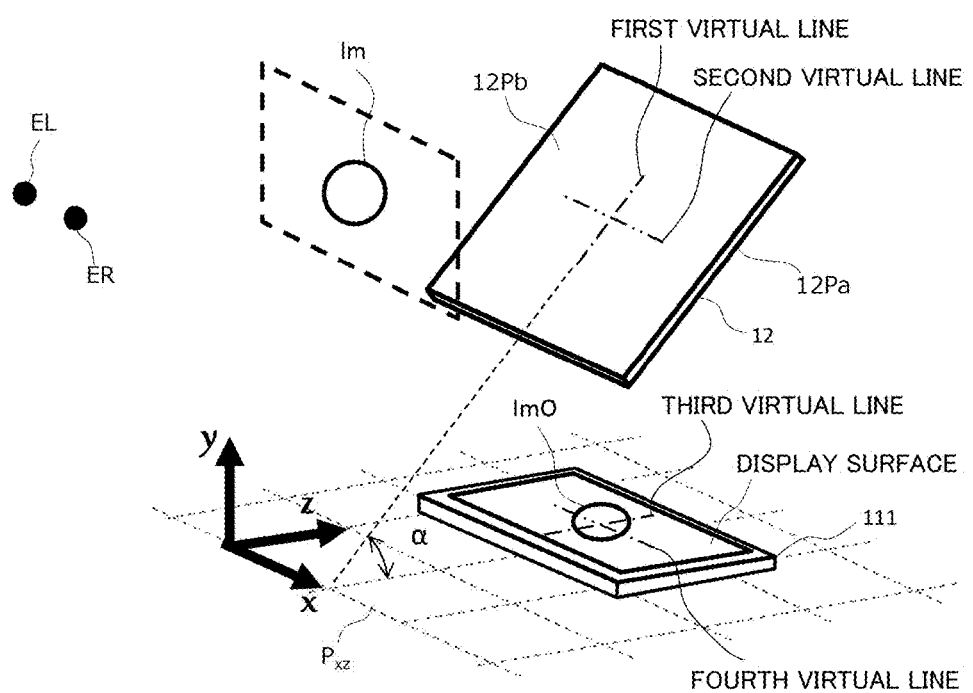
FIG. 6 is a diagram that illustrates the configuration and the operation of a display apparatus displaying a floating image in the air by using a display of two-dimensional display.

First, a display apparatus that displays a floating image in the air by using a combination of a general display (2D display) and a spatial image forming device will be described. FIG. 6 is a diagram that illustrates the configuration and the operation of a display apparatus displaying a floating image in the air by using a display of 2D display. FIG. 6 illustrates an arrangement relation between the display and the spatial image forming device and a position of an observer and an image of a floating image in the air that is visually recognized by the observer.

The display 111 has a display surface that is parallel to an xz plane. In a case where it is assumed that projection is performed for the display 111 on the xz plane, the spatial image forming device 12 is positioned on the upper side of the display 111 in the y-axis direction such that the first virtual line and the third virtual line overlap each other, and the second virtual line and the fourth virtual line overlap each other. In addition, the second virtual line, the third virtual line, and the fourth virtual line are parallel to the xz plane. The first virtual line intersects with the xz plane, and the angle thereof is α. In other words, one face 12Pa and the other face 12Pb of the spatial image forming device 12 is inclined by an angle α with respect to the display surface of the display 111. Accordingly, light emitted from the display surface of the display 111 is incident to the face 12Pa of the spatial image forming device 12 and exits from the face 12Pb. Accordingly, an image ImO displayed on the display 111, based on the principle described with reference to FIGS. 2A and 2B, is formed as a real image Im in a space of the face 12Pb side. The observer can visually recognize the real image Im formed at a predetermined position having a direction joining a left-eye position and a right-eye position to be parallel with x-axis direction as a floating image in the air.

Next, a case will be described with reference to FIG. 7 in which a naked-eye stereoscopic display is arranged instead of the display of 2D display in accordance with the arrangement illustrated in FIG. 6. Here, for the convenience of description, the image of the floating image in the air is not illustrated in FIG. 7. A display panel 11a includes left-eye pixels 11L and right-eye pixels 11R. The left-eye pixels 11L display a left-eye image L. The right-eye pixels 11R display a right-eye image R. A plurality of left-eye pixels 11L and a plurality of right-eye pixels 11R are respectively repeatedly arranged in the x-axis direction. In a lenticular lens 11b, a plurality of cylindrical lenses S are arranged in the x-axis direction at predetermined intervals. The cylindrical lenses S have a lens effect only for the x-axis direction. The direction in which the lens effect is present coincides with the direction in which the left-eye pixels 11L and the right-eye pixels 11R are repeatedly arranged. As a result, the cylindrical lenses S act as an optical unit capable of splitting light emitted from the left-eye pixels 11L and light emitted from the right-eye pixels 11R in mutually-different directions. In this way, an image displayed by the left-eye pixels 11L and an image displayed by the right-eye pixels 11R can be split in mutually-different directions. It is preferable that the focal distance of this cylindrical lens S is set to a distance between the cylindrical lenses S and pixels. Here, the focal distance is assumed to be set to a distance between a principal point of the cylindrical lenses S and, that is the apex of the lenses, and a pixel face, that is, a face on which the left-eye pixels 11L or the right-eye pixels 11R are arranged.

The appearance of light that is emitted from the naked-eye stereoscopic display 11 having the configuration described above and is incident to the eyes of an observer will be described using captured images captured using a virtual camera. FIG. 8 is an explanatory diagram that illustrates an example of the arrangement of the virtual camera. FIG. 8 is a perspective view that illustrates an example of the arrangement of the virtual camera 80 that captures light output from the naked-eye stereoscopic display 11 illustrated in FIG. 2A.

As illustrated in FIG. 8, the virtual camera 80 is arranged at a position at which the display face of the naked-eye stereoscopic display 11 is captured. For example, the virtual camera 80 is assumed to be a general camera. The virtual camera 80 is positioned on the upper side in the y11-axis direction with respect to the naked-eye stereoscopic display 11 and is in-focus near the display face of the display panel 11*a*.

Figure 9:
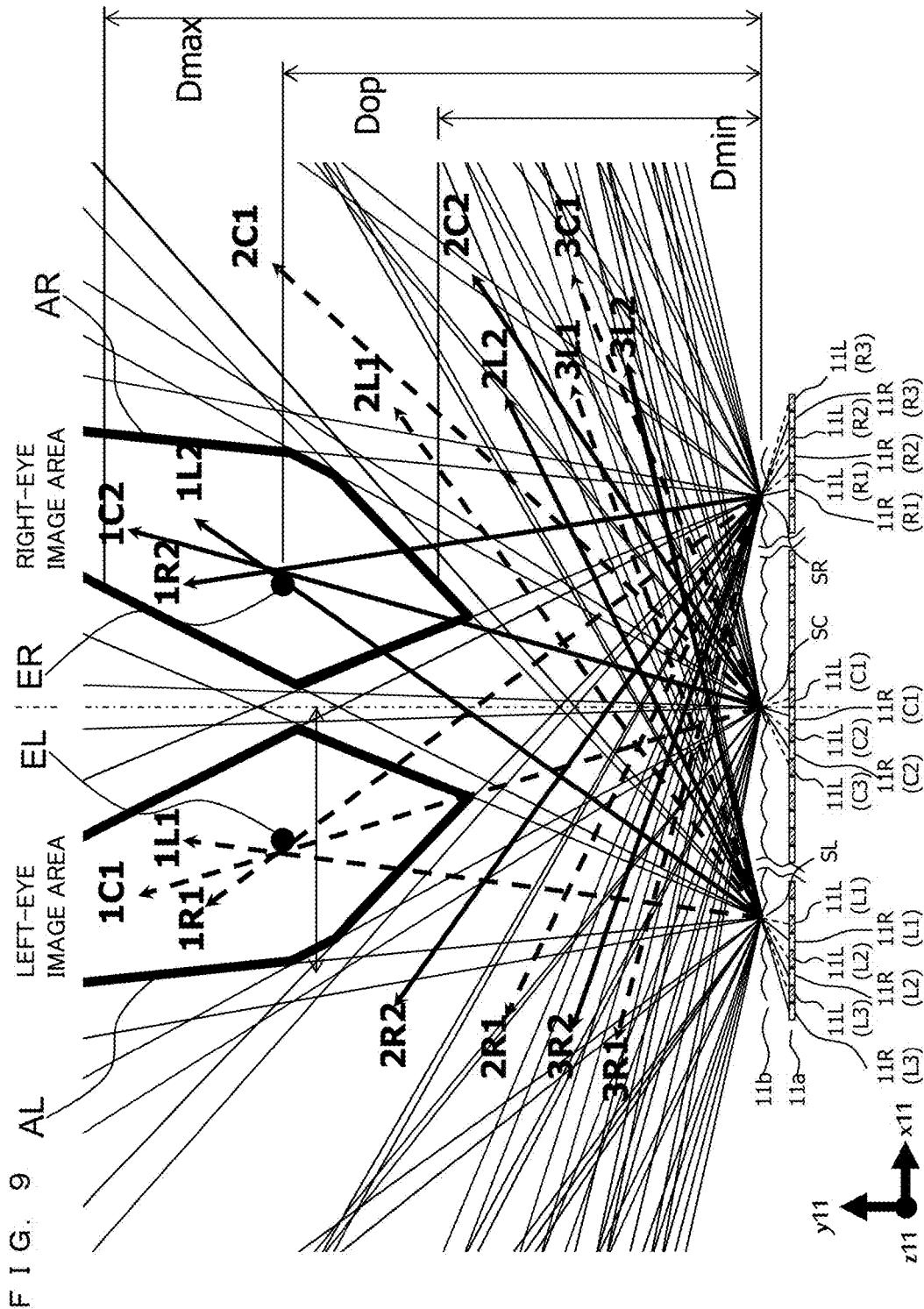
FIG. 9 is a diagram of optical paths that illustrates a stereoscopic viewing area formed when a lenticular lens is used in a naked-eye stereoscopic display.

FIG. 9 is a diagram of optical paths that illustrates a stereoscopic viewing area formed when the lenticular lens 11*b* is used as an optical unit of the naked-eye stereoscopic display 11.

In the display panel 11*a*, left-eye pixels 11L(L1) to 11L(L3), 11L(C1) to 11L(C3), and 11L(R1) to 11L(R3) and right-eye pixels 11R(L1) to 11R(L3), 11R(C1) to 11R(C2), and 11R(R1) to 11R(R3) are sequentially arranged in the x11-axis direction.

Optical paths 1L1, 2L1, and 3L1 illustrated in FIG. 9 represent optical paths of light that exits from the left-eye pixels 11L(L1) to 11L(L3) and is refracted by a cylindrical lens SL. Optical paths 1L2, 2L2, and 3L2 represent optical paths of light that exits from the right-eye pixels 11R(L1) to 11R(L3) and is refracted by the cylindrical lens SL. In addition, optical paths 1C1, 2C1, and 3C1 of light that exits from the left-eye pixels 11L(C1) to 11L(C3) and is refracted by a cylindrical lens SC. Optical paths 1C2 and 2C2 represent optical paths of light that exits from the right-eye pixels 11R(C1) to 11R(C2) and is refracted by the cylindrical lens SC. Similarly, optical paths 1R1, 2R1, and 3R1 of light that exits from the left-eye pixels 11L(R1) to 11L(R3) and is refracted by a cylindrical lens SR. Optical paths 1R2, 2R2, and 3R2 represent optical paths of light that exits from the right-eye pixels 11R(R1) to 11R(R3) and is refracted by the cylindrical lens SR.

Here, actual light traveling through an optical path has a width of a predetermined angle in a clockwise direction or a counterclockwise direction with respect to such an optical path. In an area including a point at which the optical paths 1L1, 1C1, and 1R1 intersect with each other, a left-eye image area AL is formed. In an area including a point at which the optical paths 1L2, 1C2, and 1R2 intersect with each other, a right-eye image area AR is formed. The left-eye image area AL and the right-eye image area AR form a stereoscopic visual recognition range in which stereoscopic viewing can be made. An observer can correctly visually recognize a stereoscopic image when the position EL of the left eye is in the left-eye image area AL, and the position ER of the right eye is in the right-eye image area AR.

A distance between a position at which the stereoscopic visual recognition range is maximal (in other words, a distance between the left-eye image area AL and the right-eye image area AR in the x11-axis is maximal) and the position of the lenticular lens 11*b* is set as an optimal stereoscopic visual recognition distance (Dop). The position EL of the left eye and the position ER of the right eye move from the optimal stereoscopic visual recognition distance (Dop) in the y11-axis direction and are located at positions intersecting with the left-eye image area AL and the right-eye image area AR, and distances thereof from the position of the lenticular lens 11*b* will be set as a maximum stereoscopic visual recognition distance (Dmax) and a minimum stereoscopic visual recognition distance (Dmin).

Here, when focusing on the cylindrical lens SL, light contributing to the formation of the left-eye image area AL and the right-eye image area AR is only light (1L1 and 1L2) exiting from a left-eye pixel 11L(L1) and a right-eye pixel 11R(L1). These will be defined as primary light. In addition, light (2L1 and 2L2) that exits from a left-eye pixel 11L(L2) or a right-eye pixel 11R(L2) that is an adjacent pixel of the left-eye pixel 11L(L1) or the right-eye pixel 11R(L1) and is refracted by the cylindrical lens SL will be defined as secondary light. Similarly, light (3L1 and 3L2) exiting from a left-eye pixel 11L(L3) that is adjacent to the left-eye pixel 11L(L1) with the left-eye pixel 11L(L2) interposed therebetween or a right-eye pixel 11R(L3) that is adjacent to the right-eye pixel 11R(L1) with the right-eye pixel 11R(L2) interposed therebetween and being refracted by the cylindrical lens SL will be defined as third-order light. Also for light relating to the cylindrical lens SC or SR, similarly, primary light contributes to the formation of the left-eye image area AL and the right-eye image area AR.

As can be understood from the diagram of optical paths illustrated in FIG. 9, when a gap between the observer and the lenticular lens 11*b* is shorter than a minimum stereoscopic visual recognition distance Dmin, the influences of high-order light such as secondary light or third-order light exiting from the left or right side of the display panel 11*a* are actualized.

Figure 10:
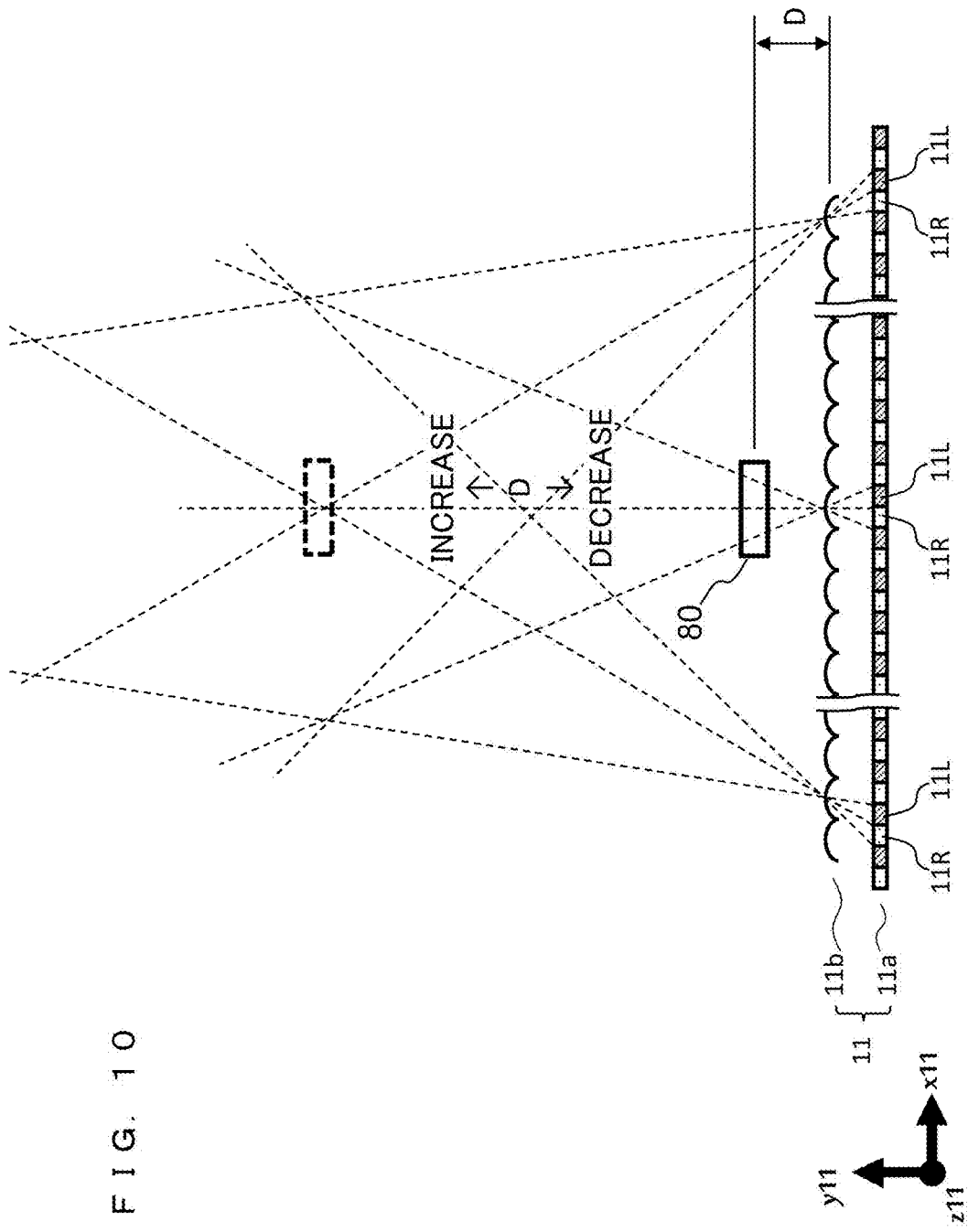
FIG. 10 is an explanatory diagram that illustrates a positional relation between a virtual camera and a naked-eye stereoscopic display.
Figure 12:
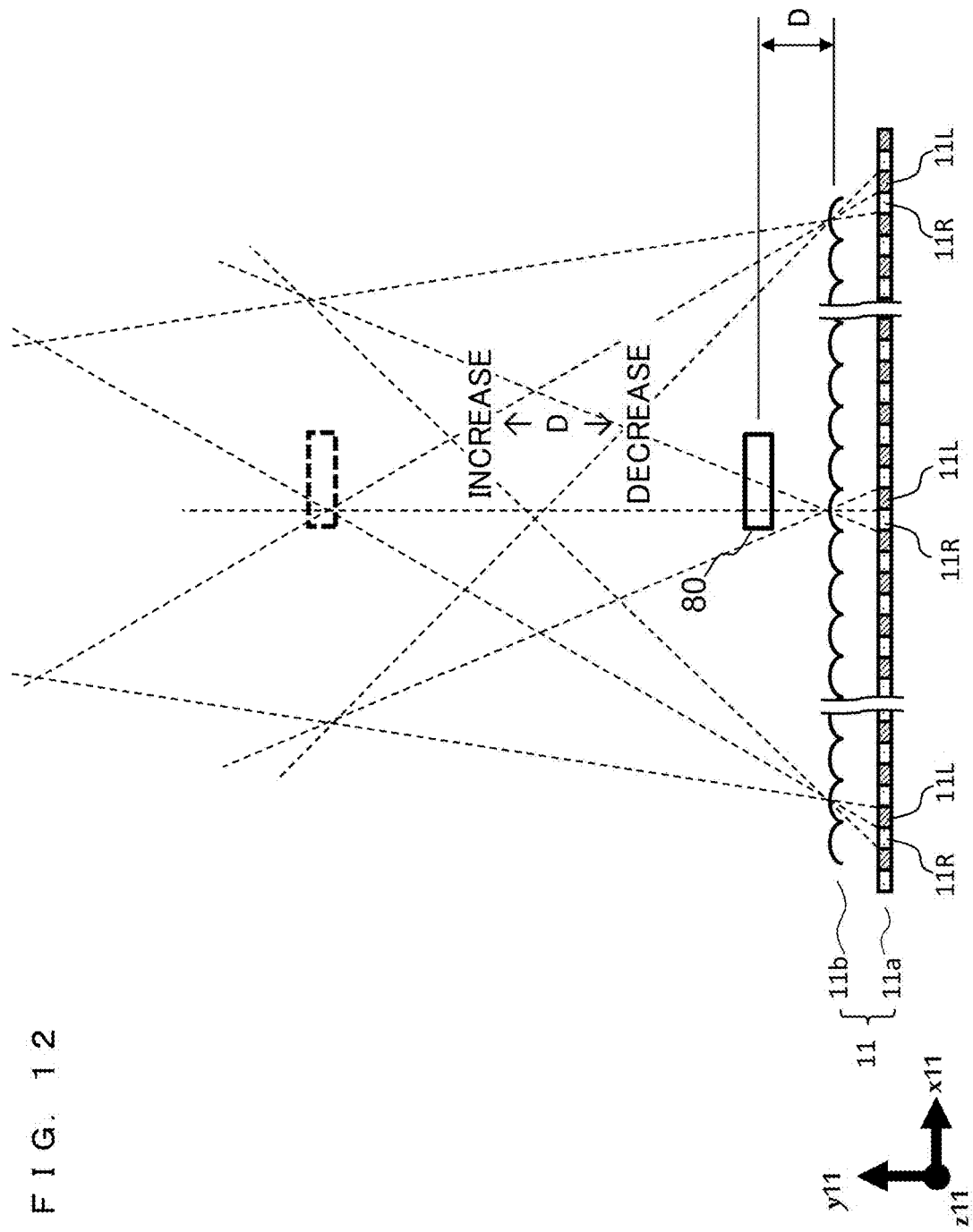
FIG. 12 is an explanatory diagram that illustrates a positional relation between a virtual camera and a naked-eye stereoscopic display.
Figure 13:
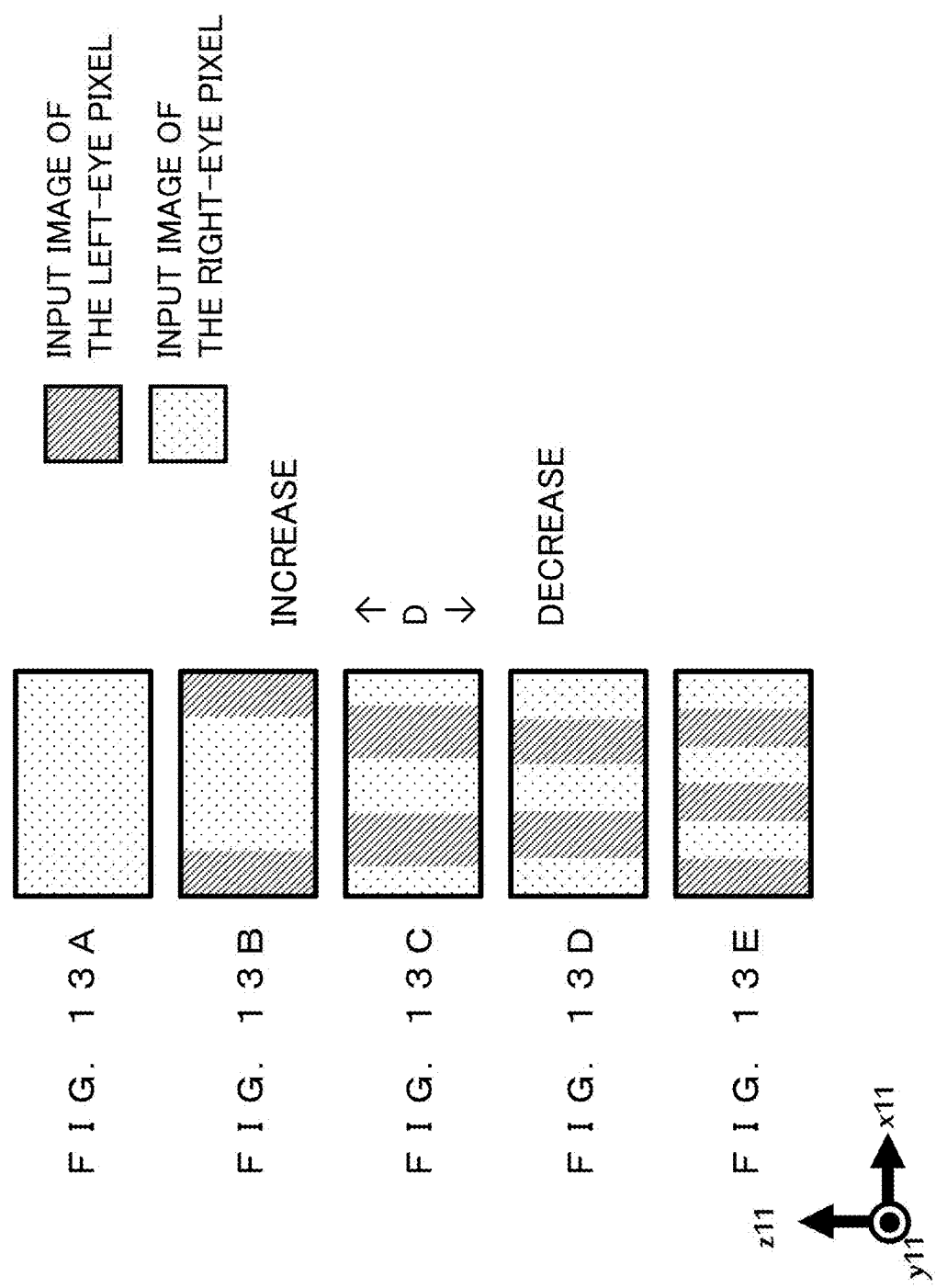
FIGS. 13A to 13E are explanatory diagrams that illustrate images captured by a virtual camera.
Figure 15:
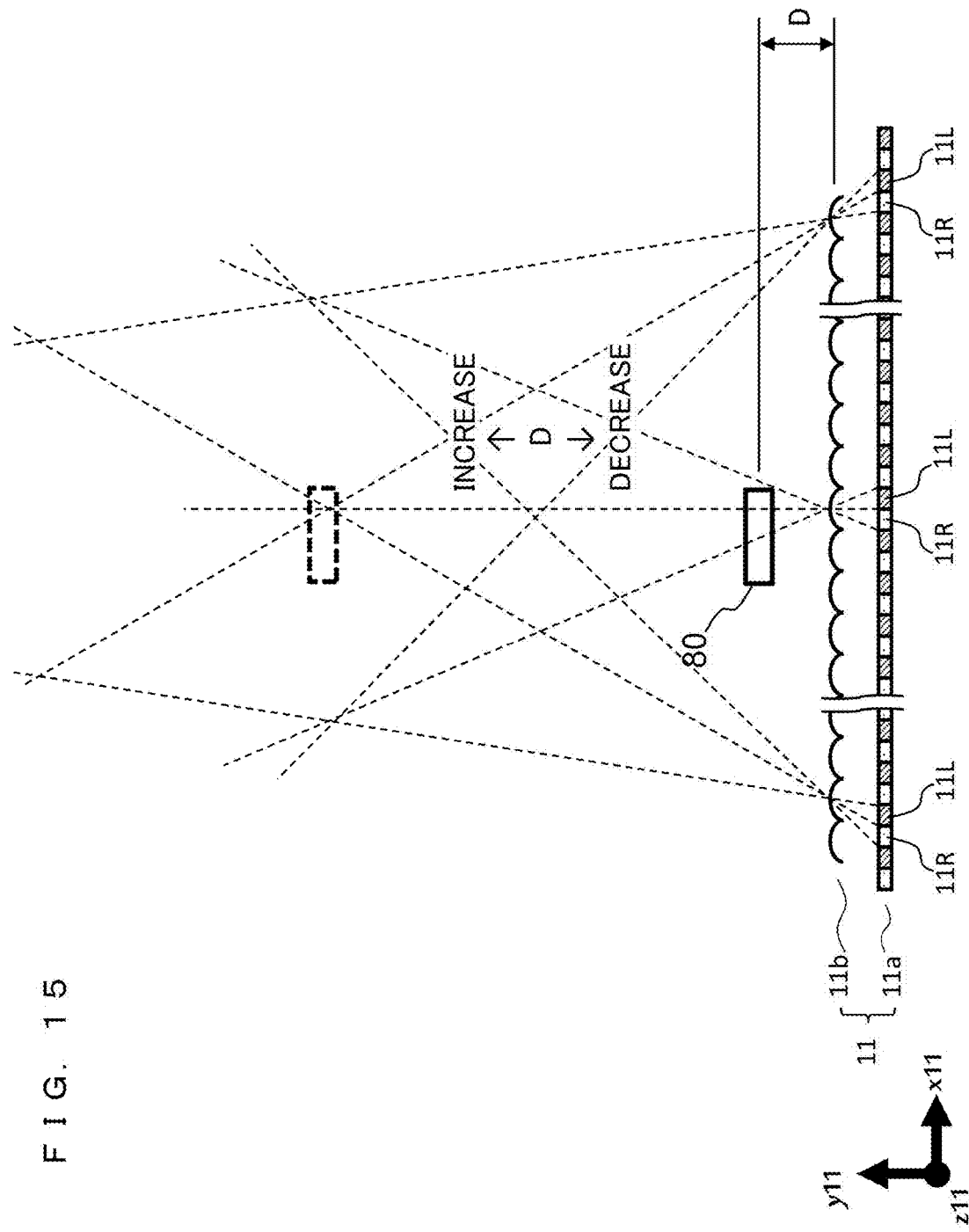
FIG. 15 is an explanatory diagram that illustrates a positional relation between a virtual camera and a naked-eye stereoscopic display.

Next, a captured image acquired when a gap D between the virtual camera 80 and the lenticular lens 11*b* is changed will be described. In FIGS. 10, 12, and 15 to be described later, for easy understanding of optical paths, only optical paths of primary light are illustrated.

Figure 11:
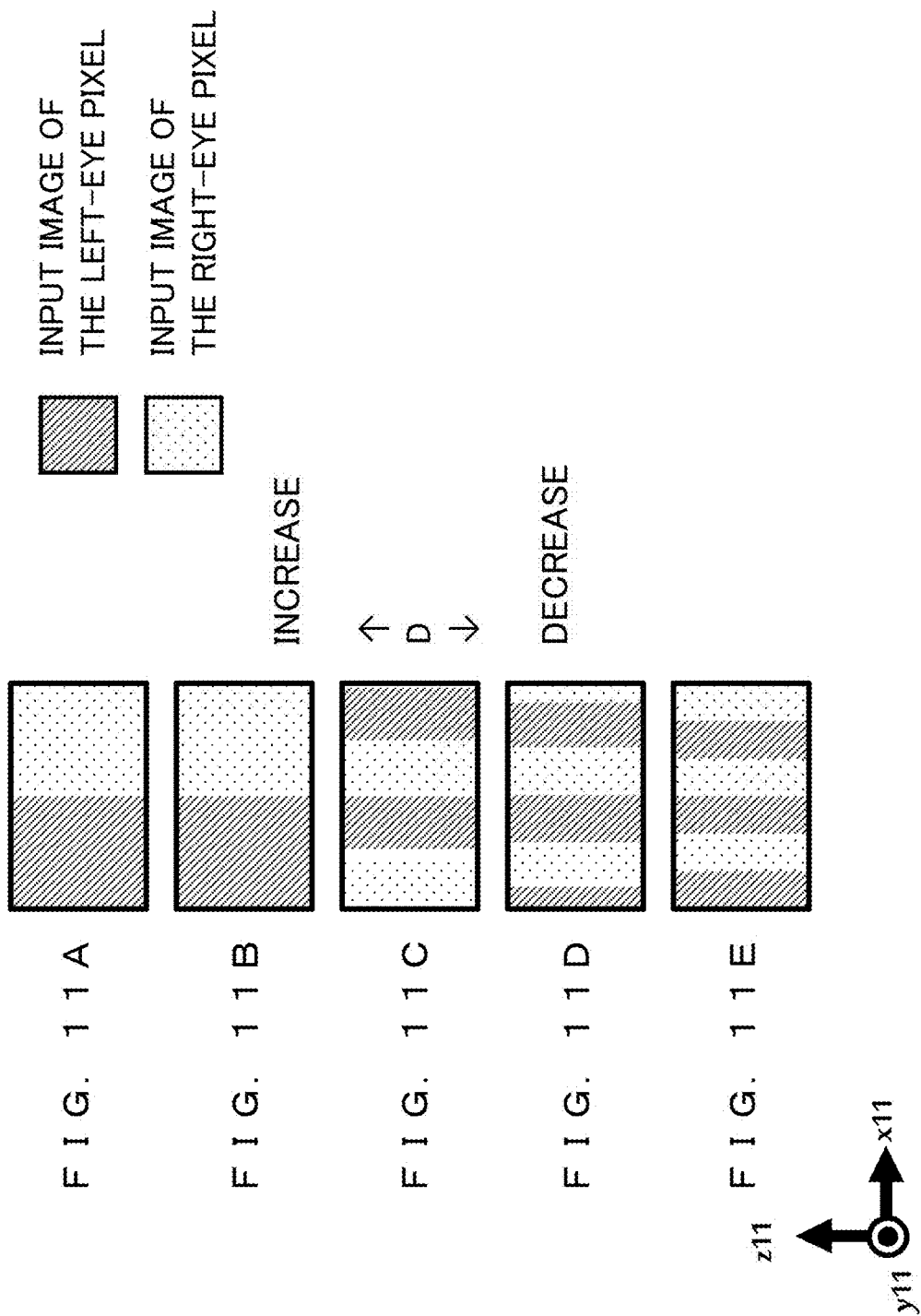
FIGS. 11A to 11E are explanatory diagrams that illustrate images captured by a virtual camera.

FIG. 10 is an explanatory diagram that illustrates a positional relation between the virtual camera 80 and the naked-eye stereoscopic display 11. FIGS. 11A to 11E are explanatory diagrams that illustrate images captured by the virtual camera 80. FIG. 10 illustrates a case where the virtual camera 80 is arranged on a center line of the naked-eye stereoscopic display 11, and a gap D between the virtual camera 80 and the lenticular lens 11*b* is changed. FIGS. 11A to 11E illustrate a correspondence relation between a gap between the lenticular lens 11*b* and the virtual camera 80 and a captured image in the configuration illustrated in FIG. 10. In a case where the gap D between the virtual camera 80 and the lenticular lens 11*b* is changed, when the gap D is near the optimal stereoscopic visual recognition distance Dop, as illustrated in FIGS. 11A and 11B, in each image captured by the virtual camera 80, the left side is an input image of the left-eye pixel 11L, and the right side is an input image of the right-eye pixel 11R. In contrast to this, when the gap D is gradually decreased (for example, about ⅓ of the optimal stereoscopic visual recognition distance Dop), as illustrated in FIG. 11C, according to the influence of secondary light, an input image of the right-eye pixel 11R appears on the left side of the captured image, and an input image of the left-eye pixel 11L appears on the right side. Furthermore, when the gap D is further decreased (for example, about ¼ of the optimal stereoscopic visual recognition distance Dop), as illustrated in FIGS. 11D and 11E, according to the influence of third-order light, an input image of the left-eye pixel 11L appears on the left side of a captured image, and an input image of the right-eye pixel 11R appears on the right side. In other words, as the gap D between the virtual camera 80 and the lenticular lens 11*b* is decreased relative to the optimal stereoscopic visual recognition distance Dop, according to the influences of high-order light such as secondary light or third-order light, in a captured image, an input image of the left-eye pixel 11L and an input image of the right-eye pixel 11R are repeated.

FIG. 12 is an explanatory diagram that illustrates a positional relation between the virtual camera 80 and the naked-eye stereoscopic display 11. FIGS. 13A to 13E are explanatory diagrams that illustrate images captured by the virtual camera 80. FIG. 12 is an example of a case where the virtual camera 80 is arranged to be shifted to the right side (the right-eye side) with respect to the center line of the naked-eye stereoscopic display 11, and the gap D between the virtual camera 80 and the lenticular lens 11*b* is changed.

In other words, the virtual camera 80 is arranged such that the center line of the virtual camera 80 overlaps a right-eye pixel 11R disposed on the right side of a left-eye pixel 11L disposed at the center of the display panel 11a. FIGS. 13A to 13E are diagrams that illustrate a correspondence relation between a gap between the lenticular lens 11b and the virtual camera 80 and a captured image in the configuration illustrated in FIG. 12. In this case, when the gap D is near the optimal stereoscopic visual recognition distance Dop, as illustrated in FIG. 13A, an image captured by the virtual camera 80 is only an input image of the right-eye pixel 11R. In addition, when the gap D is decreased and is about ½ of the optimal stereoscopic visual recognition distance Dop, as illustrated in FIG. 13B, an input image of the left-eye pixel 11L appears on both sides of a captured image. Furthermore, when the gap D is decreased and is about ⅓ to ¼ of the optimal stereoscopic visual recognition distance Dop, as illustrated in FIGS. 13C and 13D, according to the influence of secondary light, an input image of the right-eye pixel 11R appears on both sides of a captured image. In addition, when the gap D is further decreased and is ¼ of the optimal stereoscopic visual recognition distance Dop or less, as illustrated in FIG. 13E, according to the influence of third-order light, an input image of the left-eye pixel 11L appears on the left side of a captured image.

The reason for the formation of the captured images as illustrated in FIGS. 11A to 13E is that the captured images are formed by mixing primary light configuring a main lobe that is a stereoscopic viewing area of a front face including a normal line passing through the center of the display surface of the naked-eye stereoscopic display 11 and high-order light configuring another lobe (side lobe) that is a stereoscopic viewing area of the outer side in the x11-axis direction with respect to the main lobe. FIG. 14 is a diagram that illustrates the configurations of the captured images illustrated in FIGS. 13A to 13E. For example, as illustrated in FIG. 14, an input image of the right-eye pixel 11R is captured according to the primary light configuring main lobe regardless of the gap D between the virtual camera 80 and the lenticular lens 11b. As the gap D is decreased, according to the influence of high-order light configuring another lobe, an input image of the left-eye pixel 11L is captured more. As a result, in a case where the gap D is the optimal stereoscopic visual recognition distance Dop (for example, 600 mm), the captured image is only an input image of the right-eye pixel 11R according to the primary light configuring the main lobe. In addition, in a case where the gap D is 0.5×Dop (for example, 300 mm), the captured image is an image acquired by composing an input image of the right-eye pixel 11R according to primary light configuring a main lobe and input images of the left-eye pixel 11L of both sides according to high-order light configuring another lobe. The captured image has a configuration in which the input image of the right-eye pixel 11R is arranged at the center, and the input images of the left-eye pixel 11L are arranged on both sides thereof. Furthermore, in a case where the gap D is 0.33×Dop (for example, 200 mm) or 0.28×Dop (for example, 170 mm), an input image of the left-eye pixel 11L according to high-order light configuring another lobe comes near the center. For this reason, in the captured image, the input image of the right-eye pixel 11R is arranged at the center, and the input image of the left-eye pixel 11L is arranged on both outer sides thereof. Furthermore, the captured image has a configuration in which an input image of the right-eye pixel 11R is arranged on both outer sides. In addition, in a case where the gap D is 0.23×Dop (for example, 140 mm), an input image of the left-eye pixel 11L according to high-order light configuring another lobe further comes near the center, and an input image of the left-eye pixel 11L appears on a further outer side. For this reason, the captured image has a configuration in which an input image of the left-eye pixel 11L and an input image of the right-eye pixel 11R are repeatedly arranged three times.

FIG. 15 is an explanatory diagram that illustrates a positional relation between the virtual camera 80 and the naked-eye stereoscopic display 11. FIGS. 16A to 16E are explanatory diagrams that illustrate images captured by the virtual camera 80. FIG. 15 is an example of a case where the virtual camera 80 is arranged to be shifted to the left side (the left-eye side) with respect to the center line of the naked-eye stereoscopic display 11, and the gap D between the virtual camera 80 and the lenticular lens 11b is changed. In other words, the virtual camera 80 is arranged such that the center line of the virtual camera 80 overlaps a left-eye pixel 11L disposed on the left side of a right-eye pixel 11R disposed at the center of the display panel 11a. FIGS. 16A to 16E are diagrams that illustrate a correspondence relation between a gap between the lenticular lens 11b and the virtual camera 80 and a captured image in the configuration illustrated in FIG. 15. In this case, when the gap D is near the optimal stereoscopic visual recognition distance Dop, as illustrated in FIG. 16A, an image captured by the virtual camera 80 is only an input image of the left-eye pixel 11L. In addition, when the gap D is decreased and is about ½ of the optimal stereoscopic visual recognition distance Dop, as illustrated in FIG. 16B, an input image of the right-eye pixel 11R appears on both sides of a captured image. Furthermore, when the gap D is decreased and is about ⅓ to ¼ of the optimal stereoscopic visual recognition distance Dop, as illustrated in FIGS. 16C and 16D, according to the influence of secondary light, an input image of the left-eye pixel 11L appears on both sides of a captured image. In addition, when the gap D is further decreased and is ¼ of the optimal stereoscopic visual recognition distance Dop or less, as illustrated in FIG. 16E, according to the influence of third-order light, an input image of the right-eye pixel 11R appears on the left side of a captured image.

FIG. 17 is a diagram that illustrates the configurations of the captured images illustrated in FIGS. 16A to 16E. As illustrated in FIG. 17, an input image of the left-eye pixel 11L is captured by the virtual camera 80 in accordance with primary light configuring a main lobe regardless of the gap D between the virtual camera 80 and the lenticular lens 11b. As the gap D is decreased, according to the influence of high-order light configuring another lobe, an input image of the right-eye pixel 11R is captured more. As a result, a captured image has a configuration in which an input image of the left-eye pixel 11L illustrated in FIG. 14 and an input image of the right-eye pixel 11R are interchanged.

In other words, when the gap D between the virtual camera 80 and the lenticular lens 11b is decreased, according to the influence of high-order light, a captured image has a configuration in which an input image of the left-eye pixel 11L and an input image of the right-eye pixel 11R are repeatedly arranged. Accordingly, when the position of the virtual camera 80 deviates from the center line of the naked-eye stereoscopic display 11, an image according to primary light configuring a main lobe in accordance with the deviation and an image according to high-order light configuring another lobe are changed.

Next, as illustrated in FIG. 7, a floating image in the air that is viewed by an observer in a case where the spatial image forming device 12 is arranged to be combined with the naked-eye stereoscopic display 11 will be described. FIGS. 18A to 18C are schematic diagrams that illustrate a relation between a stereoscopic image recognized by an observer and input images. One example of an input image of a jumping-out parallax given so as to allow an observer to recognize a displayed object to jump out is illustrated in FIG. 18C. As illustrated in FIG. 18C, in the input image of the jumping-out parallax, a circular object 71 is arranged on a slight right side of the center in the left-eye pixel 11L of the display panel 11a, and the circular object 71 is arranged on a slight left side of the center in the right-eye pixel 11R. The input image illustrated in FIG. 18C is displayed on the naked-eye stereoscopic display. In a case where the left eye EL and the right eye ER of the observer are in the stereoscopic visual recognition range (not illustrated in the drawing) of the naked-eye stereoscopic display 11, as illustrated in FIG. 18A, the observer recognizes a stereoscopic image like the circular object 71 jumping out in the air from the screen surface of the naked-eye stereoscopic display 11. However, in the combination of the naked-eye stereoscopic display 11 and the spatial image forming device 12 illustrated in FIG. 7, as illustrated in FIG. 18B, a stereoscopic image recognized by an observer is visually recognized as if the circular object is located at an inner position with respect to the screen surface of the naked-eye stereoscopic display 11 that is spatially formed. So-called reverse viewing occurs.

Figure 19:
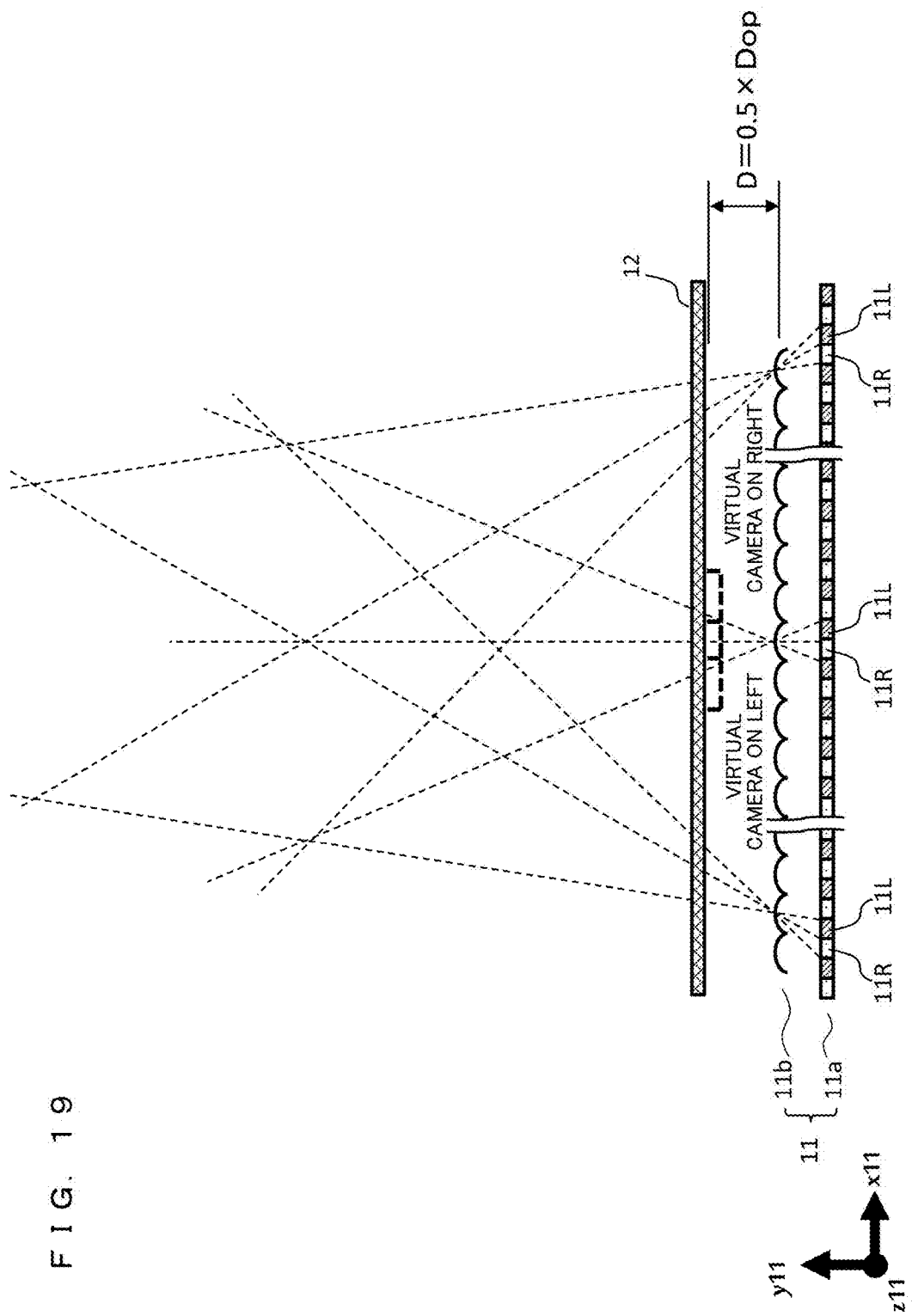
FIG. 19 is a diagram that illustrates reverse viewing in a combination of the naked-eye stereoscopic display and a spatial image forming device illustrated in FIG. 7.

FIGS. 19 and 20 are diagrams that illustrate reverse viewing in a combination of the naked-eye stereoscopic display 11 and the spatial image forming device 12 illustrated in FIG. 7. As illustrated in FIG. 19, in a case where the spatial image forming device 12 is arranged at the position of D=0.5×Dop, an image captured by a virtual camera that is virtually arranged at the position of the spatial image forming device 12 is an image as illustrated in FIG. 20A based on the results illustrated in FIGS. 14 and 17. Here, the spatial image forming device 12 is a reflection optical system, and light rays exiting from the spatial image forming device 12 are in a same direction as the incidence direction. Accordingly, the left side and the right side of an image viewed by an observer are interchanged. As a result, the image viewed by the observer is as illustrated in FIG. 20B. Accordingly, an input image of the right-eye pixel 11R is arranged at the center of an image that is visually recognized by the left eye, and an input image of the left-eye pixel 11L is arranged at the center of an image that is visually recognized by the right eye. In other words, a jumping-out parallax becomes a depth parallax.

As above, according to an examination of the inventors of the present application, in the combination of the naked-eye stereoscopic display 11 and the spatial image forming device 12 illustrated in FIG. 7, it has been determined that reverse viewing occurs at the center of an image viewed by an observer.

Figure 21A:
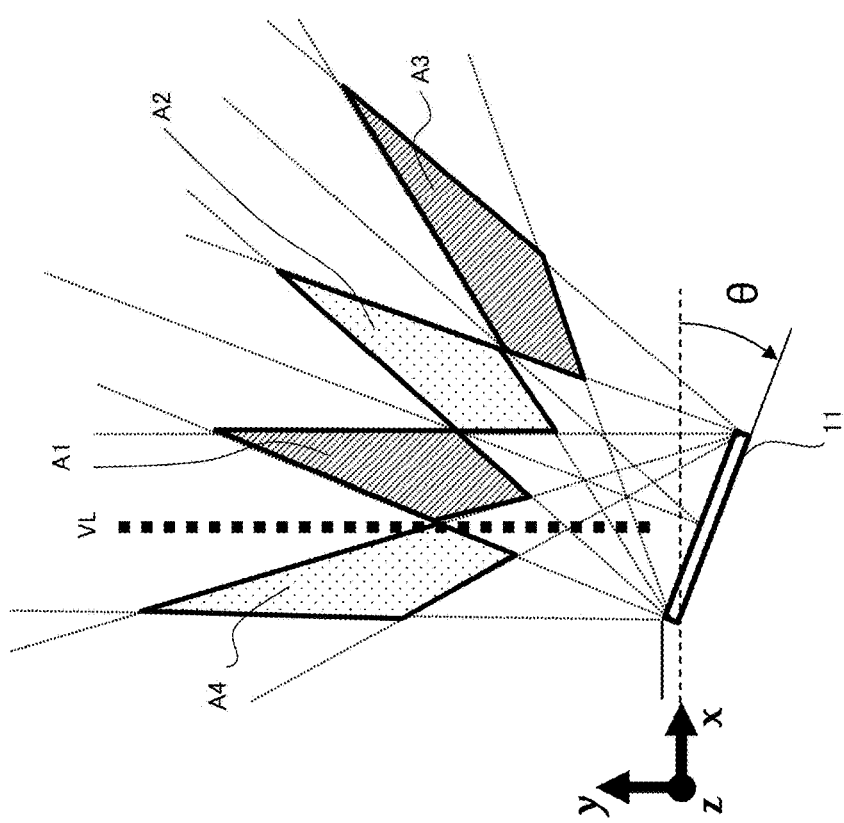
FIGS. 21A and 21B are diagrams of optical paths that illustrate stereoscopic viewing areas of a naked-eye stereoscopic display used for a stereoscopic display apparatus.
Figure 21B:
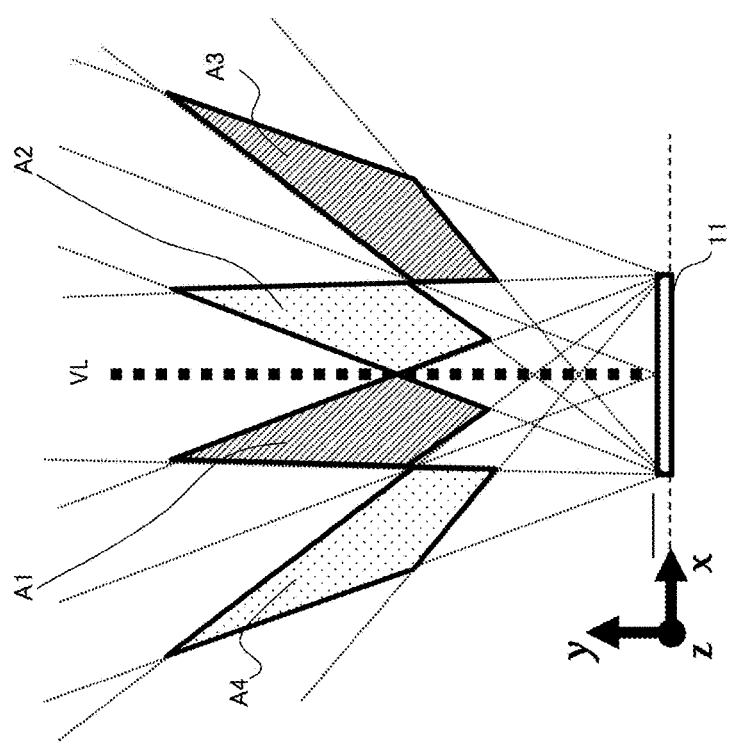

Next, in the case of the stereoscopic display apparatus 1 according to this embodiment, a floating image in the air that is viewed by an observer will be described. FIGS. 21A and 21B are diagrams of optical paths that illustrate stereoscopic viewing areas of the naked-eye stereoscopic display 11 used for the stereoscopic display apparatus 1. FIGS. 21A and 21B are diagrams similar to FIG. 9. In FIGS. 21A and 21B, for the simplification of drawings, the lenticular lens, the left-eye pixel, the right-eye pixel, and the like are not illustrated. Instead thereof, in FIGS. 21A and 21B, a virtual line VL, a first area A1 (left-eye image area AL) and a second area A2 (right-eye image area AR) in which primary light are dominant, and a third area A3 and a fourth area A4 in which secondary light is dominant are illustrated. The virtual line VL is a virtual line that joins the naked-eye stereoscopic display 11 and the spatial image forming device 12. The virtual line VL illustrated in FIGS. 21A and 21B are set to be in parallel with the y axis.

Here, the third area A3 and the fourth area A4 illustrated in FIGS. 21A and 21B will be described with reference to FIG. 22. FIG. 22 is a diagram of optical paths that illustrates a stereoscopic viewing area formed in the stereoscopic display apparatus 1. FIG. 22 is a diagram that is similar to FIG. 9. A first area A1 is formed in an area including a point at which primary light (1L1, 1C1, and 1R1) exiting from the left-eye pixel 11L intersect with each other and is the same as the left-eye image area AL illustrated in FIG. 9. A second area A2 is formed in an area including a point at which primary light (1L2, 1C2, and 1R2) exiting from the right-eye pixel 11R intersect with each other and is the same as the right-eye image area AR illustrated in FIG. 9. A third area A3 is formed in an area including a point at which secondary light (2L1, 2C1, and 2R1) exiting from the left-eye pixel 11L intersect with each other and is an area into which an input image of the left-eye pixel 11L is projected. A fourth area A4 is formed in an area including a point at which secondary light (2L2, 2C2, and 2R2) exiting from the right-eye pixel 11R intersect with each other and is an area into which an input image of the right-eye pixel 11R is projected. As illustrated in FIG. 22, on the outside of the first area A1 and the second area A2 in which primary light is dominant, the third area A3 and the fourth area A4 in which secondary light is dominant are present as areas into which an input image of the left-eye pixel 11L and an input image of the right-eye pixel 11R are projected. For the simplification of the drawings, while not illustrated in the drawing, on the outside of the third area A3 and the fourth area A4, areas into which an input image of the left-eye pixel 11L and an input image of the right-eye pixel 11R in which third-order light and further higher-order light are dominant are projected are present.

FIG. 21A is a diagram of optical paths that illustrates a stereoscopic viewing area formed when the naked-eye stereoscopic display 11 is installed horizontally to the xz plane as illustrated in FIG. 7. In this case, the first area A1 (an image projected by the left-eye pixel 11L) is positioned on the left side of the virtual line VL, and the second area A2 (an image projected by the right-eye pixel 11R) is positioned on the right side of the virtual line VL. FIG. 21B is a diagram of optical paths that illustrates a stereoscopic viewing area formed when the naked-eye stereoscopic display 11 is installed to be inclined by an angle θ in the x-axis direction with respect to the xz plane Pxz as illustrated in FIG. 1. As illustrated in FIG. 21B, in a case where the naked-eye stereoscopic display 11 is inclined by the angle θ in the x-axis direction, the fourth area A4 (an image projected by the right-eye pixel 11R) is positioned on the left side of the virtual line VL, and the first area A1 (an image projected by the left-eye pixel 11L) is positioned on the right side of the virtual line VL. Comparing FIGS. 21A and 21B with each other, a relation between the image projected by the left-eye pixel 11L and the image projected by the right-eye pixel 11R with the virtual line VL interposed therebetween is horizontally interchanged.

Figure 24A:
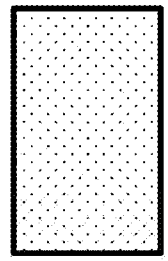
FIGS. 24A to 24E are explanatory diagrams that illustrate images captured by a virtual camera.
Figure 24B:
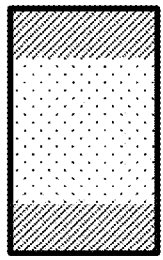
Figure 24C:
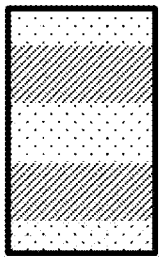
Figure 24D:
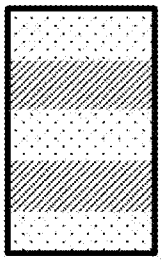
Figure 24E:
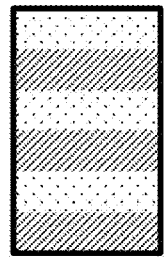

Next, in order to describe an image that is visually recognized by an observer, a virtual camera will be used in the description. FIG. 23 is an explanatory diagram that illustrates a positional relation between the virtual camera 80 and the naked-eye stereoscopic display 11. FIG. 23 is an example of a case where the virtual camera 80 is arranged to be shifted to the left side (left-eye side) with respect to the virtual line VL of the naked-eye stereoscopic display 11 illustrated in FIG. 21B, and a gap D between the virtual camera 80 and the lenticular lens 11b is changed. For the simplification of description, while the naked-eye stereoscopic display 11 illustrated in the drawing is not inclined, the x11 axis illustrated in FIG. 23 is inclined by an angle θ in the clockwise direction with respect to the x axis illustrated in FIG. 21B. Accordingly, the virtual line VL illustrated in FIG. 23 is the same as the virtual line VL illustrated in FIG. 21B. FIGS. 24A to 24E are explanatory diagrams that illustrate images captured by the virtual camera. FIGS. 24A to 24E are diagrams that illustrate a correspondence relation between a gap between the lenticular lens 11b and the virtual camera 80 and a captured image in the configuration illustrated in FIG. 23. As illustrated in FIG. 24A, when the gap D is near the optimal stereoscopic visual recognition distance Dop, an image captured by the virtual camera 80 is only an input image of the right-eye pixel 11R. In addition, when the gap D is decreased and is about ½ of the optimal stereoscopic visual recognition distance Dop, as illustrated in FIG. 24B, an input image of the left-eye pixel 11L appears on both sides of a captured image. Furthermore, when the gap D is decreased and is about ⅓ to ¼ of the optimal stereoscopic visual recognition distance Dop, as illustrated in FIGS. 24C and 24D, according to the influence of high-order light, an input image of the right-eye pixel 11R appears on both sides of a captured image. In addition, when the gap D is further decreased and is ¼ of the optimal stereoscopic visual recognition distance Dop or less, as illustrated in FIG. 24E, according to the influence of high-order light, an input image of the left-eye pixel 11L appears on the left side of a captured image.

FIG. 25 is a diagram that illustrates the configurations of the captured images illustrated in FIGS. 24A to 24E. As illustrated in FIG. 25, an input image of the right-eye pixel 11R is captured according to secondary light configuring the fourth area A4 regardless of the gap D between the virtual camera 80 and the lenticular lens 11b. However, as the gap D is decreased, according to the influence of high-order light configuring another lobe, an input image of the left-eye pixel 11L is captured more.

Figure 26:
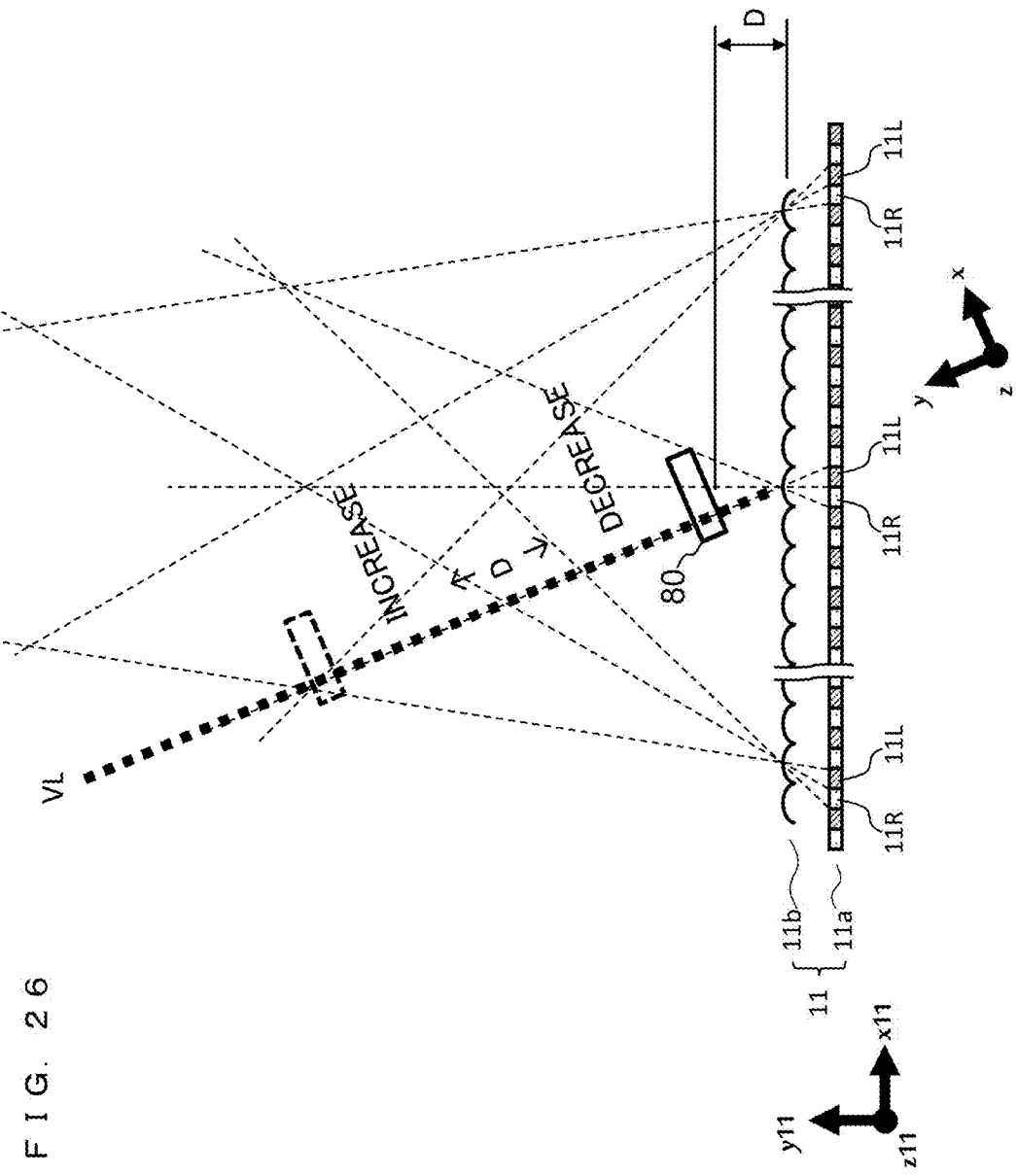
FIG. 26 is an explanatory diagram that illustrates a positional relation between a virtual camera and a naked-eye stereoscopic display.
Figure 27:
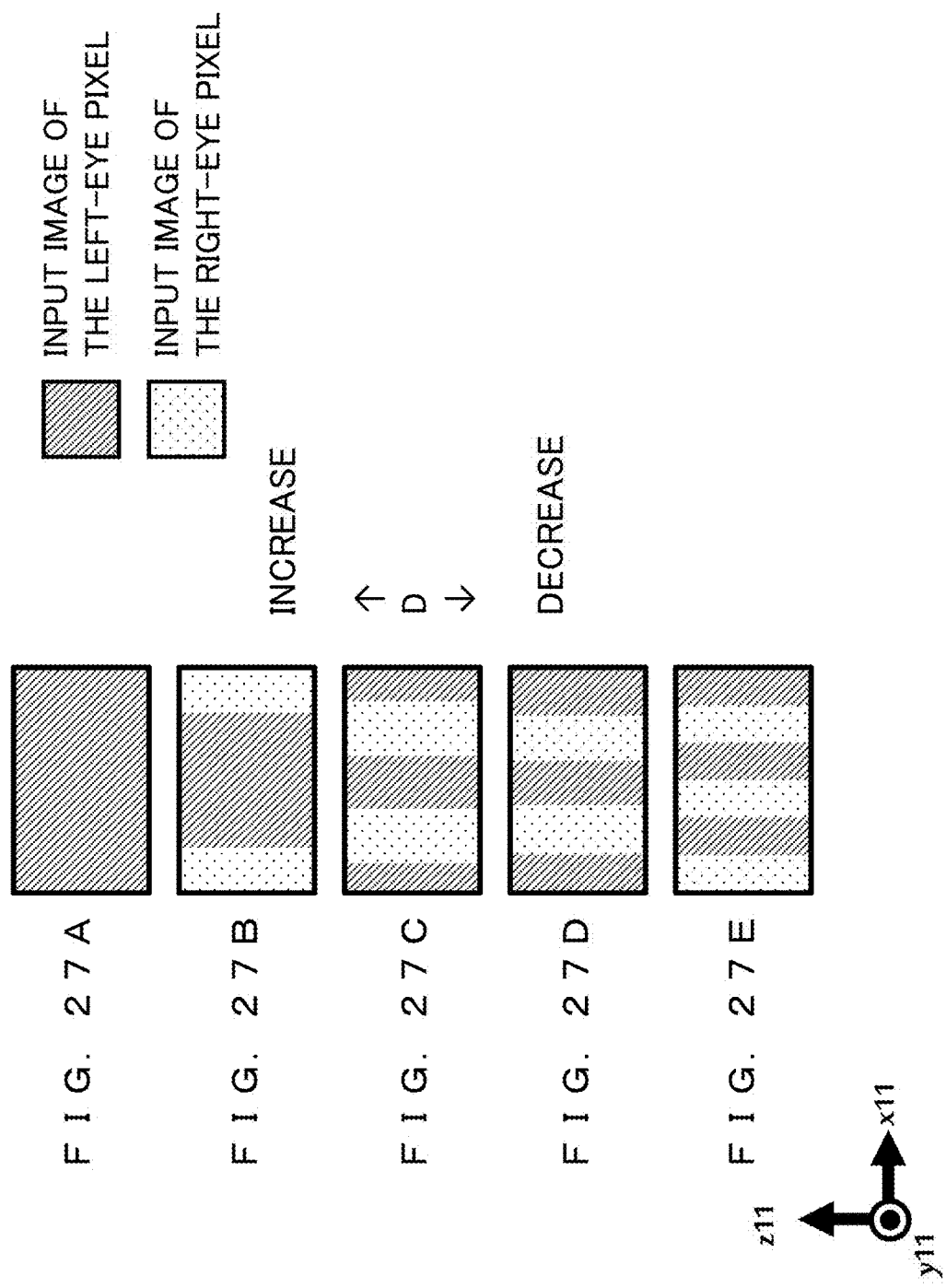
FIGS. 27A to 27E are explanatory diagrams that illustrate images captured by a virtual camera.

FIG. 26 is an explanatory diagram that illustrates a positional relation between the virtual camera and the naked-eye stereoscopic display. FIG. 26 is an example of a case where the virtual camera 80 is arranged to be shifted to the right side (right-eye side) with respect to the direction VL of the naked-eye stereoscopic display 11 illustrated in FIG. 21B, and a gap D between the virtual camera 80 and the lenticular lens 11b is changed. Similar to FIG. 23, the x11 axis is inclined by an angle θ in the clockwise direction with respect to the x axis illustrated in FIG. 21B. Accordingly, a virtual line VL illustrated in FIG. 26 is the same as the virtual line VL illustrated in FIG. 21B. FIGS. 27A to 27E are explanatory diagrams that illustrate images captured by the virtual camera. FIGS. 27A to 27E illustrate a correspondence relation between the gap between the lenticular lens 11b and the virtual camera 80 and a captured image in the configuration illustrated in FIG. 26. As illustrated in FIG. 27A, when the gap D is near the optimal stereoscopic visual recognition distance Dop, an image captured by the virtual camera 80 is only an input image of the left-eye pixel 11L. In addition, when the gap D is decreased and is about ½ of the optimal stereoscopic visual recognition distance Dop, as illustrated in FIG. 27B, an input image of the right-eye pixel 11R appears on both sides of a captured image. Furthermore, when the gap D is decreased and is about ⅓ to ¼ of the optimal stereoscopic visual recognition distance Dop, as illustrated in FIGS. 27C and 27D, according to the influence of secondary light, an input image of the left-eye pixel 11L appears on both sides of a captured image. In addition, when the gap D is further decreased and is ¼ of the optimal stereoscopic visual recognition distance Dop or less, as illustrated in FIG. 27E, according to the influence of high-order light, an input image of the right-eye pixel 11R appears on the left side of a captured image.

FIG. 28 is a diagram that illustrates the configurations of the captured images illustrated in FIGS. 27A to 27E. In this case, as illustrated in FIG. 28, an input image of the left-eye pixel 11L is captured by the virtual camera 80 in accordance with primary light configuring the first area A1 regardless of the gap D between the virtual camera 80 and the lenticular lens 11b. However, as the gap D is decreased, according to the influence of high-order light configuring another lobe, an input image of the right-eye pixel 11R is captured more. As a result, the captured image illustrated in FIG. 28 has a configuration in which an input image of the left-eye pixel 11L and an input image of the right-eye pixel 11R are interchanged with respect to the captured image illustrated in FIG. 25.

Figure 29:
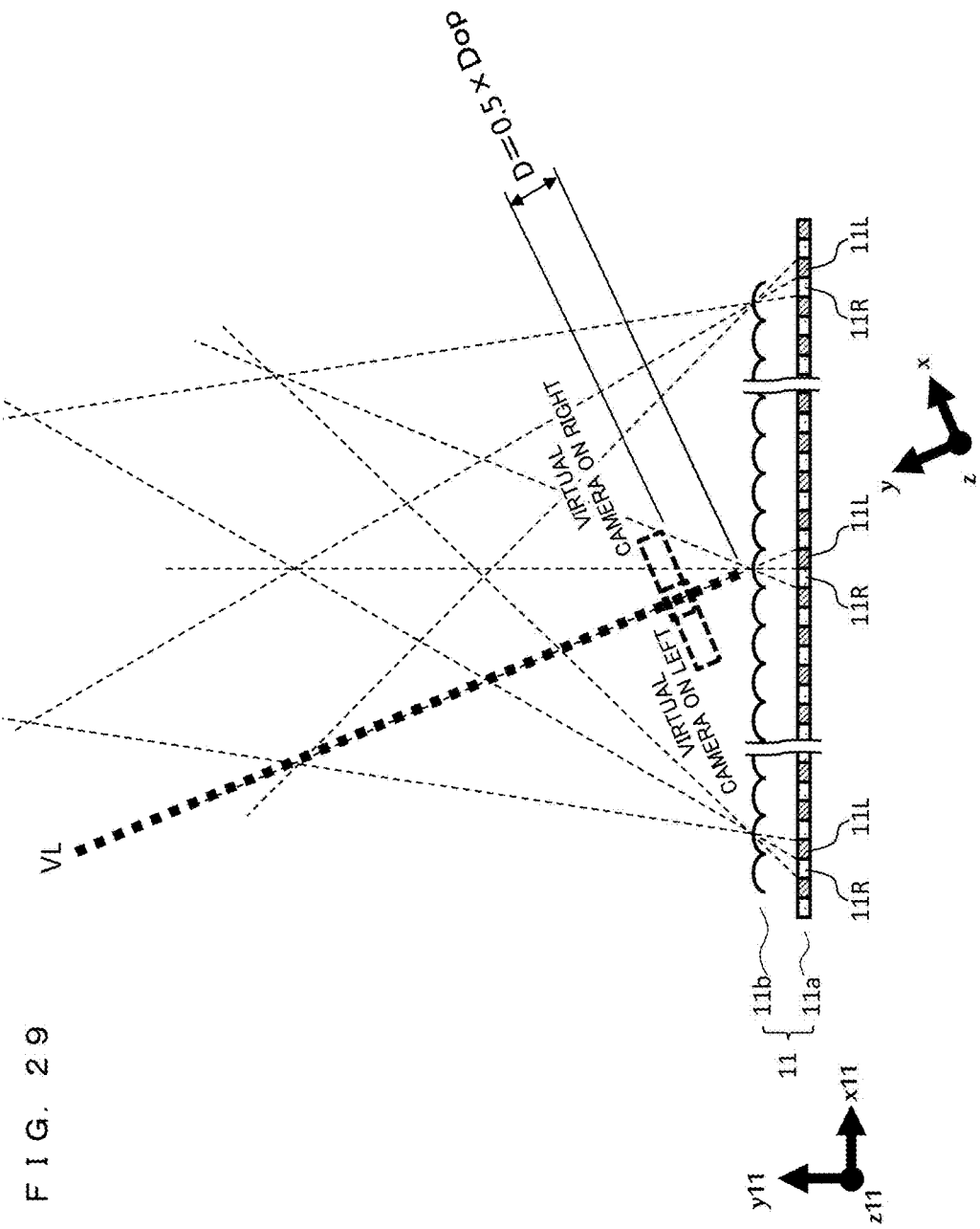
FIG. 29 is an explanatory diagram that illustrates a positional relation between a virtual camera and a naked-eye stereoscopic display.

FIG. 29 is an explanatory diagram that illustrates a positional relation between the virtual camera and the naked-eye stereoscopic display. FIGS. 30A to 30C are schematic diagrams that illustrate a relation between a stereoscopic image recognized by an observer and input images. FIG. 29 and FIGS. 30A to 30C are diagrams that illustrate a stereoscopic image recognized by an observer in a case where a spatial image forming device 12 is combined with the naked-eye stereoscopic display 11 according to this embodiment illustrated in FIG. 1. A virtual camera disposed on the left side and a virtual camera disposed on the right side illustrated in FIG. 29 assume the position of the spatial image forming device as illustrated in FIG. 19. Thus, when the input image illustrated in FIGS. 18A to 18C are displayed on the naked-eye stereoscopic display 11, an image captured by the virtual camera (FIG. 29) that is virtually arranged at the position of D=0.5×Dop is an image illustrated in FIG. 30A in which a relation between the left side and the right side of the image illustrated in FIG. 20A are interchanged based on a result illustrated in FIGS. 25 and 28. When the image illustrated in FIG. 30A enters the spatial image forming device 12, as described with reference to FIGS. 20A and 20B, light rays exiting from the spatial image forming device 12 are in the same direction as the incidence direction, and accordingly, an image viewed by an observer has the left side and the right side interchanged and becomes an image as illustrated in FIG. 30B. As a result, in a stereoscopic image recognized by an observer, as illustrated in FIG. 30C, a circular object 71 jumps out from the screen surface of the naked-eye stereoscopic display 11 that is spatially formed. In other words, the observer can recognize a displayed floating image in the air to be jumped out without performing a special image process for the input image for the naked-eye stereoscopic display 11.

In the stereoscopic display apparatus 1 according to this embodiment illustrated in FIG. 1, by arranging the naked-eye stereoscopic display 11 to be inclined by an angle θ in the x axis direction, the left side and the right side of an image incident to the spatial image forming device 12 are interchanged, and the appearance of reverse viewing at the center of the image viewed by the observer can be suppressed. For this reason, an observer can be allowed to recognize a floating image in the air as a stereoscopic image according to a jumping-out parallax or a depth parallax of the input image at a predetermined position. In addition, the stereoscopic display apparatus 1 according to this embodiment does not require an image process of an input image for suppressing reverse viewing. Accordingly, the stereoscopic display apparatus 1 can be configured in a simple manner. In addition, depending on a distance between the naked-eye stereoscopic display 11 and the spatial image forming device 12, while reverse viewing is acquired for an end portion of the image viewed by an observer, normal viewing (jumping-out/depth is correctly visually recognized) is achieved at least at the center. In this case, the end portion for which reverse viewing is formed may be handled as a background. For example, in a case where black is displayed, the observer is not disturbed from recognizing a stereoscopic image.

In the description presented above, in arranging the naked-eye stereoscopic display 11 to be inclined by the angle θ in the x-axis direction, while the inclination is made in the clockwise direction seen from the observer by using an axis parallel to the z axis as a rotation axis, the inclination is not limited thereto. Thus, the inclination may be made in the counterclockwise direction. FIG. 31 is an explanatory diagram that illustrates inclination arrangement of the naked-eye stereoscopic display. In the case illustrated in FIG. 31, the naked-eye stereoscopic display 11 is inclined by an angle θ in the counterclockwise direction seen from the observer. In the case illustrated in FIG. 31, a second area A2 (right-eye image R) is positioned on the left side of the virtual line VL, and a third area A3 (left-eye image L) is positioned on the right side of the virtual line VL. Accordingly, images captured by virtual cameras arranged on the left side and the right side with respect to the virtual line VL illustrated in FIG. 31 according to a concept similar to that of the case illustrated in FIG. 29 are images illustrated in FIG. 30A. For this reason, images viewed by the observer are those illustrated in FIG. 30B. In other words, also in a case where the naked-eye stereoscopic display 11 is inclined by the angle θ in the counterclockwise direction, similar to the case where the naked-eye stereoscopic display 11 is inclined in the clockwise direction as illustrated in FIG. 1, as illustrated in FIG. 30C, a stereoscopic image in which a circular object 71 jumps out is recognized.

As described with reference to FIGS. 21A, 21B, and 31, in order to make the naked-eye stereoscopic display 11 to have a posture inclined by a predetermined angle with respect to the x-axis direction, the inclination supporting unit 13 is used. FIG. 32 is a perspective view that illustrates an example of the inclination supporting unit 13. The inclination supporting unit 13 includes a base part 131, a first post 132, and a second post 133. The base part 131 is installed to the xz plane. The first post 132 and the second post 133 have a bar shape or a shape in which a plurality of bar shapes are connected, and one ends thereof are connected to the base part 131. The naked-eye stereoscopic display 11 is fixed to the other ends of the first post 132 and the second post 133. For the fixing of the first post 132 and the second post 133 and the naked-eye stereoscopic display 11, for example, screws disposed at the other ends of the first post 132 and the second post 133 and screw holes disposed at four corners of the naked-eye stereoscopic display 11 are used. The first post 132 and the second post 133 have mutually-different sizes in the y-axis direction and thus, can maintain the naked-eye stereoscopic display 11 in a state inclined in the x-axis direction. In order to change the inclination angle of the naked-eye stereoscopic display 11, the first post 132 and the second post 133 may be replaced by posts having mutually-different sizes in the y axis direction.

In addition, the inclination supporting unit 13 may employ any other configuration. FIG. 33 is a perspective view that illustrates another example of the inclination supporting unit 13. The inclination supporting unit 13 includes a base part 131, an arm part 134, and a mounting bracket 135. The base part 131 is installed to the xz plane. The arm part 134 has a bar shape or a shape in which a plurality of bar shapes are connected. One end of the arm part 134 is connected to the base part 131. The other end of the arm part 134 has a rotation shaft that is parallel to the z axis. The mounting bracket 135 is connected to this rotation shaft. The naked-eye stereoscopic display 11 is fixed to the mounting bracket 135. By rotating the rotation shaft, the inclination supporting unit 13 can maintain the naked-eye stereoscopic display 11 to be in a state inclined with respect to the x-axis direction. In addition, it may be configured such that a rotation shaft parallel to the z axis is included in the base part 131, one end of the arm part 134 is connected to the rotation shaft, and the mounting bracket 135 is connected to the other end of the arm part 134. Also in this case, similarly, the inclination supporting unit 13 can maintain the naked-eye stereoscopic display 11 to be in an inclined posture.

Next, an example of the method of acquiring an inclination angle θ of the naked-eye stereoscopic display 11 will be described as below. As illustrated in FIGS. 21A and 21B, an angle range of the first area A1 to the second area A2 is θ. In order to acquire the angle range of the first area A1 to the second area A2, a luminance profile of the display center of the naked-eye stereoscopic display 11 may be acquired. Here, the luminance profile represents a difference between luminance values according to an observation angle. A position that is in the direction of a normal line of the display surface of the naked-eye stereoscopic display 11 and faces the display center on the front side is set as a reference position having an observation angle of 0 degrees. When a circular arc having the display center as its center is drawn with a segment joining the display center and the reference position used as a radius, a point on the circular arc is set as another observation position. An angle formed between a radius at the observation position and a radius at the reference position is an observation angle. An observation angle of a position moved from the reference position in the counterclockwise direction is set to have a positive value, and an observation angle of a position moved from the reference position in the clockwise direction is set to have a negative value. A luminance distribution at each observation position is a luminance profile. In order to acquire an angle range of the first area A1 to the second area A2, for example, a luminance profile may be acquired by causing the naked-eye stereoscopic display 11 to perform display for forming a white image in the first area A1 and forming a black image in the second area A2.

The luminance profile as above can be acquired by a view angle characteristic measuring device. As examples of the view angle characteristic measuring device include Conoscope (manufactured by Autronic Melchers GmbH), VCMaster-3D (manufactured by ELDIM), and the like are known.

Figure 34:
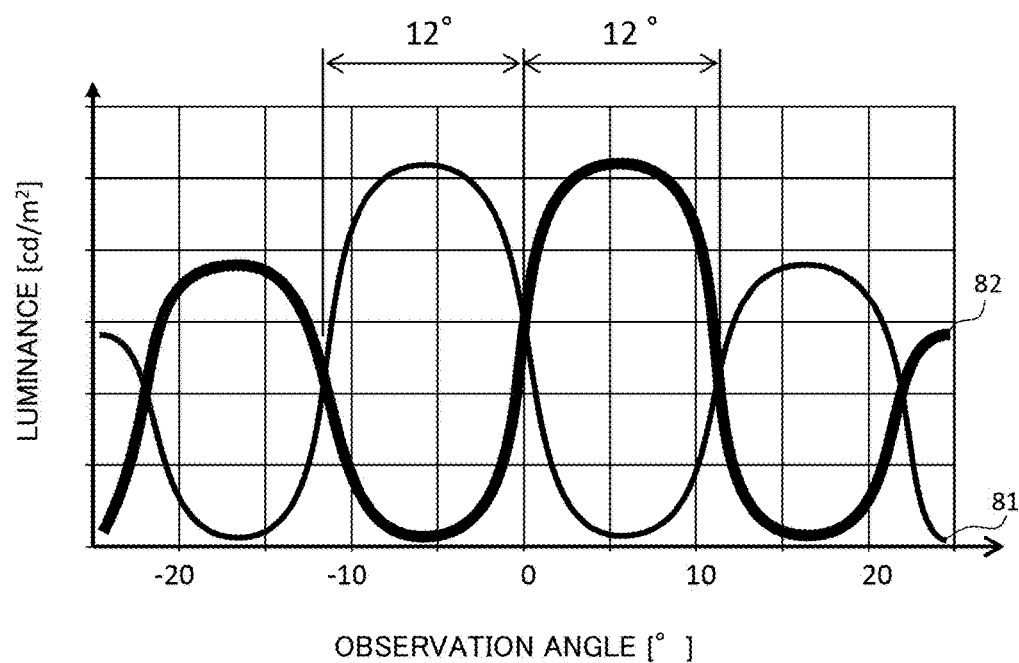
FIG. 34 is a graph that illustrates an example of a luminance profile of a naked-eye stereoscopic display.

FIG. 34 represents graphs that illustrate an example of the luminance profile of the naked-eye stereoscopic display 11. In the graphs illustrated in FIG. 34, the horizontal axis represents the observation angle in units of degrees, and the vertical axis is the luminance in units of $cd/m^2$. In the example illustrated in FIG. 34, two graphs including a graph 81 and a graph 82 are present. The graph 81 is a graph acquired by displaying black in a left-eye pixel 11L that emits light contributing to the formation of the first area A1 and displaying white in a right-eye pixel 11R that emits light contributing to the formation of the second area A2. The graph 82 is a graph acquired by displaying white in the left-eye pixel 11L and displaying black in the right-eye pixel 11R.

Based on the graph 81, it can be checked that the extent of light contributing to the formation of the first area A1 near an observation angle of 0 degrees is in the range of −12 degrees to 0 degrees. Based on the graph 82, it can be understood that the extent of light contributing to the formation of the second area A2 near an observation angle of 0 degrees is in the range of 0 degrees to +12 degrees. Accordingly, this naked-eye stereoscopic display 11 may be arranged to be inclined in the clockwise direction or the counterclockwise direction with an inclination angle from the x-axis direction (first direction) set to 12 degrees.

As above, a method of determining the inclination angle θ by obtaining the angle range of the first area A1 to the second area A2 from the luminance profile shown in the graph 81-82 of FIG. 34 has been described. However, if the characteristics of the spatial image forming device 12 actually used are not ideal, the light rays emitted from the spatial image forming device 12 may deviate slightly from the ideal. In order to correct the deviation due to the characteristics of the spatial image forming device 12, it is also possible to add a correction angle (for example, about 0.1 to 1.5°) to the angle calculated from the luminance profile in determining the inclination angle θ. For example, in order to correct the characteristics of the spatial image forming device 12, the inclination angle θ may be set to 12.9 degrees on the basis of 12 degrees obtained from FIG. 34.

As above, the inclination angle θ can be acquired based on an acquired angle distribution by inputting a pattern for which a luminance difference between one light ray and the other light ray, which are acquired by dividing light rays into two parts or more, is maximal to the naked-eye stereoscopic display 11 and acquiring the angle distribution of the luminance of the one light ray to the other light ray, which are divided, for the first direction.

Figure 35:
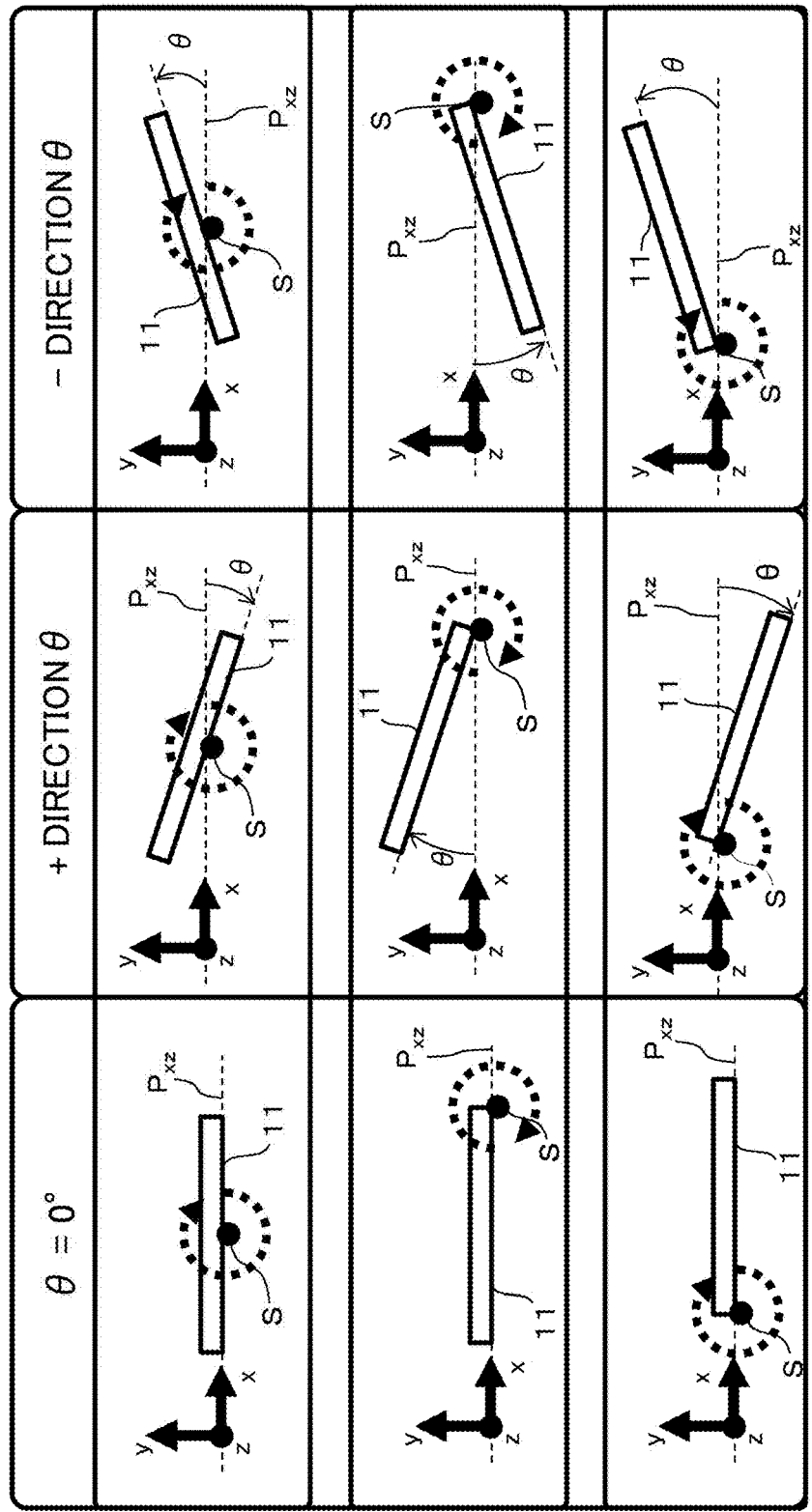
FIGS. 35A to 35C are explanatory diagrams that illustrate setting examples of a rotation axis.

In this embodiment, in inclining the naked-eye stereoscopic display 11 by an angle θ in the x-axis direction, while the naked-eye stereoscopic display 11 is arranged to be inclined by the inclination angle θ by using an axis parallel to the z axis as a rotation axis, the position of the axis may be variously set. FIGS. 35A to 35C are explanatory diagrams that illustrate setting examples of the rotation axis. FIG. 35A illustrates a case of a stereoscopic display apparatus using a related technology in which θ is 0 degrees. FIG. 35B illustrates a case of inclination in the clockwise direction, and FIG. 35C illustrates a case of inclination in the counterclockwise direction. A rotation axis S may be near the center of the naked-eye stereoscopic display 11 in the x-axis direction or near the end thereof.

The stereoscopic display apparatus 1 according to this embodiment divides light rays in two or more directions and includes a projector that projects two or more images according the divided light. The projector, for example, is the naked-eye stereoscopic display 11. The stereoscopic display apparatus 1 includes an optical device of a planar shape that emits incident light incident from the first face to the second face. The optical device, for example, is the spatial image forming device 12. The stereoscopic display apparatus 1, in a three-dimensional coordinate system including first to third coordinate axes that are orthogonal to each other, includes a supporting unit that supports at least one of the projector and the optical device in a first state or a second state. The supporting unit, for example, is the inclination supporting unit 13. The optical device emits incident light that is incident from a first point on the projection surface of the projector to a second point that has plane symmetry with respect to the plane of the optical device used as a reference. The first state is a state in which, in a case where first and second virtual lines orthogonal to each other on the plane of the optical device and third and fourth virtual lines orthogonal to each other on the projection surface of the projector are assumed to be projected onto a first plane including first and second coordinate axes, the first and third virtual lines overlap each other, and the second and fourth virtual lines overlap each other (see FIG. 7). The second state is a state in which, in a three-dimensional coordinate system, the first virtual line and the third virtual line are not parallel with each other, and the second virtual line and the fourth virtual line are not parallel with each other (see FIG. 1).

Modified Example 1

The inclination supporting unit 13 may be configured to include an actuator such as a motor. In a case where the inclination supporting unit 13 is configured in this way, the stereoscopic display apparatus 1 includes a control unit that outputs a control signal to the actuator. The control unit may be configured by a computer, for example, including a central processing unit (CPU) and a memory such as a read only memory (ROM) or a random access memory (RAM). The inclination supporting unit 13 operates the actuator by using a control signal transmitted from a control unit. Accordingly, the inclination supporting unit 13 can support the naked-eye stereoscopic display 11 to be in a posture inclined by an inclination angle θ from the first direction.

Figure 36:
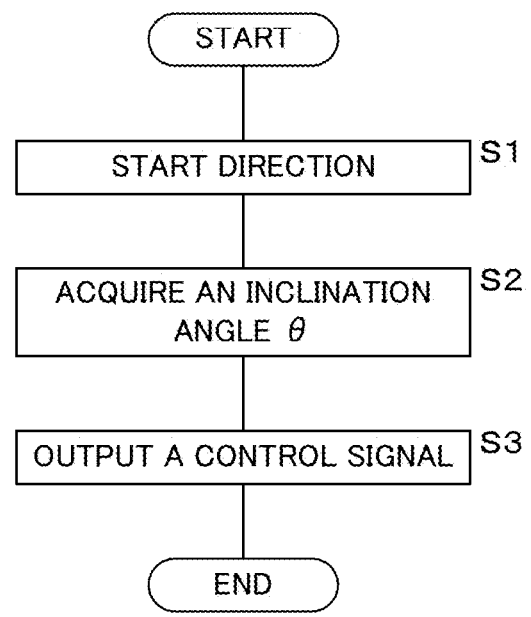
FIG. 36 is a flowchart that illustrates the operation of a control unit.

FIG. 36 is a flowchart that illustrates the operation of the control unit. The control unit receives a start instruction (Step S1). The start direction, for example, is performed by an observer operating a switch. In addition, a start instruction signal may be input by an initialization program at the time of starting up the stereoscopic display apparatus 1. The control unit acquires an inclination angle θ (Step S2). The control unit outputs a control signal to the inclination supporting unit 13 (Step S3). Accordingly, the inclination supporting unit 13 supports the naked-eye stereoscopic display 11 to be in a posture inclined by the inclination angle θ from the first direction. The inclination angle θ may be given to the control unit by an observer. In addition, it may be configured such that the type of naked-eye stereoscopic display 11 and the inclination angle θ are stored in the ROM in association with each other, an observer gives the type of naked-eye stereoscopic display 11 to the control unit, and the control unit reads an inclination angle θ from the ROM based on the given type.

In this modified example, since the adjustment of the inclination angle is performed by the inclination supporting unit 13, it is unnecessary for an observer to check whether the inclination angle has an appropriate value. In addition, in a case where the types of a plurality of naked-eye stereoscopic displays 11 and corresponding inclination angles θ are stored, a plurality of the naked-eye stereoscopic displays 11 can be used. Furthermore, an observer may not perform adjustment of the inclination angle, and accordingly, when the stereoscopic display apparatus 1 is not used, the naked-eye stereoscopic display 11 can be set to be in a no-inclined state. Accordingly, the housing space of the stereoscopic display apparatus 1 can be saved.

Embodiment 2

Figure 37:
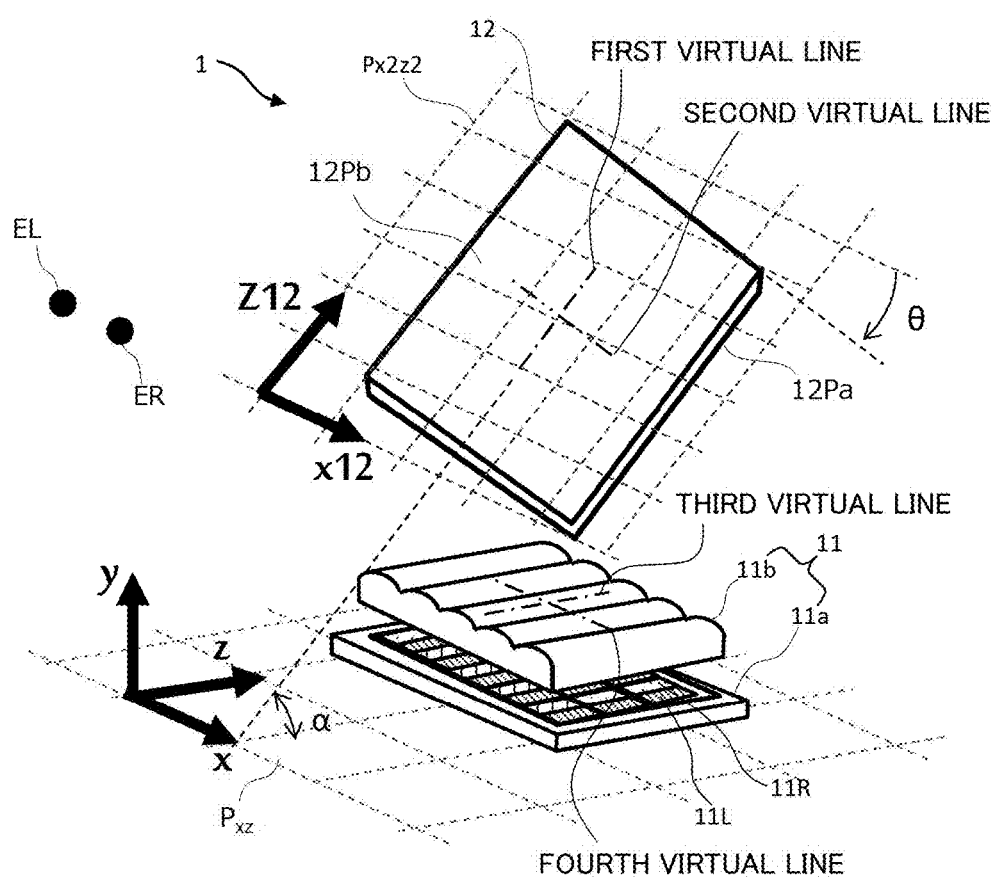
FIG. 37 is an explanatory diagram that illustrates the configuration of a stereoscopic display apparatus.

Compared to the arrangement according to the related technology, this embodiment relates to a form in which a target to be inclined is not the naked-eye stereoscopic display 11 but the spatial image forming device 12 in a stereoscopic display apparatus 1. FIG. 37 is an explanatory diagram that illustrates the configuration of the stereoscopic display apparatus 1. The stereoscopic display apparatus 1 includes a naked-eye stereoscopic display 11 and a spatial image forming device 12. The configuration of each of the naked-eye stereoscopic display 11 and the spatial image forming device 12 is similar to that of Embodiment 1, and thus, the description thereof will not be presented. In description presented below, different points from Embodiment 1 will be mainly described.

In this embodiment, the naked-eye stereoscopic display 11 is arranged such that the display surface is arranged to be in parallel with an xz plane Pxz. Meanwhile, the spatial image forming device 12 is held by an inclination supporting unit not illustrated in the drawing so as to be inclined by an angle θ in an x12 direction with respect to an x12-z12 plane Px12z12. The spatial image forming device 12 is arranged to be inclined by an angle α in the z-axis direction with respect to the xz plane Pxz such that the first virtual line and the third virtual line overlap each other, and the second virtual line and the fourth virtual line overlap each other when projection is performed for the xz plane.

Figure 38:
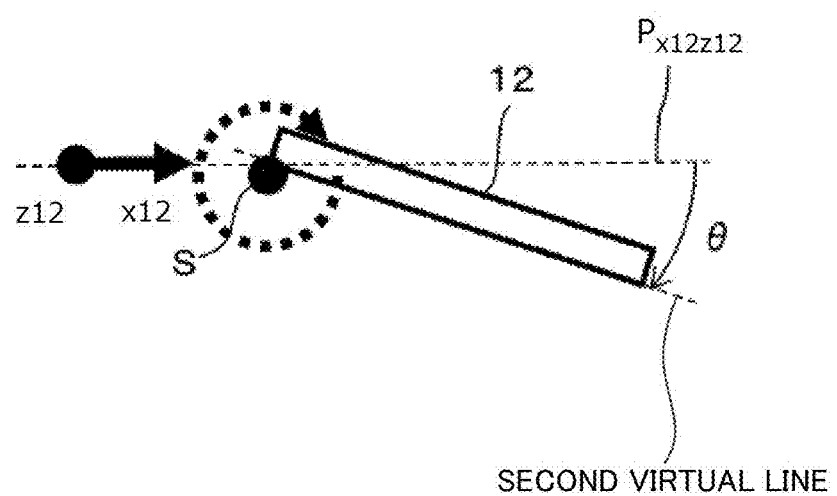
FIG. 38 is an explanatory diagram that illustrates the inclination arrangement of a spatial image forming device.

FIG. 38 is an explanatory diagram that illustrates the inclination arrangement of the spatial image forming device 12. FIG. 38 is a plan view of a case where the spatial image forming device 12 is viewed from the x2-axis direction. The x12 axis illustrated in FIGS. 37 and 38 is parallel to the x axis. In other words, the x12 axis is parallel to the first direction. Accordingly, in FIG. 38, the first direction is a horizontal direction of the sheet face. As illustrated in FIG. 38, the spatial image forming device 12 is arranged to be inclined by an angle θ with respect to the first direction by using the x12 axis, in other words, an axis parallel to the z12 axis as a rotation axis.

Figure 39:
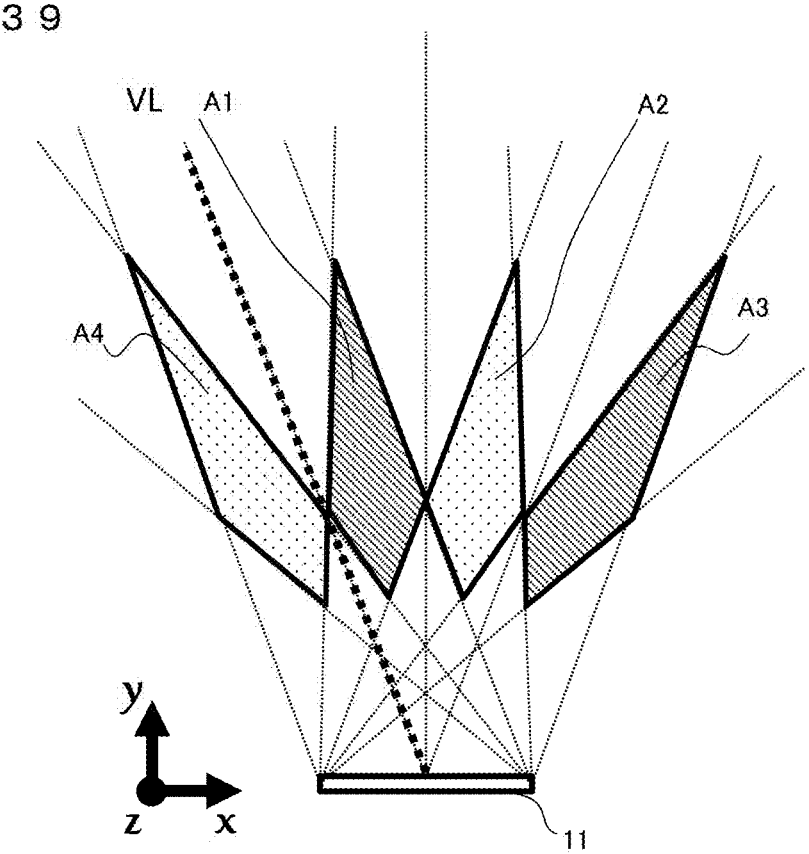
FIG. 39 is a diagram of optical paths that illustrates a stereoscopic viewing area of a naked-eye stereoscopic display used in the stereoscopic display apparatus illustrated in FIG. 37.

FIG. 39 is a diagram of optical paths that illustrates a stereoscopic viewing area of a naked-eye stereoscopic display 11 used in the stereoscopic display apparatus 1 illustrated in FIG. 37. FIG. 39 is a diagram that is similar to FIG. 21B. In FIG. 39, for the simplification of the drawing, a lenticular lens, a left-eye pixel, a right-eye pixel, and the like are not illustrated. Similar to the case illustrated in FIG. 21B, in FIG. 39, a virtual line VL, a first area A1 (left-eye image area AL) and a second area A2 (right-eye image area AR) in which primary light are dominant, and a third area A3 and a fourth area A4 in which secondary light is dominant are illustrated.

As illustrated in FIG. 39, the spatial image forming device 12 is in the state of being inclined by an angle θ in the clockwise direction by using an axis parallel to the z2 axis as a rotation axis such that the fourth area A4 (an image projected by the right-eye pixel 11R) is positioned on the left side of the virtual line VL, and the first area A1 (an image projected by the left-eye pixel 11L) is positioned on the right side of the virtual line VL. Comparing FIGS. 21A and 39 with each other, a relation between the image projected by the left-eye pixel 11L and the image projected by the right-eye pixel 11R with the virtual line VL interposed therebetween is horizontally interchanged.

Figure 40:
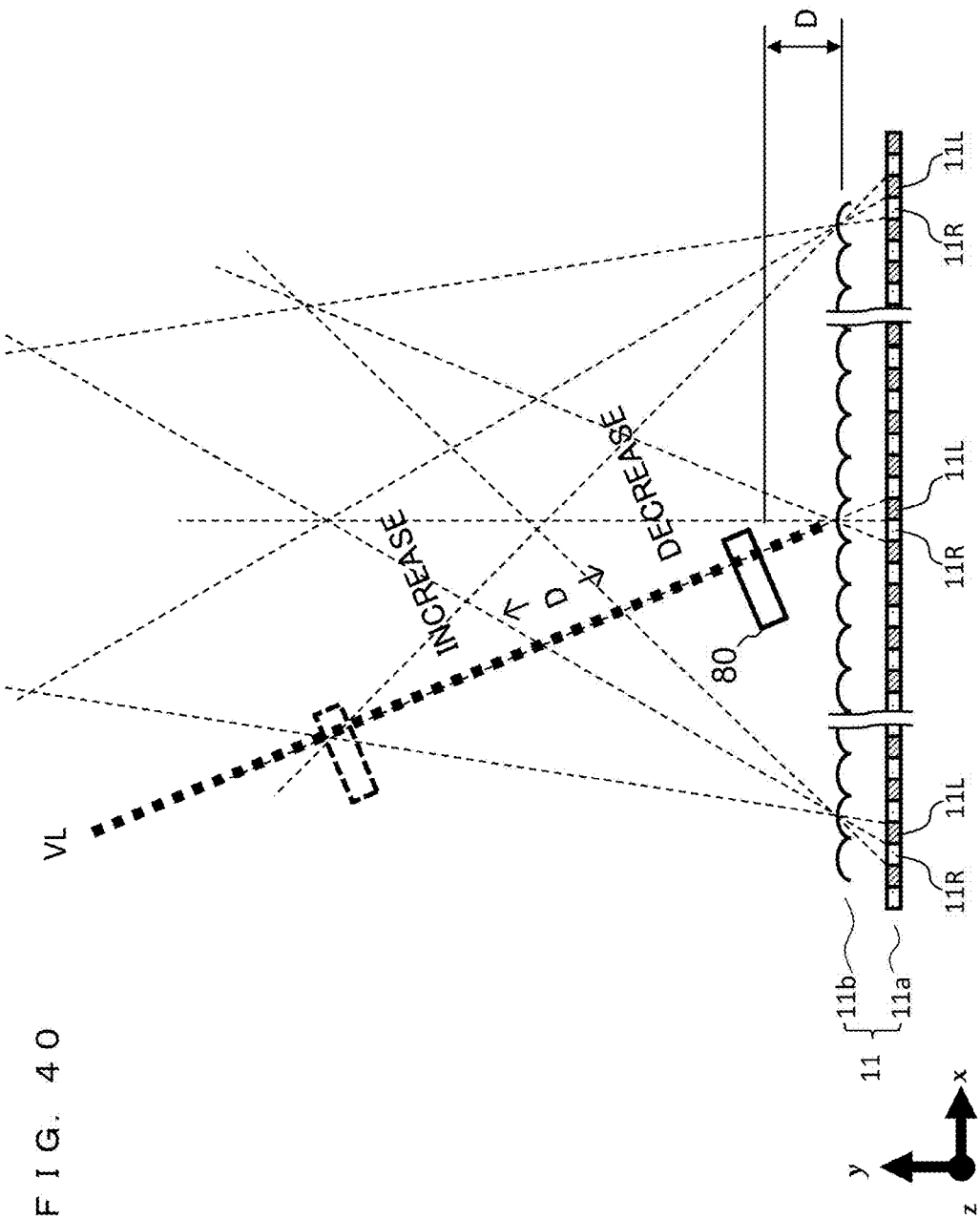
FIG. 40 is an explanatory diagram that illustrates a positional relation between a virtual camera and a naked-eye stereoscopic display.
Figure 41A:
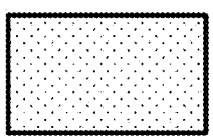
FIGS. 41A to 41E are explanatory diagrams that illustrate images captured by a virtual camera.
Figure 41B:
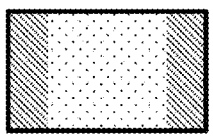
Figure 41C:
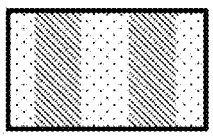
Figure 41D:
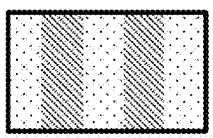
Figure 41E:
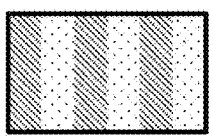

FIG. 40 is an explanatory diagram that illustrates a positional relation between a virtual camera 80 and the naked-eye stereoscopic display 11. In this embodiment, the spatial image forming device 12 not illustrated in FIG. 40 is inclined. The naked-eye stereoscopic display 11 is not inclined. In other words, as illustrated in FIG. 40, the display surface of the naked-eye stereoscopic display 11 is parallel to the plane Pxz. FIG. 40 is an example of a case where the virtual camera 80 is arranged to be shifted to the left side (the left-eye side) with respect to the virtual line VL of the naked-eye stereoscopic display 11 illustrated in FIG. 39, and the gap D between the virtual camera 80 and the lenticular lens 11b is changed. The virtual line VL illustrated in FIG. 40 is the same as the virtual line illustrated in FIG. 39. FIGS. 41A to 41E are explanatory diagrams that illustrate images captured by the virtual camera 80. FIGS. 41A to 41E are diagrams that illustrate a correspondence relation between the gap between the lenticular lens 11b and the virtual camera 80 and a captured image in the configuration illustrated in FIG. 40. As illustrated in FIG. 41A, when the gap D is near the optimal stereoscopic visual recognition distance Dop, an image captured by the virtual camera 80 is only an input image of the right-eye pixel 11R. In addition, when the gap D is decreased and is about ½ of the optimal stereoscopic visual recognition distance Dop, as illustrated in FIG. 41B, an input image of the left-eye pixel 11L appears on both sides of a captured image. Furthermore, when the gap D is decreased and is about ⅓ to ¼ of the optimal stereoscopic visual recognition distance Dop, as illustrated in FIGS. 41C and 41D, according to the influence of high-order light, an input image of the right-eye pixel 11R appears on both sides of a captured image. In addition, when the gap D is further decreased and is ¼ of the optimal stereoscopic visual recognition distance Dop or less, as illustrated in FIG. 41E, according to the influence of further high-order light, an input image of the left-eye pixel 11L appears on the left side of a captured image.

FIG. 42 is a diagram that illustrates the configurations of the captured images illustrated in FIGS. 41A to 41E. As illustrated in FIG. 42, an input image of the right-eye pixel 11R is captured according to secondary light configuring the fourth area A4 regardless of the gap D between the virtual camera 80 and the lenticular lens 11b. However, as the gap D is decreased, according to the influence of high-order light configuring another lobe, an input image of the left-eye pixel 11L is captured more.

Figure 43:
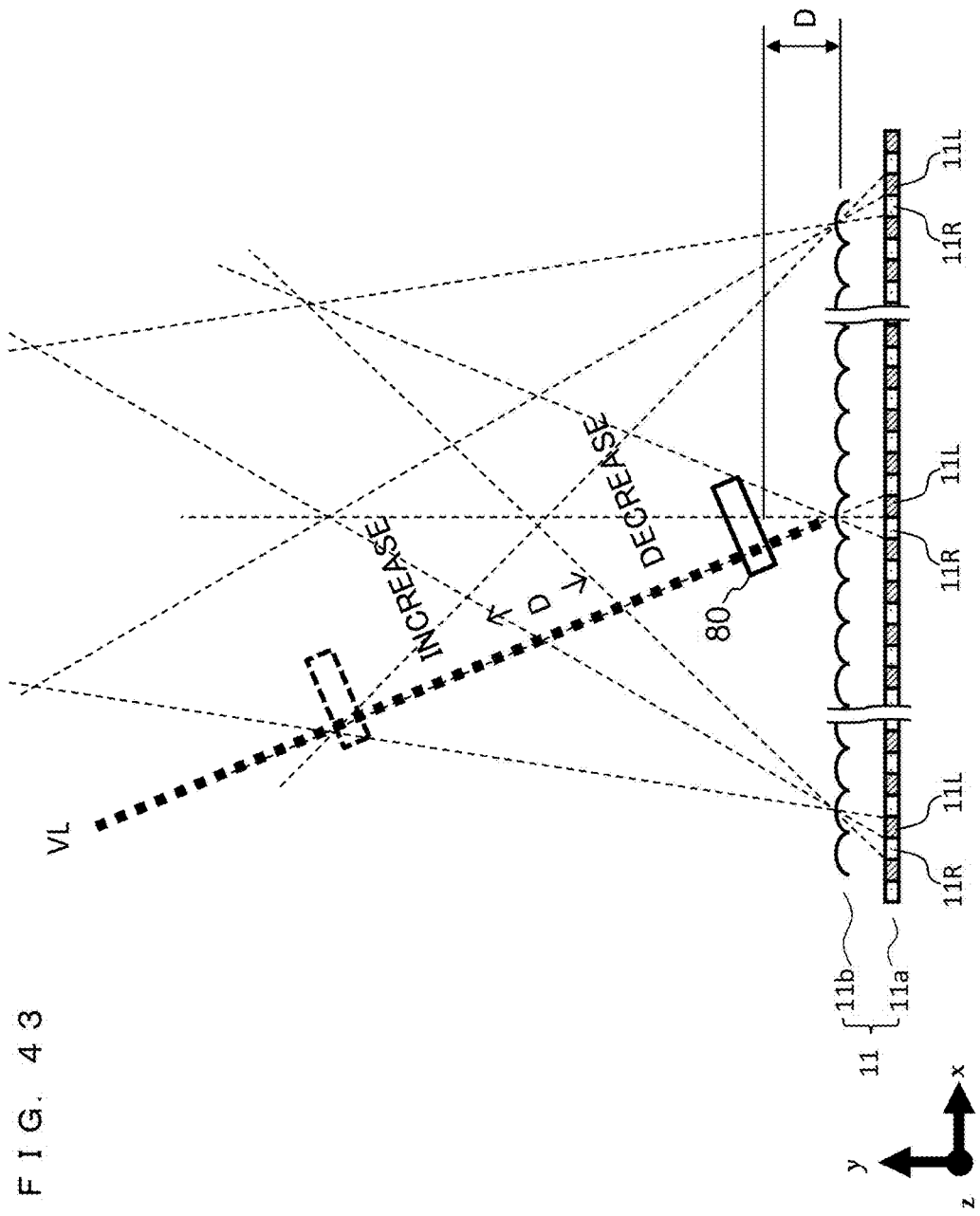
FIG. 43 is an explanatory diagram that illustrates a positional relation between a virtual camera and a naked-eye stereoscopic display.
Figure 44:
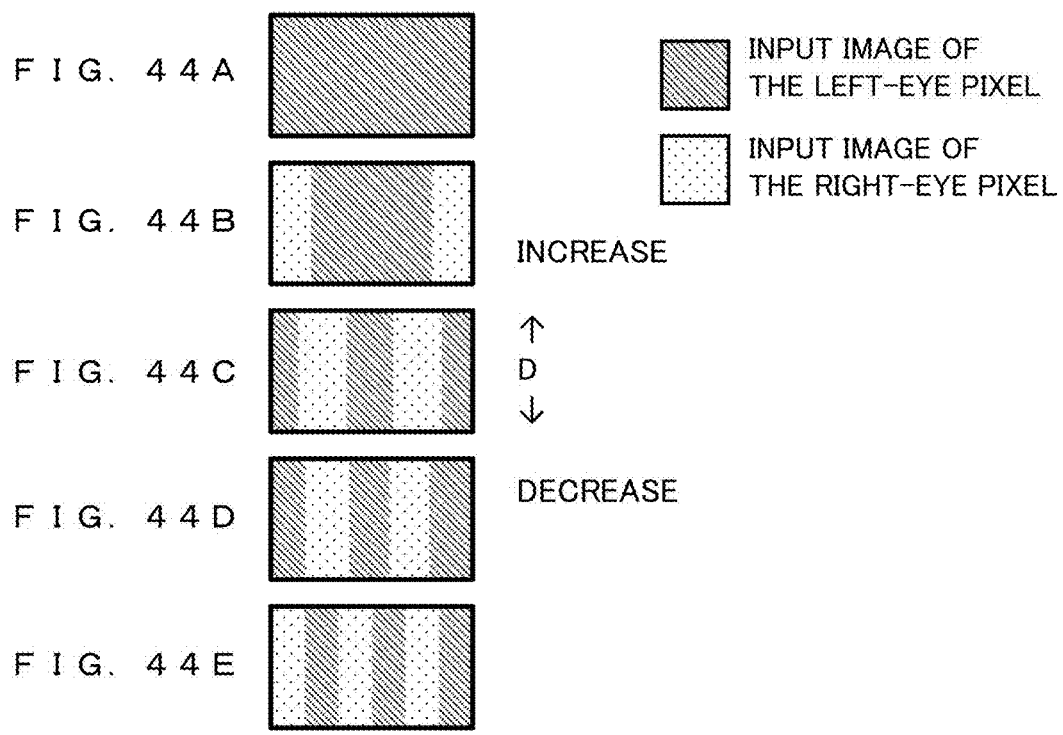
FIGS. 44A to 44E are explanatory diagrams that illustrate images captured by a virtual camera.

FIG. 43 is an explanatory diagram that illustrates a positional relation between the virtual camera and the naked-eye stereoscopic display. FIG. 43 is an example of a case where the virtual camera 80 is arranged to be shifted to the right side (right-eye side) with respect to the direction VL of the naked-eye stereoscopic display 11 illustrated in FIG. 39, and a gap D between the virtual camera 80 and the lenticular lens 11b is changed. The virtual line VL illustrated in FIG. 43 is the same as the virtual line VL illustrated in FIG. 39. FIGS. 44A to 44E are explanatory diagrams that illustrate images captured by the virtual camera 80. FIGS. 44A to 44E illustrate a correspondence relation between the gap between the lenticular lens 11b and the virtual camera 80 and a captured image in the configuration illustrated in FIG. 43. As illustrated in FIG. 44A, when the gap D is near the optimal stereoscopic visual recognition distance Dop, an image captured by the virtual camera 80 is only an input image of the left-eye pixel 11L. In addition, when the gap D is decreased and is about ½ of the optimal stereoscopic visual recognition distance Dop, as illustrated in FIG. 44B, an input image of the right-eye pixel 11R appears on both sides of a captured image. Furthermore, when the gap D is decreased and is about ⅓ to ¼ of the optimal stereoscopic visual recognition distance Dop, as illustrated in FIGS. 44C and 44D, according to the influence of secondary light, an input image of the left-eye pixel 11L appears on both sides of a captured image. In addition, when the gap D is further decreased and is ¼ of the optimal stereoscopic visual recognition distance Dop or less, as illustrated in FIG. 44E, according to the influence of third-order light, an input image of the right-eye pixel 11R appears on the left side of a captured image.

FIG. 45 is a diagram that illustrates the configurations of the captured images illustrated in FIGS. 44A to 44E. In this case, as illustrated in FIG. 45, an input image of the left-eye pixel 11L is captured by the virtual camera 80 in accordance with primary light configuring the first area A1 regardless of the gap D between the virtual camera 80 and the lenticular lens 11b. However, as the gap D is decreased, according to the influence of high-order light configuring another lobe, an input image of the right-eye pixel 11R is captured more. As a result, the captured image illustrated in FIG. 45 has a configuration in which an input image of the left-eye pixel 11L and an input image of the right-eye pixel 11R are interchanged with respect to the captured image illustrated in FIG. 42.

Figure 46:
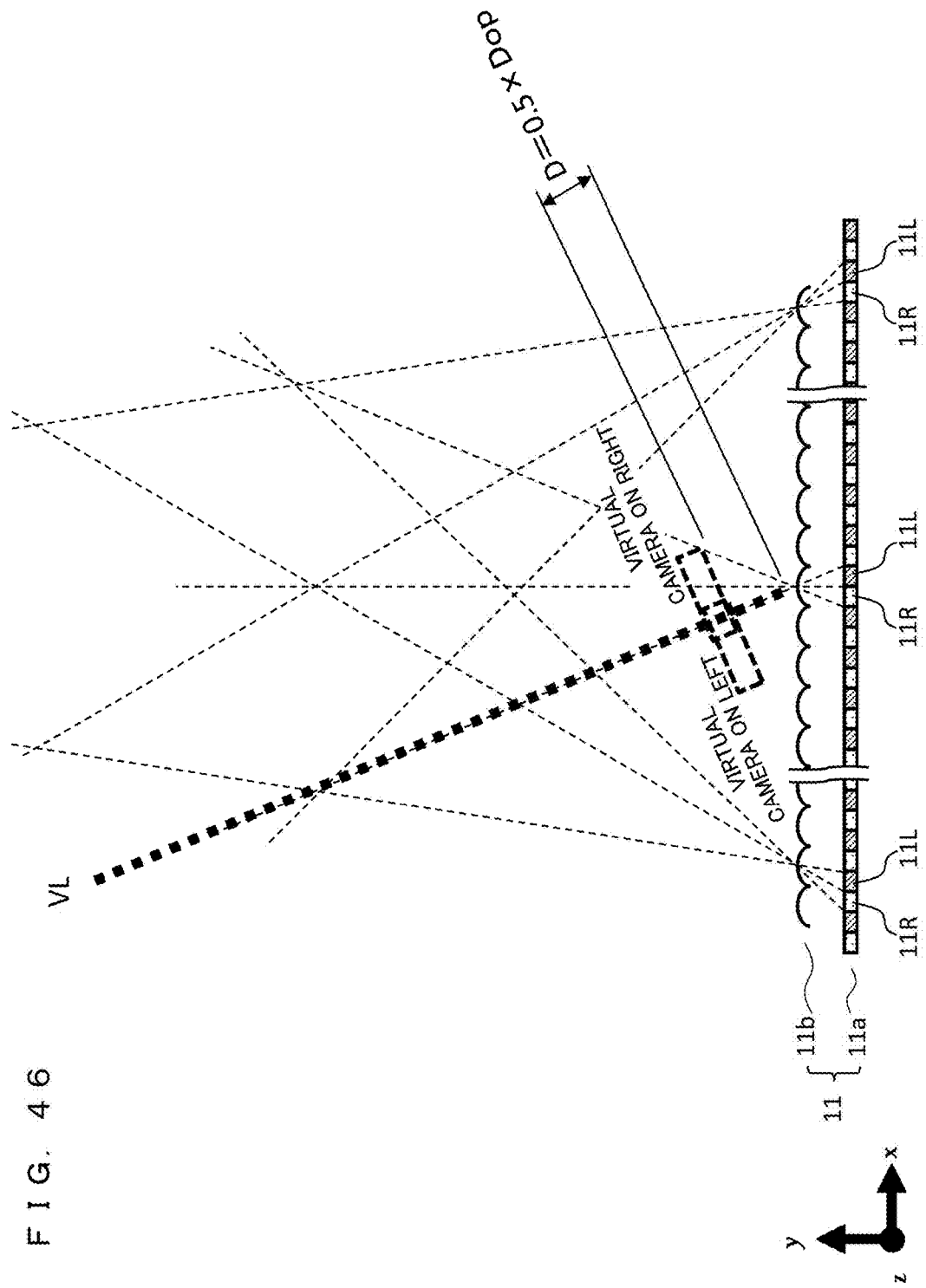
FIG. 46 is an explanatory diagram that illustrates a positional relation between a virtual camera and a naked-eye stereoscopic display.
Figure 47:
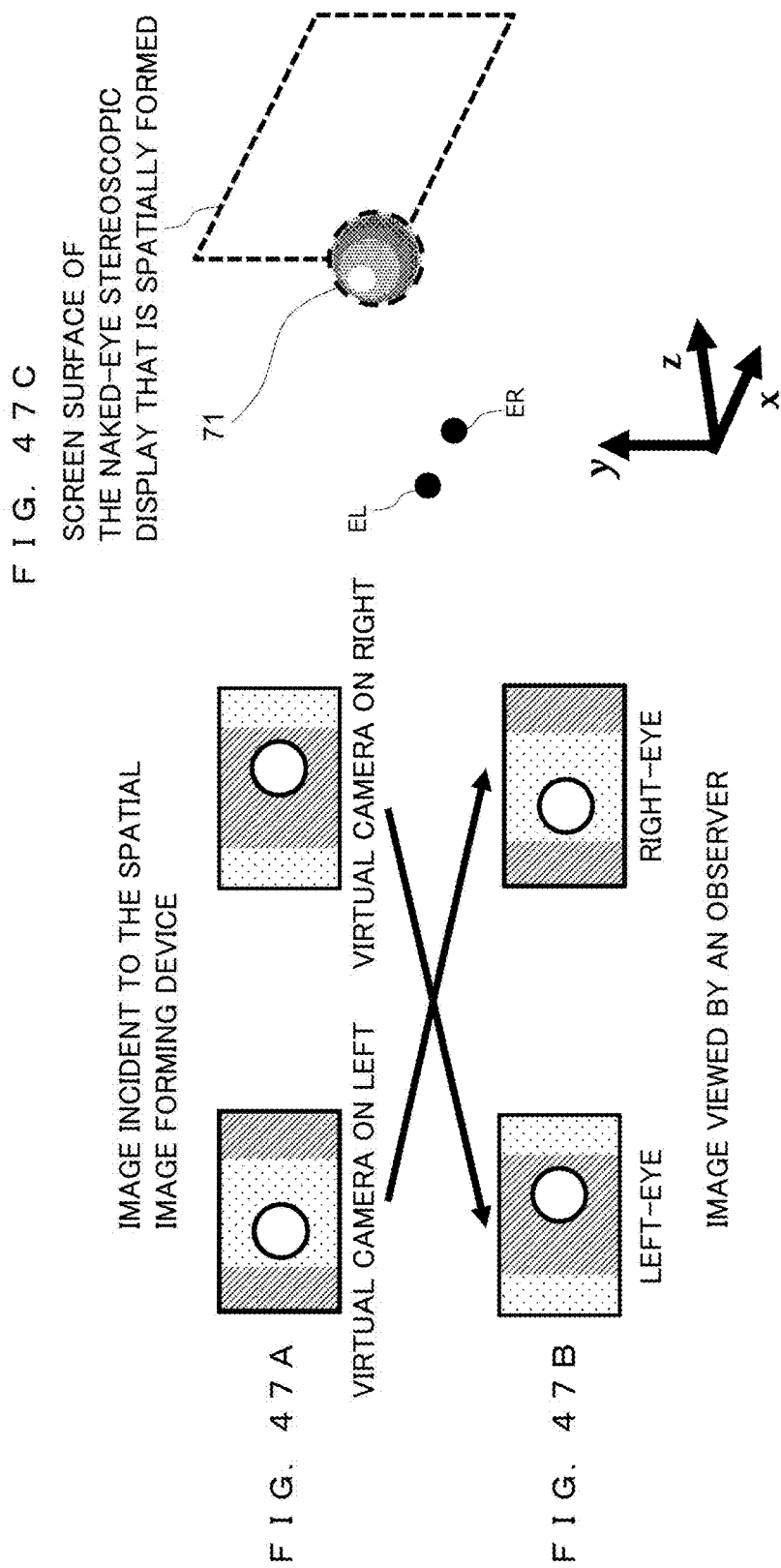
FIGS. 47A to 47C are schematic diagrams that illustrate a relation between a stereoscopic image recognized by an observer and input images.

FIG. 46 is an explanatory diagram that illustrates a positional relation between the virtual camera and the naked-eye stereoscopic display. FIGS. 47A to 47C are schematic diagrams that illustrate a relation between a stereoscopic image recognized by an observer and input images. FIG. 46 and FIGS. 47A to 47C are diagrams that illustrate a stereoscopic image recognized by an observer in a case where the spatial image forming device 12 is combined with the naked-eye stereoscopic display 11 according to this embodiment illustrated in FIG. 37. A virtual camera disposed on the left side and a virtual camera disposed on the right side illustrated in FIG. 46 assume the position of the spatial image forming device as illustrated in FIG. 19. As illustrated in FIG. 46, an image captured by the virtual camera that is virtually arranged at the position of D=0.5× Dop is an image illustrated in FIG. 47A in which a relation between the left side and the right side of the image illustrated in FIG. 20A are interchanged based on a result illustrated in FIGS. 42 and 45. When the image illustrated in FIG. 47A enters the spatial image forming device 12, as described with reference to FIGS. 20A and 20B, light rays exiting from the spatial image forming device 12 are in the same direction as the incidence direction, and accordingly, an image viewed by an observer has the left side and the right side interchanged and becomes an image as illustrated in FIG. 47B. As a result, in a stereoscopic image recognized by an observer, as illustrated in FIG. 47C, a circular object 71 jumps out from the screen surface of the naked-eye stereoscopic display 11 that is spatially formed. In other words, the observer can recognize a displayed floating image in the air to be jumped out without performing an image process for the input images of a jumping-out parallax.

As above, in the stereoscopic display apparatus 1 according to this embodiment illustrated in FIG. 37, by arranging the spatial image forming device 12 to be inclined by an angle θ in the clockwise direction by using an axis parallel to the z2 axis as a rotation axis, the appearance of reverse viewing in which the left side and the right side of an image incident to the spatial image forming device 12 are interchanged can be suppressed. For this reason, an observer can be allowed to recognize a floating image in the air as a stereoscopic image according to a jumping-out parallax or a depth parallax of the input image at a predetermined position. In addition, the stereoscopic display apparatus 1 according to this embodiment does not require an image process of an input image for suppressing reverse viewing. Accordingly, the stereoscopic display apparatus 1 can be configured in a simple manner. In addition, depending on a distance between the naked-eye stereoscopic display 11 and the spatial image forming device 12, while reverse viewing is acquired for an end portion of the image viewed by an observer, there are also cases where normal viewing (jumping-out/depth is correctly visually recognized) is achieved at least at the center. In such cases, the end portion for which reverse viewing is formed may be handled as a background. For example, in a case where black is displayed, the observer is not disturbed from recognizing a stereoscopic image.

In the description presented above, while the spatial image forming device 12 is inclined in the clockwise direction from the view of the observer by using an axis parallel to the z2 axis as a rotation axis, the inclination is not limited thereto. Thus, the spatial image forming device 12 may be inclined in the counterclockwise direction.

Figure 48:
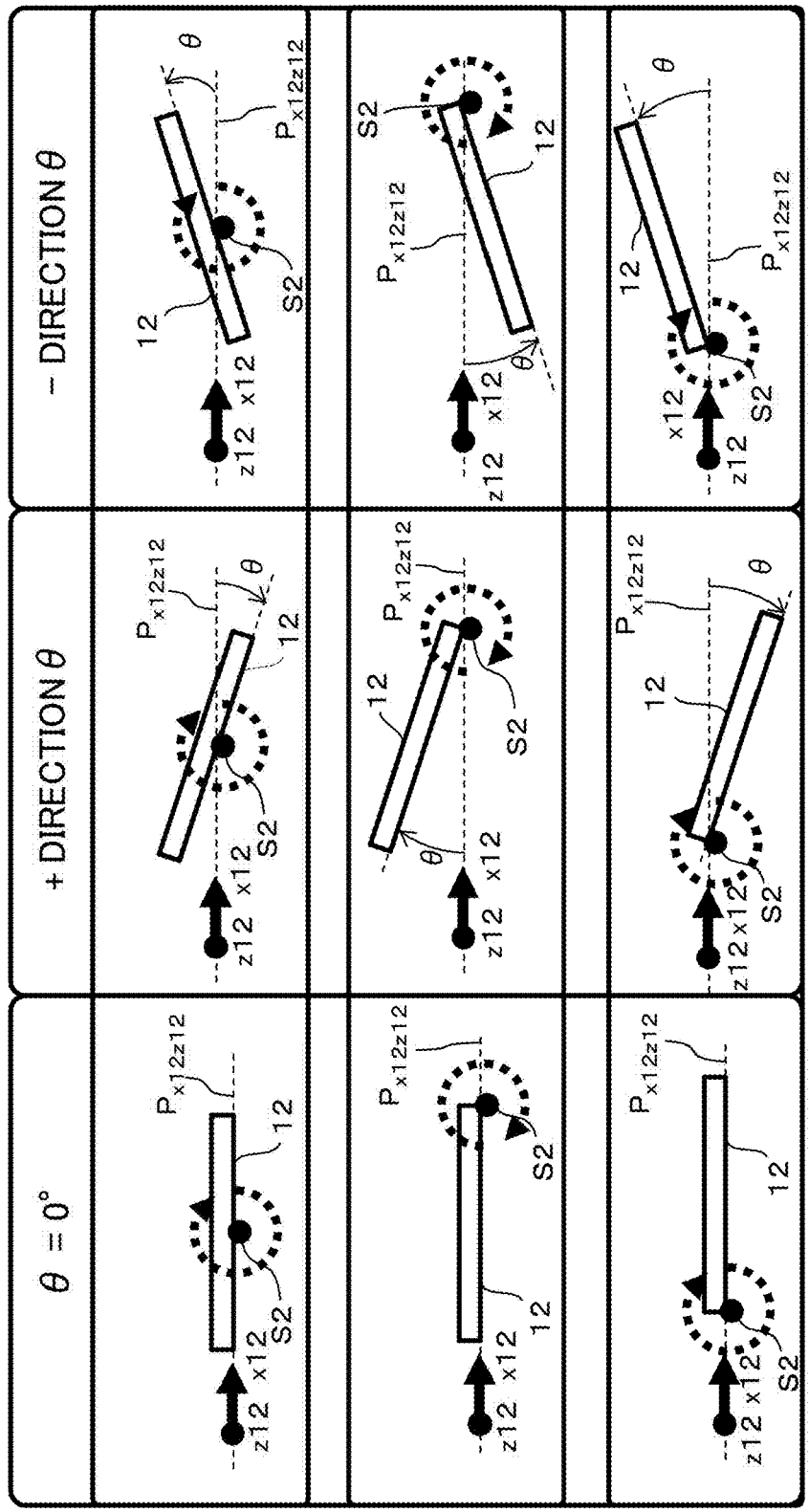
FIGS. 48A to 48C are explanatory diagrams that illustrate setting examples of a rotation axis.

In addition, in this embodiment, while the spatial image forming device 12 is arranged to be inclined by an inclination angle θ by using an axis parallel to the z2 axis as a rotation axis, the position of the axis may be variously set. FIGS. 48A to 48C are explanatory diagrams that illustrate setting examples of a rotation axis. FIG. 48A illustrates a case of a stereoscopic display apparatus using a related technology in which θ is 0 degrees. FIG. 48B illustrates a case of inclination in the clockwise direction, and FIG. 48C illustrates a case of inclination in the counterclockwise direction. A rotation axis S may be near the center of the spatial image forming device 12 in the x2-axis direction or near the end thereof.

As above, similar to Embodiment 1, the stereoscopic display apparatus 1 according to this embodiment can suppress the appearance of reverse viewing at the center of an image viewed by an observer. For this reason, the observer is allowed to recognize a floating image in the air as a stereoscopic image according to a jumping-out parallax or a depth parallax of an input image at a predetermined position.

Embodiment 3

Figure 49:
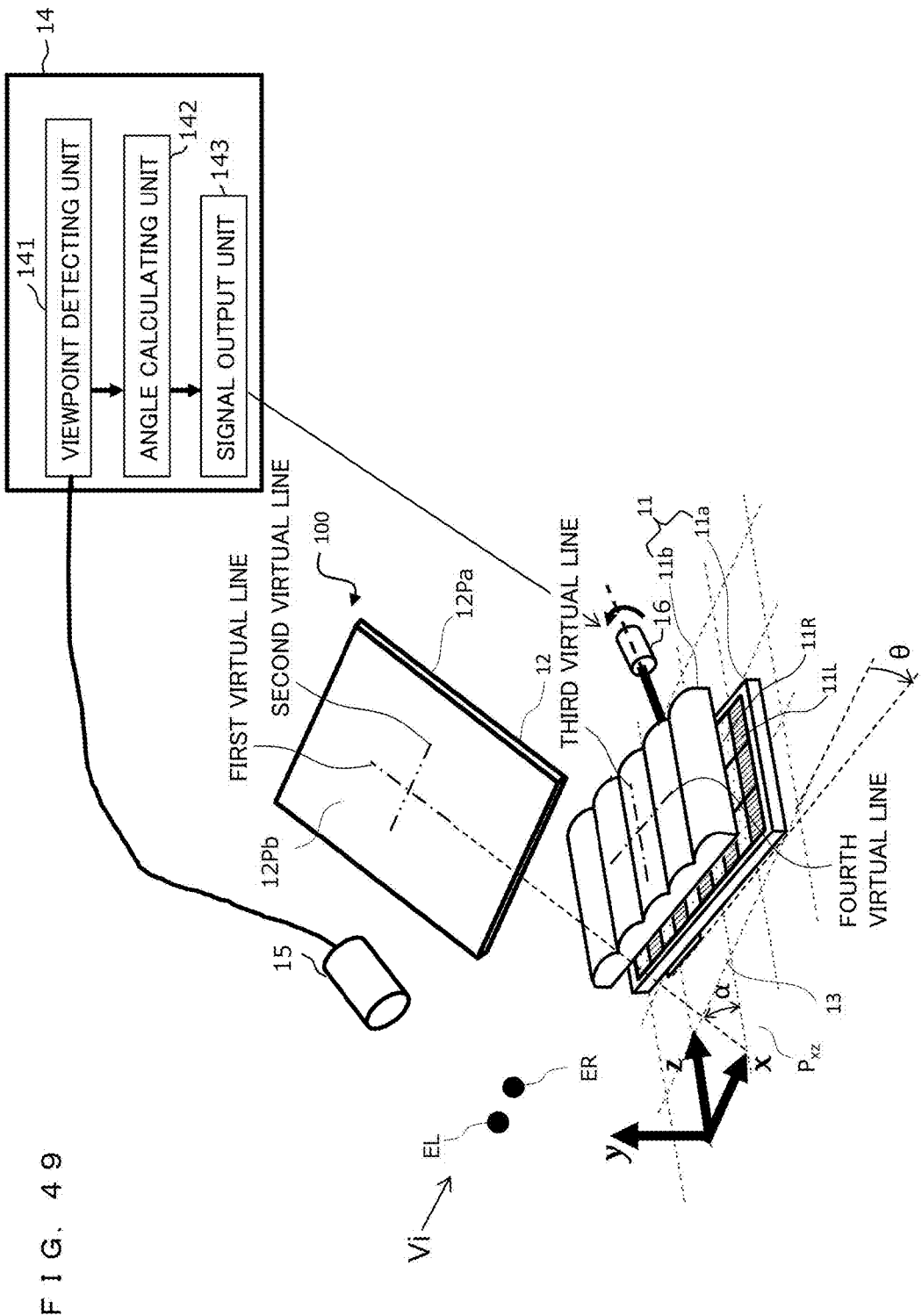
FIG. 49 is an explanatory diagram that illustrates the configuration of a stereoscopic display apparatus.

This embodiment relates to a form in which the inclination angle θ of a naked-eye stereoscopic display 11 is dynamically changed according to a change in the position of an observer. FIG. 49 is an explanatory diagram that illustrates the configuration of the stereoscopic display apparatus 100. The stereoscopic display apparatus 100 according to this embodiment includes a naked-eye stereoscopic display 11, a spatial image forming device 12, a control unit 14, an imaging unit 15, and an actuator 16. The configurations of the naked-eye stereoscopic display 11 and the spatial image forming device 12 are similar to those according to Embodiment 1, and thus, the description thereof will not be presented.

The imaging unit 15 is a camera, an infrared sensor, a laser range finder, or the like. The imaging unit 15 observes the head of an observer Vi. The imaging unit 15 outputs observation data to the control unit 14. The actuator 16 is an electronically-controllable actuator such as a motor or a solenoid. The actuator 16 arranges the naked-eye stereoscopic display 11 to be inclined by an angle θ in the counterclockwise direction by using an axis parallel to the z axis as a rotation axis. Since the angle θ is the same as the inclination angle θ arranged for suppressing the appearance of reverse viewing at the center of an image viewed by an observer at a predetermined position, which has been described in Embodiment 1, the detailed description thereof will not be presented.

The control unit 14 includes a viewpoint detecting unit 141, an angle calculating unit (inclination angle calculating unit) 142, and a signal output unit 143 as functional units. The viewpoint detecting unit 141 detects the positions (two viewpoint positions) of both eyes of the observer Vi. The viewpoint detecting unit 141 acquires the positions of both eyes of the observer Vi based on observation data input from the imaging unit 15. The angle calculating unit 142 calculates an inclination angle θs corresponding to the position of the left eye EL and the position of the right eye ER of the observer Vi that are acquired from the viewpoint detecting unit 141. The signal output unit 143, in a case where an input of a value of the inclination angle θs is received from the angle calculating unit 142, operates the actuator 16 such that the inclination angle of the naked-eye stereoscopic display 11 with respect to the first direction is changed from θ to θs. When the inclination angle θs of the naked-eye stereoscopic display 11 with respect to the first direction is θs, the signal output unit 143 stops the operation of the actuator 16. The actuator 16 according to this embodiment is configured to maintain the angle by stopping the operation. For this reason, the naked-eye stereoscopic display 11 is supported at the inclination angle θs not to move.

FIG. 50 is a block diagram that illustrates the hardware configuration of the control unit 14. The control unit 14 includes a CPU 14a, a ROM 14b, a RAM 14c, an input unit 14d, and an output unit 14e. The CPU 14a expands a control program stored in the ROM 14b into the RAM 14c and executes the control program, thereby causing the control unit 14 to function as the viewpoint detecting unit 141, the angle calculating unit 142, and the signal output unit 143. The ROM 14b, for example, is a nonvolatile semiconductor memory or a read-only storage medium other than the semiconductor memory. The RAM 14c, for example, is a static RAM (SRAM), a dynamic RAM (DRAM), or a flash memory. The RAM 14c temporarily stores data generated at the time of executing a program by using the CPU 14a. An image captured by the imaging unit 15 is input to the input unit 14d. The output unit 14e outputs a control signal to the actuator 16.

Figure 51A:
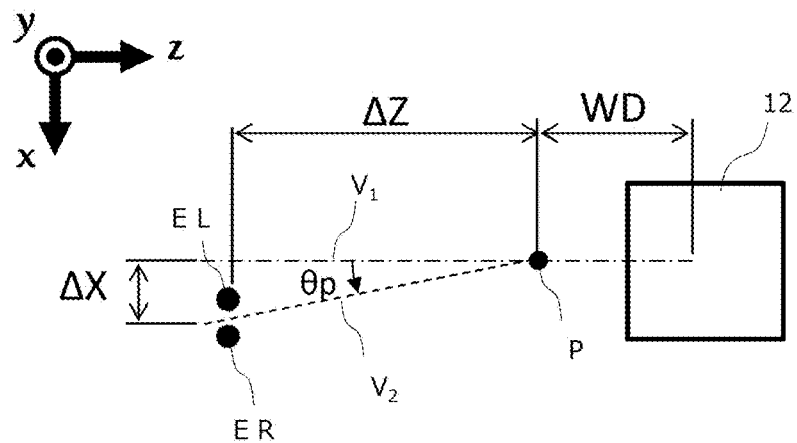
FIGS. 51A and 51B are explanatory diagrams that illustrate a method of calculating an inclination angle θs.
Figure 51B:
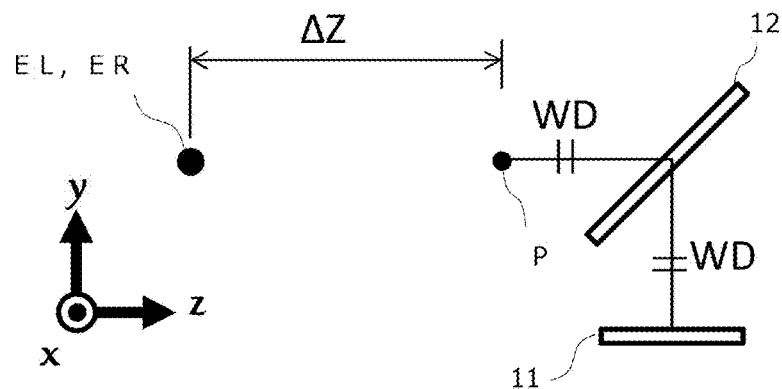

Next, a method of calculating the inclination angle θs will be described. FIGS. 51A and 51B are explanatory diagrams that illustrate a method of calculating an inclination angle θs. FIG. 51A is a top view of the left eye EL and the right eye ER of an observer and the stereoscopic display apparatus 100 viewed from the top. FIG. 51B is a side view of the left eye EL and the right eye ER of the observer and the stereoscopic display apparatus 100 viewed from the x-axis direction. As a reference for acquiring the inclination angle θs, a reference point P is set. The reference point P is a point that is included in a floating image in the air. The reference point P is a point of plane symmetry for the center point of the display area of the naked-eye stereoscopic display 11 with respect to the spatial image forming device 12. When a distance between the spatial image forming device 12 and the naked-eye stereoscopic display 11 is WD, a distance between the spatial image forming device 12 and the reference point P is WD as well. The reason for this is that the spatial image forming device 12 forms an image of the naked-eye stereoscopic display 11 at a position of plane symmetry. Here, a straight line joining the left eye EL and the right eye ER of the observer is parallel to the x axis. The center point of the display area of the naked-eye stereoscopic display 11 will be also referred to as a first point. In addition, the reference point P may be also referred to as a second point.

An angle formed by the following two straight lines is θp. The two straight lines are acquired by projecting the reference point P and the left eye EL and the right eye ER of the observer onto an xz plane. One straight line is a straight line V1 parallel to the z axis. The other straight line is a straight line V2 that is parallel to a segment joining the reference point P and a center point of the left eye EL and the right eye ER.

A distance from the reference point P to both the eyes EL and ER of the observer Vi in the z-axis direction will be denoted by ΔZ. In addition, a distance between the reference point P and the center point of the left eye EL and the right eye ER in the x-axis direction will be denoted by ΔX. Then, θp is acquired using the following Equation (1). In addition, the inclination angle θs is acquired using Equation (2).

$$\theta_p = \tan^{-1}(\Delta X/\Delta Z) \quad (1)$$

$$\theta_s = \theta + \theta_p \quad (2)$$

Regarding the sign of θp, a positive value is acquired when the observer moves in the +x direction, and a negative value is acquired when the observer moves in the −x direction.

Figure 52:
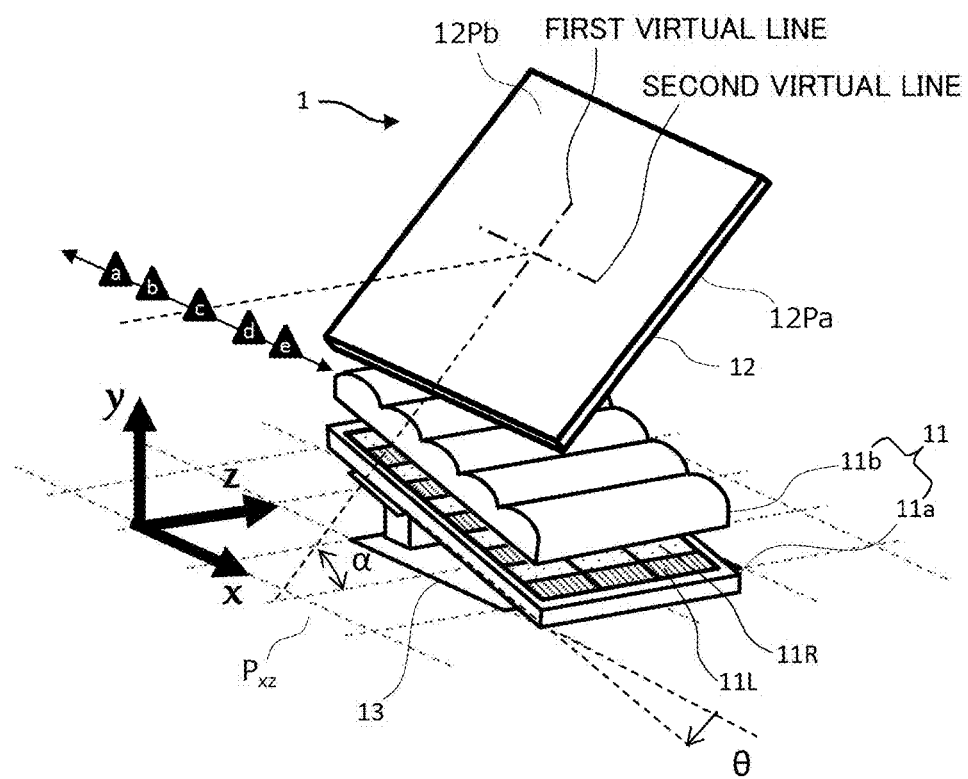
FIG. 52 is an explanatory diagram that illustrates a relation between a stereoscopic display apparatus and the position of an observer.

Next, the meaning of dynamically changing the inclination angle of the naked-eye stereoscopic display 11 will be described. FIG. 52 is an explanatory diagram that illustrates a relation between the stereoscopic display apparatus 1 and the position of an observer. White characters a, b, c, d, and e enclosed by triangles illustrated in FIG. 52 represent the positions of the observer. Each of the positions represents a center position of the left eye EL and the right eye ER of the observer.

Figure 53A:
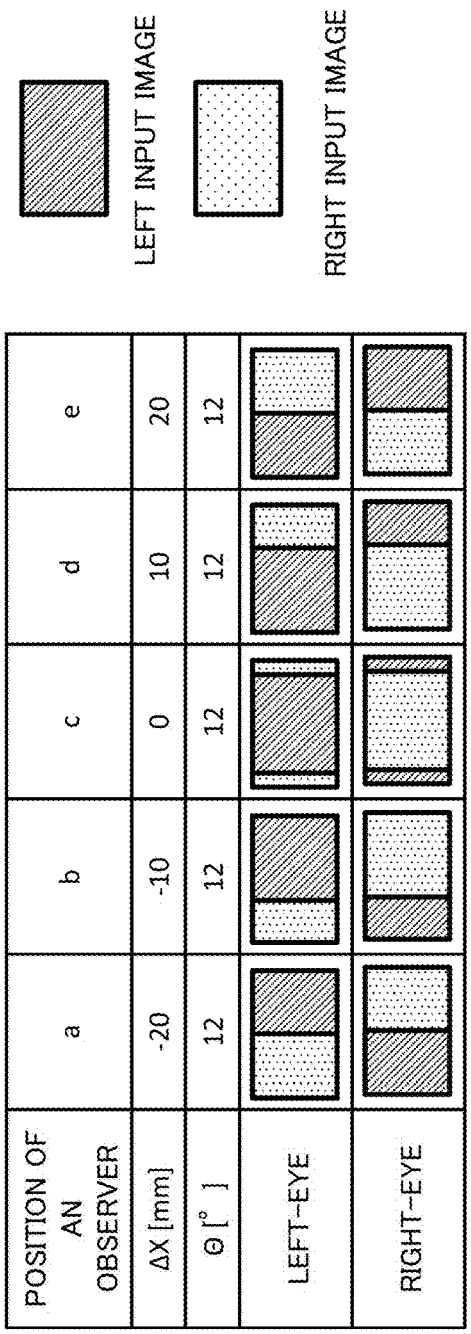
FIGS. 53A and 53B are explanatory diagrams that illustrate relations between the position of an observer and images visually recognized by the observer.
Figure 53B:
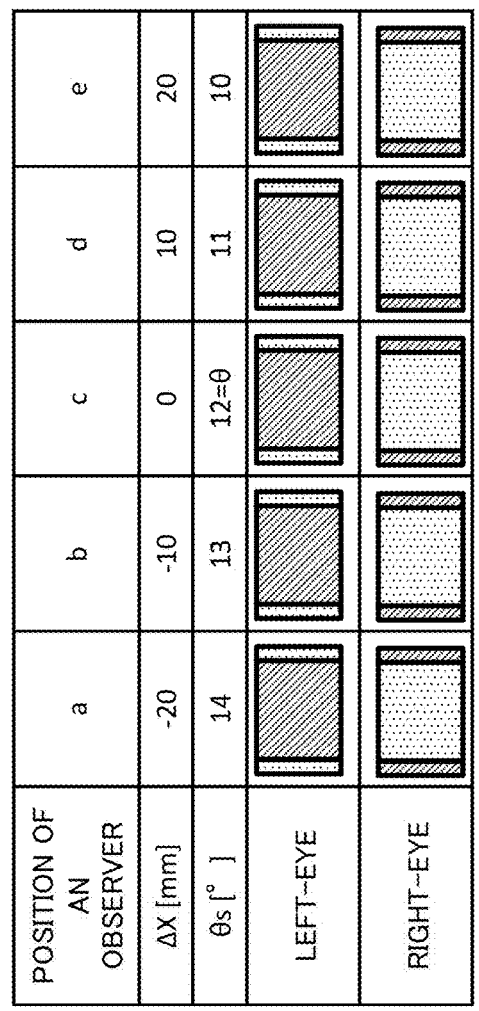

FIGS. 53A and 53B are explanatory diagrams that illustrate relations between the position of an observer and images visually recognized by the observer. FIG. 53A illustrates images that are visually recognized by the observer in a case where the inclination angle is a constant angle θ without detecting the position of the observer. FIG. 53B illustrates images that are visually recognized by an observer in a case where the position of the observer is detected, and the inclination angle θs is changed in accordance therewith. As illustrated in FIG. 53A, in a case where the position of the observer is located at the position c, a left-eye image is arranged at the center of an image viewed by the left eye, and a right-eye image is arranged at the center of an image viewed by the right eye, whereby reverse viewing at the center is prevented. However, when the position of the observer is the position b or d, the area of an input image (right input image) of a right-eye pixel in the image visually recognized by the left eye is increased. The area of an input image (left input image) of the left-eye pixel in the image visually recognized by the right eye is increased. In addition, when the position of the observer is the position a or e, the area of the left input image and the area of the right input image in the images visually recognized by the left eye and the right eye are half and half. A half area of the image visually recognized by the observer becomes a reverse viewing area.

On the other hand, as illustrated in FIG. 53B, in a case where the inclination angle θs is changed according to the position of the observer, the appearance of a reverse viewing area can be suppressed.

As above, according to this embodiment, by dynamically changing the inclination angle of the naked-eye stereoscopic display 11 in accordance with a change in the position of the observer, also in a case where the observer is not located at a predetermined position, the appearance of a reverse viewing area can be suppressed.

Embodiment 4

Figure 54:
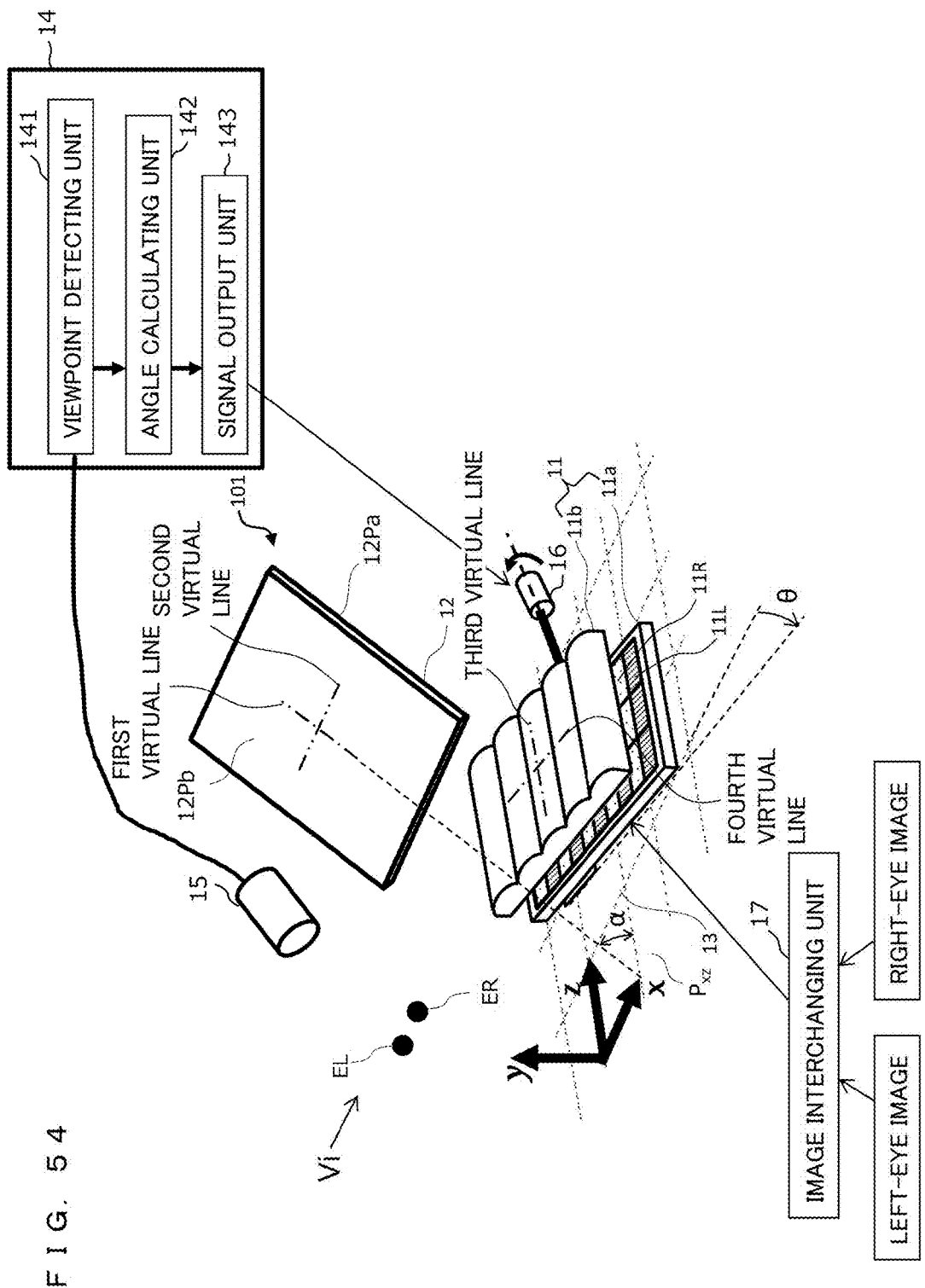
FIG. 54 is an explanatory diagram that illustrates the configuration of a stereoscopic display apparatus.

This embodiment relates to a form in which the appearance of a reverse viewing area is suppressed by an image process, and the naked-eye stereoscopic display 11 is inclined according to the position of an observer. FIG. 54 is an explanatory diagram that illustrates the configuration of a stereoscopic display apparatus 101. The configuration of the stereoscopic display apparatus 101 is similar to that according to Embodiment 3 except for an image interchanging unit 17. The image interchanging unit 17 receives a left-eye image and a right-eye image to be displayed on the naked-eye stereoscopic display 11 as inputs. The image interchanging unit 17 performs an image interchanging process and outputs an image after the process to the naked-eye stereoscopic display 11. The image interchanging process will be described later.

Before the description of the image interchanging process, a change in the visual appearance of an image according to the movement of an observer will be described. FIGS. 55A and 55B are explanatory diagrams that illustrate changes in the visual appearance of a single body of the naked-eye stereoscopic display 11. FIG. 55A is an explanatory diagram of a case where the observer Vi is located on the front side of the naked-eye stereoscopic display 11. FIG. 55B is an explanatory diagram of a case where the observer Vi moves from the front side of the naked-eye stereoscopic display 11 in the +x direction.

As illustrated in FIGS. 55A and 55B, a distance between the observer Vi and the naked-eye stereoscopic display 11 is positioned at the optimal visual recognition distance (Dop)× 0.5 and is less than the minimum stereoscopic visual recognition distance Dmin. For this reason, in an image viewed by the left eye and the right eye of the observer Vi, according to the influence of high-order light of secondary light or third-order light, an input image of the left-eye pixel 11L and an input image of the right-eye pixel 11R are repeated.

For this reason, in a case where the observer Vi is present on the front side of the naked-eye stereoscopic display 11, an image viewed by the right eye of the observer Vi and an image viewed by the left eye are as illustrated in a lower level of FIG. 55A. In other words, the center portion of the image viewed by the right eye is an image of the second area A2. However, in both left and right end portions of an image viewed by the right eye, images other than the image of the second area A2 are mixed according to the influence of high-order light. The center portion of the image viewed by the left eye is an image of the first area A1. However, in both left and right end portions of an image viewed by the left eye, images other than the image of the first area A1 are mixed according to the influence of high-order light.

Figure 56:
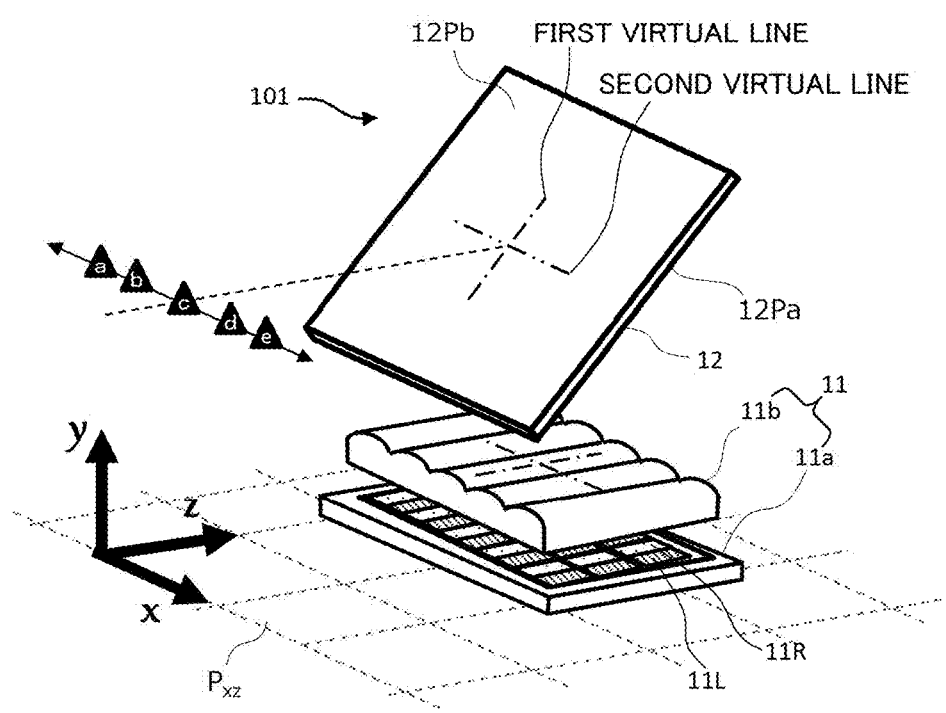
FIG. 56 is an explanatory diagram that illustrates a relation between a stereoscopic display apparatus and the position of an observer.

Next, the visual appearance of an image of the stereoscopic display apparatus 101 will be described. FIG. 56 is an explanatory diagram that illustrates a relation between the stereoscopic display apparatus 1 and the position of an observer. Since the stereoscopic display apparatus 101 illustrated in FIG. 56 is set as θ=0, the naked-eye stereoscopic display 11 is not inclined. White characters a, b, c, d, and e each enclosed by a triangle illustrated in FIG. 56 represent the positions of the observer. Each of the positions represents a center position of the left eye EL and the right eye ER.

FIGS. 57A and 57B are explanatory diagrams that illustrate relations between the position of an observer and images visually recognized by the observer. FIG. 57A illustrates images of a case where the image interchanging unit 17 is not present. FIG. 57B illustrates images of a case where the image interchanging unit 17 is present. The image interchanging unit 17 interchanges a left-eye image and a right-eye image to be displayed on the naked-eye stereoscopic display 11. Accordingly, in the stereoscopic display apparatus 101 combining the spatial image forming device 12, the reverse viewing of the center portion of the image is converted into normal viewing. However, when the observer Vi moves to any one of positions (for example, positions a, b, d, and e) other than the position c, the area of reverse viewing is increased.

Thus, according to the position of the observer Vi, the naked-eye stereoscopic display 11 is inclined. FIG. 58 is an explanatory diagram that illustrates a relation between the position of the observer Vi and images visually recognized by the observer Vi. As illustrated in FIG. 58, according to the position of the observer Vi, the naked-eye stereoscopic display 11 is inclined by θs from the initial state. Accordingly, also in a case where the observer Vi moves from the position c of the stereoscopic display apparatus 1, an increase in the reverse viewing area can be suppressed.

Figure 59:
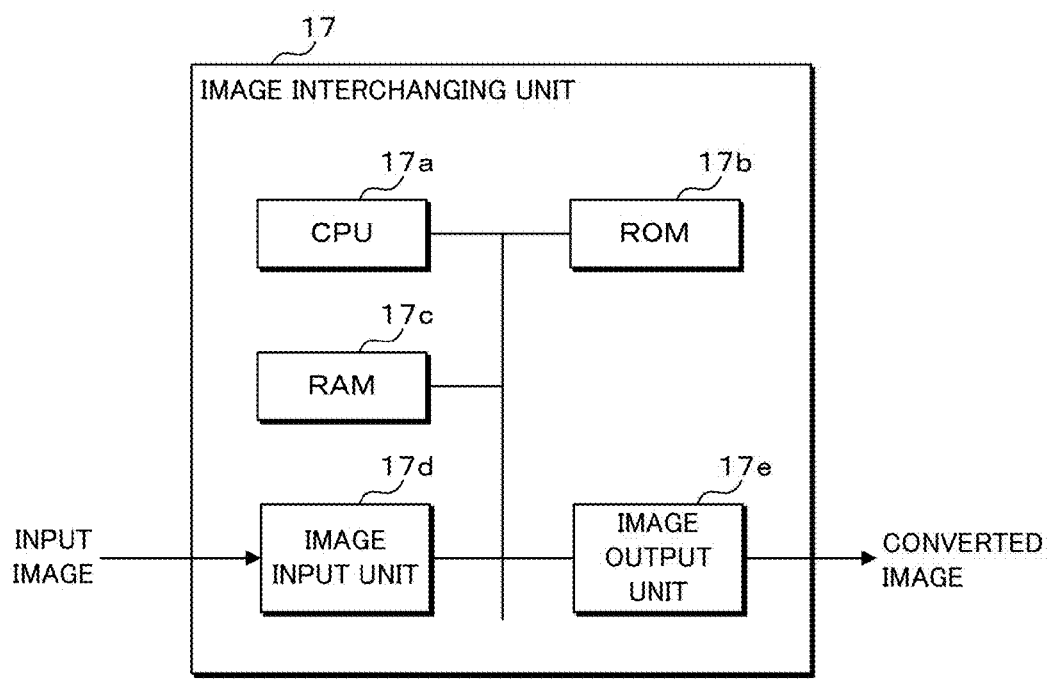
FIG. 59 is a block diagram that illustrates the configuration of an image interchanging unit included in a stereoscopic display apparatus.

FIG. 59 is a block diagram that illustrates the configuration of the image interchanging unit 17 included in the stereoscopic display apparatus 101. The image interchanging unit 17 includes a CPU 17a, a ROM 17b, a RAM 17c, an image input unit 17d, and an image output unit 17e. The CPU 17a expands a control program stored in the ROM 17b into the RAM 17c and executes the control program, thereby controlling each unit. The RAM 17c, for example, is a SRAM, a DRAM, or a flash memory. The RAM 17c temporarily stores data generated when the CPU 17a executes a program. Images to be displayed on the naked-eye stereoscopic display 11 are input to the image input unit 17d. The image output unit 17e outputs a converted image after the conversion process of the input image.

Figure 60:
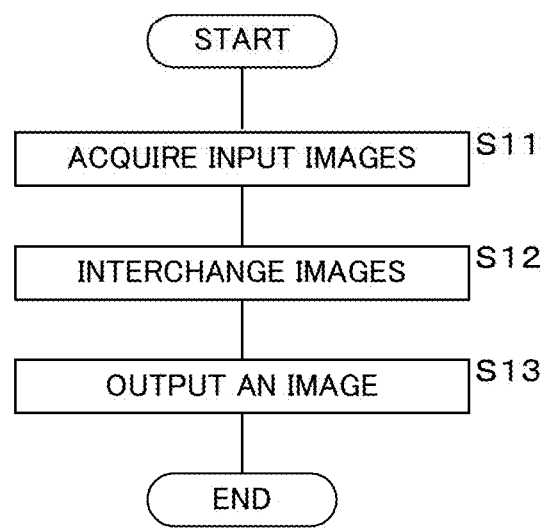
FIG. 60 is a flowchart that illustrates the sequence of an image interchanging process performed by the image interchanging unit.

FIG. 60 is a flowchart that illustrates the sequence of an image interchanging process performed by the image interchanging unit 17. The CPU 17a acquires input images through the image input unit 17d (Step S11). Next, the CPU 17a interchanges a left-eye image and a right-eye image of the reverse viewing area (Step S12). Then, the CPU 17a outputs an image for which image interchanging has been performed to the naked-eye stereoscopic display 11 through the image output unit 17e (Step S13).

Figure 61A:
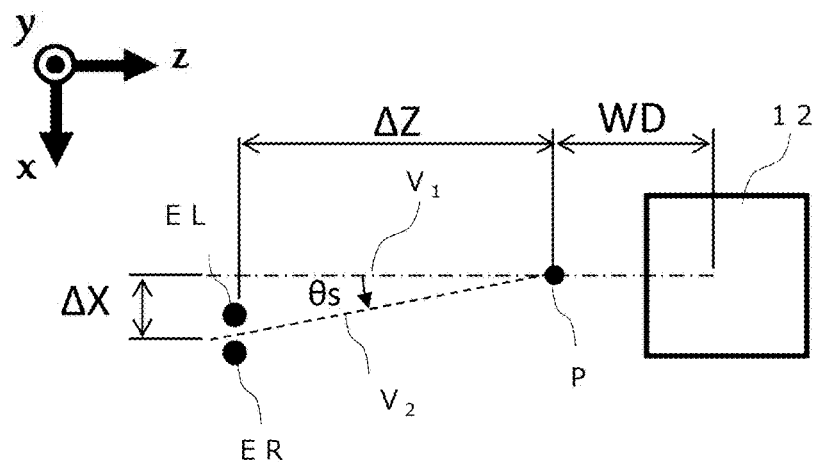
FIGS. 61A and 61B are diagrams that illustrate a method of calculating an inclination angle θs.
Figure 61B:
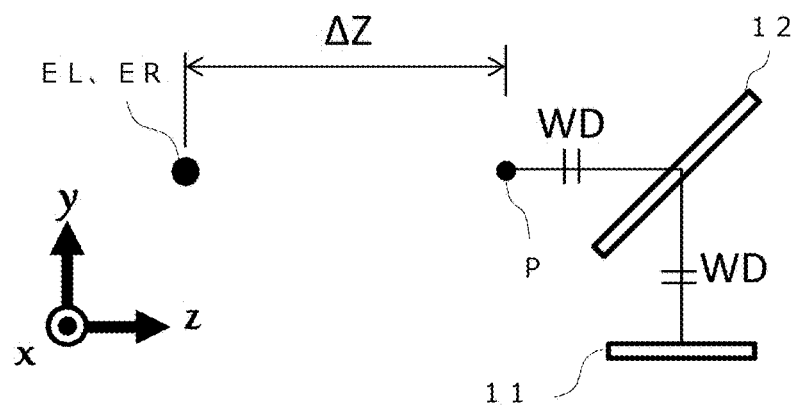

Next, the method of calculating the inclination angle θs will be described. FIGS. 61A and 61B are diagrams that illustrate a method of calculating an inclination angle θs. FIG. 61A is a top view of the observer Vi and the stereoscopic display apparatus 101 viewed from the top. FIG. 61B is a side view of the observer Vi and the stereoscopic display apparatus 101 viewed from the x-axis direction. As a reference used for acquiring the inclination angle θs, a reference point P is set. The reference point P is a point included in a floating image in the air. The reference point P is a point of plane symmetry for the center point of the display area of the naked-eye stereoscopic display 11 with respect to the spatial image forming device 12. When a distance between the spatial image forming device 12 and the naked-eye stereoscopic display 11 is WD, a distance between the spatial image forming device 12 and the reference point P is WD as well. The reason for this is that the spatial image forming device 12 forms an image of the naked-eye stereoscopic display 11 at a position of plane symmetry. In addition, a straight line joining the left eye EL and the right eye ER of the observer Vi is assumed to be parallel to the x axis.

An angle formed by the following two straight lines is the inclination angle θs. The two straight lines are acquired by projecting the reference point P and the left eye EL and the right eye ER of the observer Vi onto the xz plane. One straight line is a straight line $V_1$ that is parallel to the z axis. The other straight line is a straight line $V_2$ that is parallel to a segment joining the reference point P and the center point of the left eye EL and the right eye ER.

A distance from the reference point P to the positions of both the eyes EL and ER of the observer Vi in the z-axis direction is ΔZ. A distance between the reference point and the center point of the left eye EL and the right eye ER in the x-axis direction is ΔX. Then, the inclination angle θs is acquired using the following Equation (3).

$$\theta_s = \tan^{-1}(\Delta X/\Delta Z) \quad (3)$$

Regarding the sign of θs, a positive value is acquired when the observer moves in the +x direction, and a negative value is acquired when the observer moves in the −x direction.

As above, in this embodiment, in a case where the observer is present on the front side of the stereoscopic display apparatus 101, by performing the image process, the appearance of a reverse viewing area can be suppressed. In addition, since the naked-eye stereoscopic display 11 is arranged to be dynamically inclined according to the position of the observer, also in a case where the observer is not present on the front side of the stereoscopic display apparatus 101, the appearance of a reverse viewing area can be suppressed, similar to the case there the observer is present on the front side of the stereoscopic display apparatus 101.

In the present embodiment, θ=0 is set when the observer is positioned on the front side, but when the characteristics of the spatial image forming device 12 actually used are not ideal, there may be a case where deviation occurs in the normal viewing area viewed from the left eye and the right eye on the front side. It is also possible to correct this deviation and to add a correction angle to θ in order to maximize the region visible from the left and right eyes to the normal view. For example, in order to correct the characteristics of the spatial image forming device 12, θ=0.9 may be set.

Embodiment 5

This embodiment relates to a configuration in which a spatial image forming device 12 is inclined according to a change in the position of the observer. In this embodiment, by inclining the spatial image forming device 12 without inclining a naked-eye stereoscopic display 11, also in a case where the position of the observer is changed, the appearance of a reverse viewing area in an image that is visually recognized by the observer is suppressed.

Figure 62:
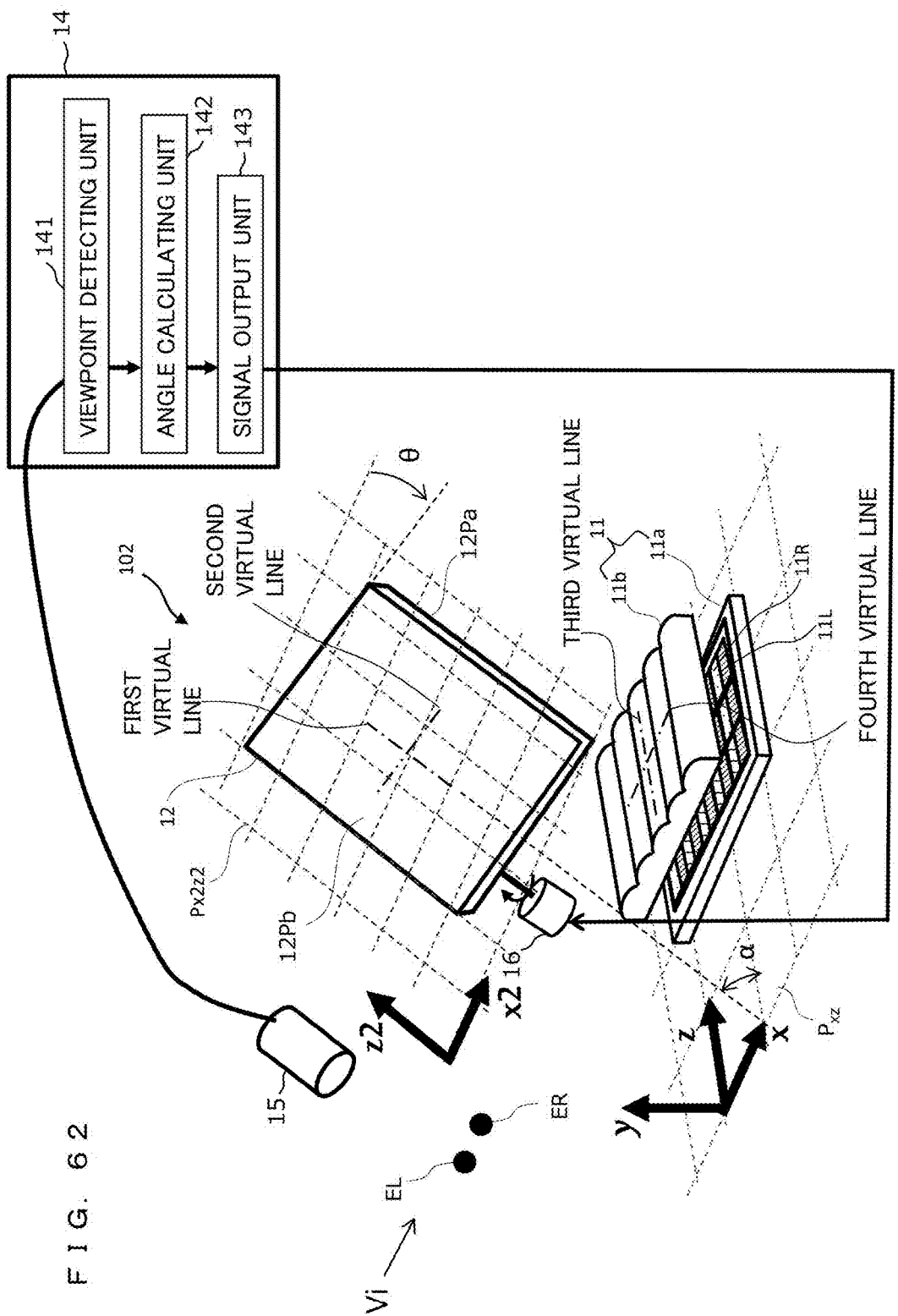
FIG. 62 is an explanatory diagram that illustrates the configuration of a stereoscopic display apparatus.

FIG. 62 is an explanatory diagram that illustrates the configuration of a stereoscopic display apparatus 102. The stereoscopic display apparatus 102 according to this embodiment includes a naked-eye stereoscopic display 11, a spatial image forming device 12, a control unit 14, an imaging unit 15, and an actuator 16. The actuator 16 arranges the spatial image forming device 12 to be inclined by an angle θ in the counterclockwise direction by using an axis parallel to the z2 axis as a rotation axis. The configurations of the naked-eye stereoscopic display 11 and the spatial image forming device 12 are similar to those according to Embodiment 1, and thus, the description thereof will not be presented. In addition, since the configuration of the imaging unit 15 is similar to that according to Embodiment 3, and thus, the description thereof will not be presented.

The control unit 14 includes a viewpoint detecting unit 141, an angle calculating unit 142, and a signal output unit 143 as functional units. The viewpoint detecting unit 141 and the angle calculating unit 142 are similar to those according to Embodiment 3. The signal output unit 143, in a case where a control signal of the inclination angle θs is received from the angle calculating unit 142, operates the actuator 16 such that the inclination angle of the spatial image forming device 12 with respect to the first direction is changed from θ to θs. When the inclination angle θs of the spatial image forming device 12 with respect to the first direction is θs, the signal output unit 143 stops the operation of the actuator 16. Similar to Embodiment 3, the actuator 16 according to this embodiment is configured to maintain the angle by stopping the operation, and accordingly, the spatial image forming device 12 is supported at the inclination angle θs not to move.

Figure 63:
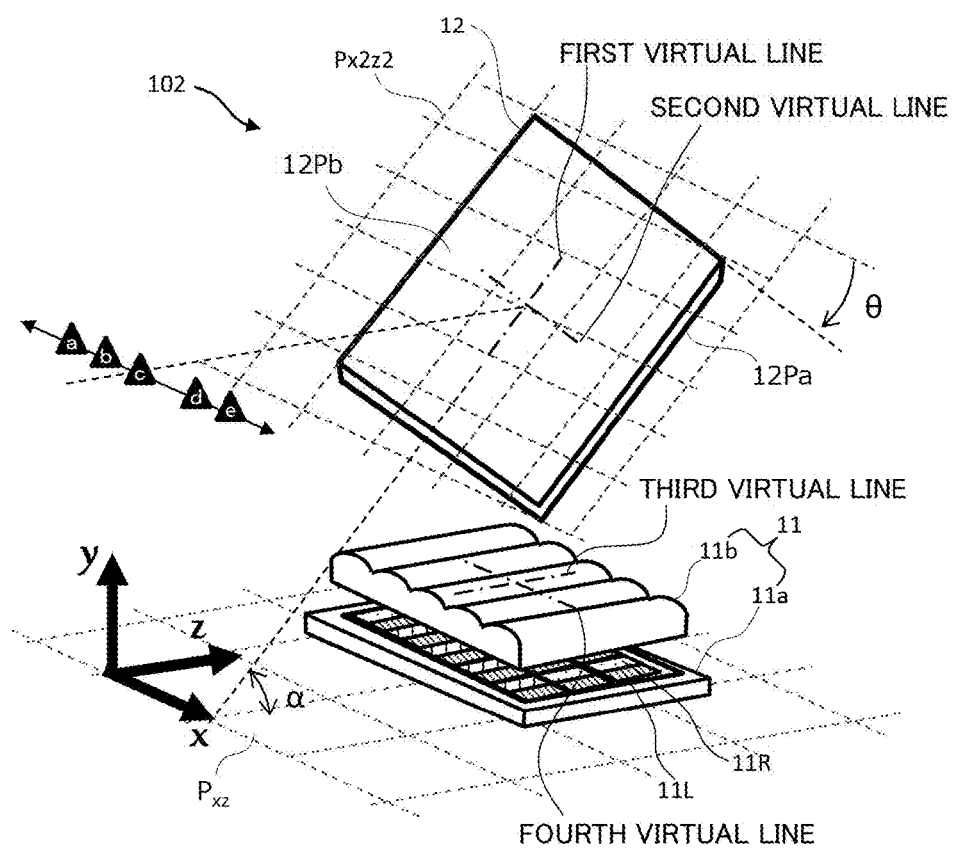
FIG. 63 is an explanatory diagram that illustrates a relation between a stereoscopic display apparatus and the position of an observer.

Next, the meaning of dynamically changing the inclination angle of the spatial image forming device 12 will be described. FIG. 63 is an explanatory diagram that illustrates a relation between the stereoscopic display apparatus 102 and the position of an observer. White characters a, b, c, d, and e enclosed by triangles illustrated in FIG. 63 represents the positions of the observer. Each of the positions represents a center position of the left eye EL and the right eye ER of the observer.

FIG. 64 is an explanatory diagram that illustrates a relation between the position of an observer and an image visually recognized by the observer. FIG. 64 illustrates images that are visually recognized by the observer in a case where the position of the observer is detected, and the inclination angle θs is changed in accordance therewith. As illustrated in FIG. 64, similar to Embodiment 3, by changing the inclination angle θs in accordance with the position of the observer, the left side and the right side of an image incident to the spatial image forming device 12 are interchanged, and the appearance of a reverse viewing area can be suppressed.

As above, according to this embodiment, by dynamically changing the inclination angle of the spatial image forming device 12 in accordance with a change in the position of the observer, also in a case where the observer is not located on the front side of the stereoscopic display apparatus 1, the appearance of a reverse viewing area can be suppressed.

Embodiment 6

Figure 65:
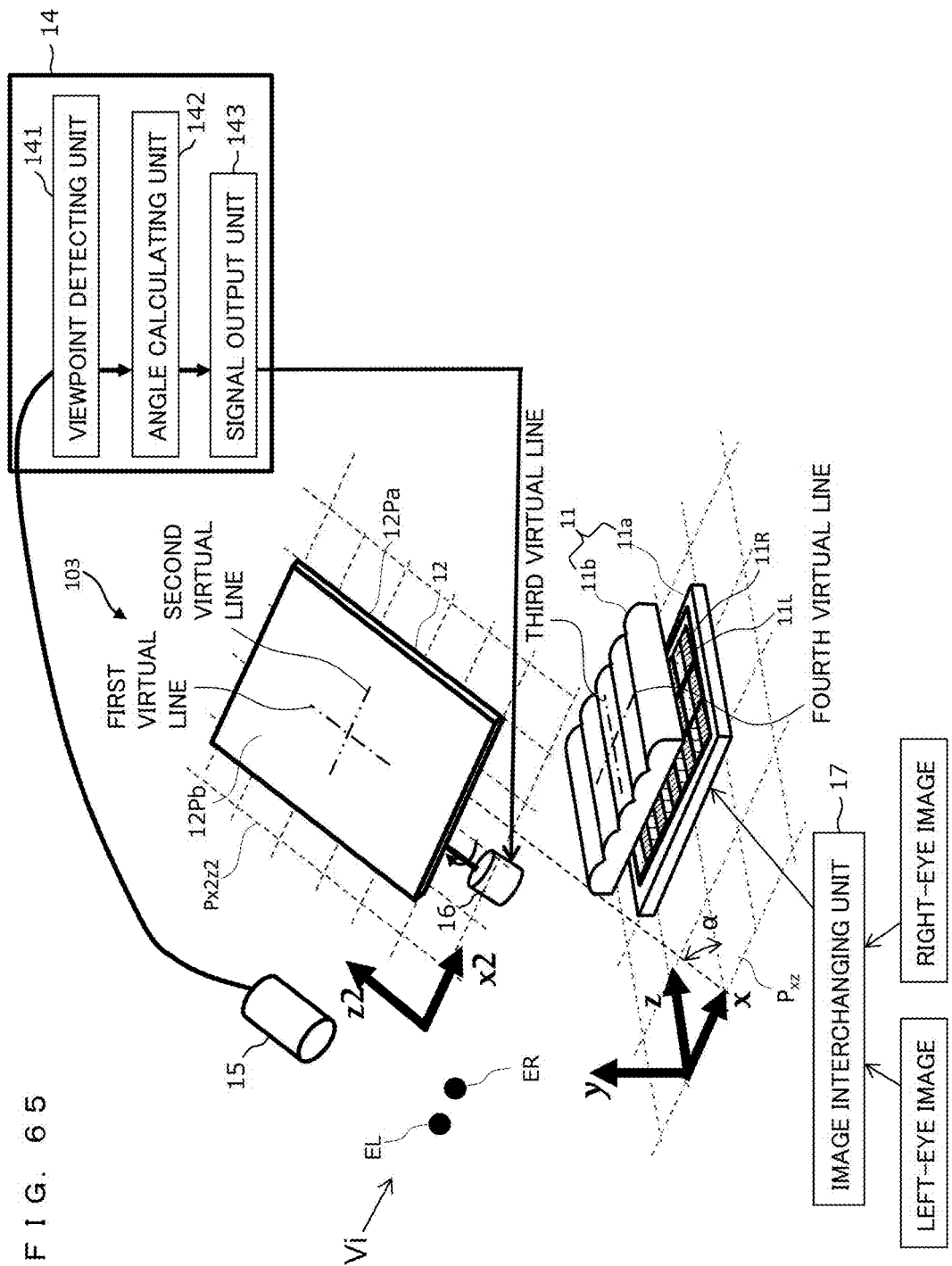
FIG. 65 is an explanatory diagram that illustrates the configuration of a stereoscopic display apparatus.

This embodiment has a form in which an image interchanging process is added to Embodiment 5, similar to the form of Embodiment 4 that is acquired by adding the image interchanging process to Embodiment 3. This embodiment relates to a form in which the appearance of a reverse viewing area is suppressed by an image interchanging process, and the spatial image forming device 12 is inclined according to the position of the observer. FIG. 65 is an explanatory diagram that illustrates the configuration of a stereoscopic display apparatus 103. The configuration of the stereoscopic display apparatus 103 is similar to that according to Embodiment 5 except for an image interchanging unit 17. The image interchanging unit 17 receives a left-eye image and a right-eye image to be displayed on the naked-eye stereoscopic display 11 as inputs. The image interchanging unit 17 performs an image interchanging process and outputs an image after the process to the naked-eye stereoscopic display 11. The image interchanging process is similar to that according to Embodiment 4, and thus, the description thereof will not be presented.

The change of the visual appearance of an image according to the movement of the observer Vi, the visual appearance of an image in the stereoscopic display apparatus 103, and the image process performed by the image interchanging unit 17 are similar to those according to Embodiment 4, and thus, the description thereof will not be presented.

Embodiment 7

Figure 66A:
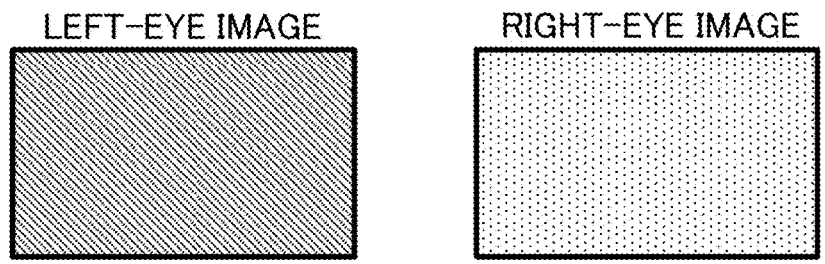
FIGS. 66A to 66C are schematic diagrams that illustrate an example of an area of reverse viewing.
Figure 66B:
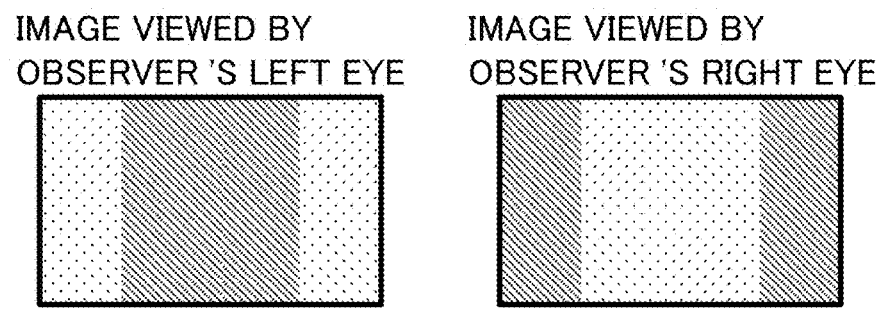
Figure 66C:
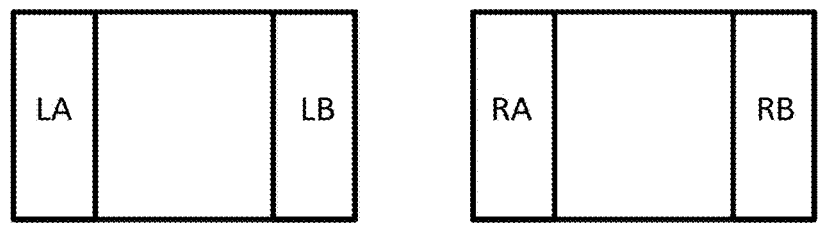

This embodiment has a form in which an image process is added to Embodiment 1. As described above, according to Embodiment 1, there are cases where areas of normal viewing and reverse viewing are alternately mixed in a first direction (a direction in which the left eye and the right eye of an observer are aligned) in an image viewed by the observer. FIGS. 66A to 66C are schematic diagrams that illustrate an example of an area of reverse viewing. A left-eye image and a right-eye image illustrated in FIG. 66A are input to the stereoscopic display apparatus 1 (see FIG. 1) described in Embodiment 1, and in the case that a distance between the naked-eye stereoscopic display 11 and the spatial image forming device 12, for example, is the optimal visual recognition distance Dop×0.5 of the naked-eye stereoscopic display 11, in the left eye and the right eye of the observer located at a predetermined position, as illustrated in FIG. 66B, an area in which a left-eye image and a right-eye image are interchanged is present, and reverse viewing is visually recognized. At this time, in the left-eye image and the right-eye image, areas in which reverse viewing is visually recognized are, as illustrated in FIG. 66C, areas LA, LB, RA, and RB.

Thus, in this embodiment, by determining an area in which the left-eye image and the right-eye image are interchanged in advance and interchanging an image of a portion corresponding to the area determined in advance, the appearance of a reverse viewing area is further suppressed.

The areas to be interchanged can be determined based on the display screen size and the stereoscopic view area of the naked-eye stereoscopic display 11, a distance and an arrangement relation between the naked-eye stereoscopic display 11 and the spatial image forming device 12, and the position of the observer. Accordingly, in a case where the arrangement relation including the distance between the naked-eye stereoscopic display 11 and the spatial image forming device 12 is determined, the areas to be interchanged can be acquired based on the angle of light rays contributing to the formation of an area in which primary light is dominant, which is acquired from the luminance profile of the naked-eye stereoscopic display 11, the width of a display screen of the naked-eye stereoscopic display 11 that is formed inside a space, and the distance between the image formed inside the space and the observer.

Figure 68A:
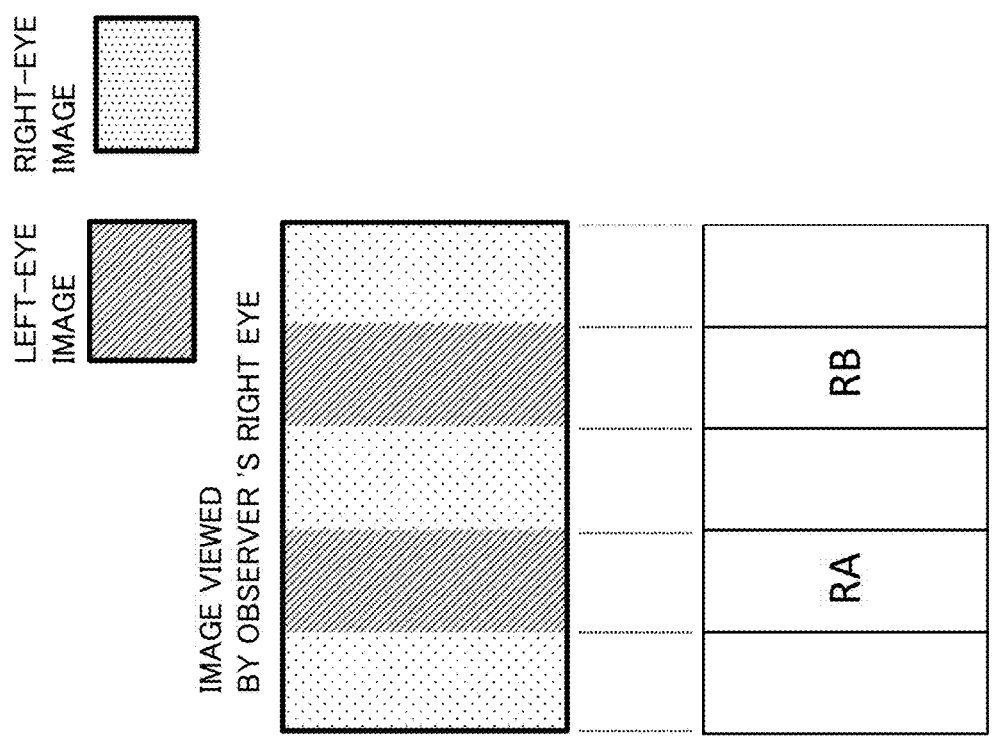
FIGS. 68A and 68B are schematic diagrams that illustrate an example of areas to be interchanged with each other in which an observer moves.
Figure 68B:
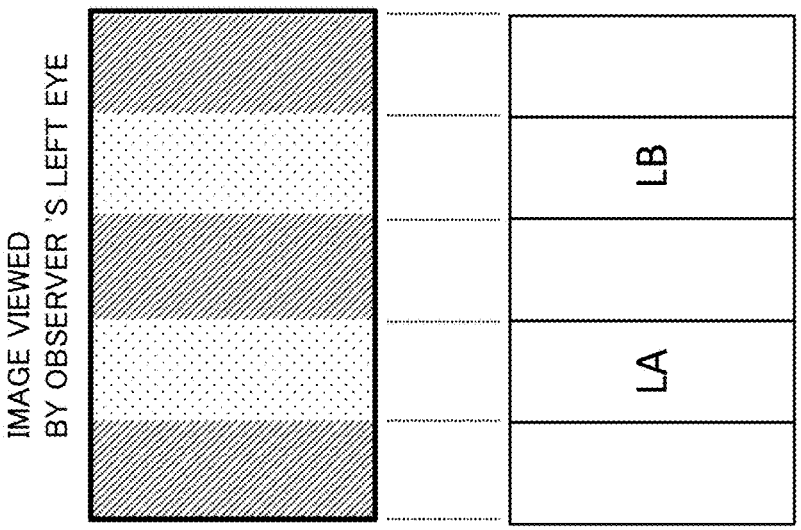

FIGS. 67A and 67B are explanatory diagrams that illustrate a method of calculating areas to be interchanged with each other. FIGS. 68A and 68B are schematic diagrams that illustrate an example of areas to be interchanged with each other in which an observer moves. In FIG. 67A, both eyes EL and ER of the observer Vi and the display of a naked-eye stereoscopic display formed in the space by the spatial image forming device 12 are illustrated. In FIG. 67B, areas LA and LB and areas RA and RB in which images are in the middle of formation in the space viewed by the left eye and the right eye of the observer are illustrated.

Since a real body located on one face side is formed as a real image on the other face side by the spatial image forming device 12, the width WS of the spatial image formation is equal to the width of the display surface of the naked-eye stereoscopic display (not illustrated in the drawing). In addition, the reference point P included in the spatially formed image is located at the position of a distance WD from the spatial image forming device in the z axis direction. The WD, as described in Embodiment 3, is equal to the distance WD between the spatial image forming device 12 and the naked-eye stereoscopic display (see FIGS. 51A and 51B).

When a distance in the z axis direction from the reference point P to the center point of the left eye EL and the right eye ER of the observer is ΔZ, and the angle of light rays contributing to the formation of an area in which primary light is dominant, which is acquired from the luminance profile (see FIG. 34) of the naked-eye stereoscopic display, is θL, a ratio EA of an area located at the center in the width WS of the spatial image forming is acquired using the following Equation (4). In addition, the acquired ratio EA of the areas and the number Ln of areas including areas to be interchanged with each other are acquired using Equation (5). Furthermore, the number Lm of areas to be interchanged with each other is acquired using Equation (6). In addition, a ratio Wx that is a ratio of each of the area LA and the area LB (or the area RA and the areas RB) occupied in the spatially formed image is acquired using Equation (7).

$$EA = \frac{\tan(\theta L)\Delta Z}{WS} \quad (4)$$

$$Ln = INT\left(\frac{1-EA}{\frac{1}{2}EA}\right) \times 2 + 3 \quad (5)$$

$$Lm = INT\left(\frac{Ln}{3}\right) \times 2 \quad (6)$$

$Wx$ under $EA \geq 0.33$ $$Wx = \frac{1-EA}{Lm} \quad (7)$$

$Wx$ under $EA < 0.33$ $$Wx = \frac{1-EA}{Lm} - \left(\frac{1-EA}{Lm} - EA\right)$$

For example, in a case where the distance between the spatial image forming device and the naked-eye stereoscopic display 11 is Dop×0.5, the display width of the naked-eye stereoscopic display 11 is 150 mm, and the light ray angle θL is 12°, when an observer is located at a position at which ΔZ=400 mm, the ratio EA of the occupancy of the center area in the spatial imaging is (tan(12°)×400)/150=56.7%.

In addition, the number Ln of areas generated in the spatial imaging is INT((1−0.567)/(½×0.567))×2+3=3, the number Lm of areas to be interchanged with each other is INT(3/3)×2=2, and the ratio Wx of each of the areas LA and RA occupied in the spatially formed image is (1−0.567)/2=21.65%. Since areas of normal viewing and reverse viewing are alternately mixed in the first direction (a direction in which the left eye and the right eye of the observer are aligned), as illustrated in FIG. 67B, the area LA, a center area (normal viewing), and the area LB are arranged in the first direction in the spatially formed image viewed by the left eye of the observer, and the area RA, a center area (normal viewing), and the area RB are arranged in the first direction in the spatially formed image viewed by the right eye of the observer.

In addition, for example, when the distance between the spatial image forming device 12 and the naked-eye stereoscopic display 11 is Dop×0.5, and the observer moves to a position of ΔZ=150 mm from the position of ΔZ=400 mm, spatial imaging as illustrated in FIG. 68A is viewed by the observer. In this case, the ratio EA of the occupancy of the center area is (tan(12°)×150)/150=21.3%, the number Ln of areas generated in the spatial imaging is INT((1−0.213)/(½× 0.213))×2+3=5, the number Lm of areas to be interchanged with each other is INT(⅗)×2=2, and the ratio Wx of each of the areas LA and RA occupied in the spatially formed image is (1−0.213)/2−((1−0.213)/2−0.213)=21.3%, and, as illustrated in FIG. 68B, the area LA and LB and the areas RA and RB to be interchanged with each other are located at positions adjacent to the center area.

By acquiring the ratio of the occupancy of areas to be interchanged with each other in the spatially formed image, the size of images that are interchanged between the left-eye image and the right-eye image can be acquired. For example, in a case where each of the left-eye image and the right-eye image is an image configured by 1,920 pixels in the horizontal direction, at ΔZ=400 mm, images of ranges having positions located away by 544 pixels (=1920×0.567/2) from the center of the image toward the end of the image in the horizontal direction as start points and arriving at positions located away by 416 pixels (=1920×0.2165) further toward the end of the image in the horizontal direction are interchanged with each other in the left-eye image and the right-eye image. Similarly, at ΔZ=150 mm, images of ranges having positions located away by 204 pixels (=1920× 0.213/2) from the center of the image toward the end of the image in the horizontal direction as start points and arriving at positions located away by 409 pixels (=1920×0.213) further toward the end of the image in the horizontal direction are interchanged with each other in the left-eye image and the right-eye image.

As above, in a case where the ratio EA of the area positioned at the center can be acquired according to the position of the observer, the ratio of areas to be interchanged with each other in the spatially formed image can be acquired, and the size of images in which the left-eye image and the right-eye image are interchanged can be acquired. In addition, in order to acquire the ratio EA of the area located at the center, while the light ray angle θL acquired from the luminance profile of the naked-eye stereoscopic display 11 is used, other conditions such as a pixel pitch of a display panel configuring the naked-eye stereoscopic display 11, a lens pitch of the lenticular lens, and a distance between a pixel and the lens may be used, and, by capturing the appearance of light exiting from the naked-eye stereoscopic display 11 from a predetermined position by using a camera capturing the display surface of the naked-eye stereoscopic display 11, the ratio may be acquired based on the captured image (see FIG. 8).

Figure 69:
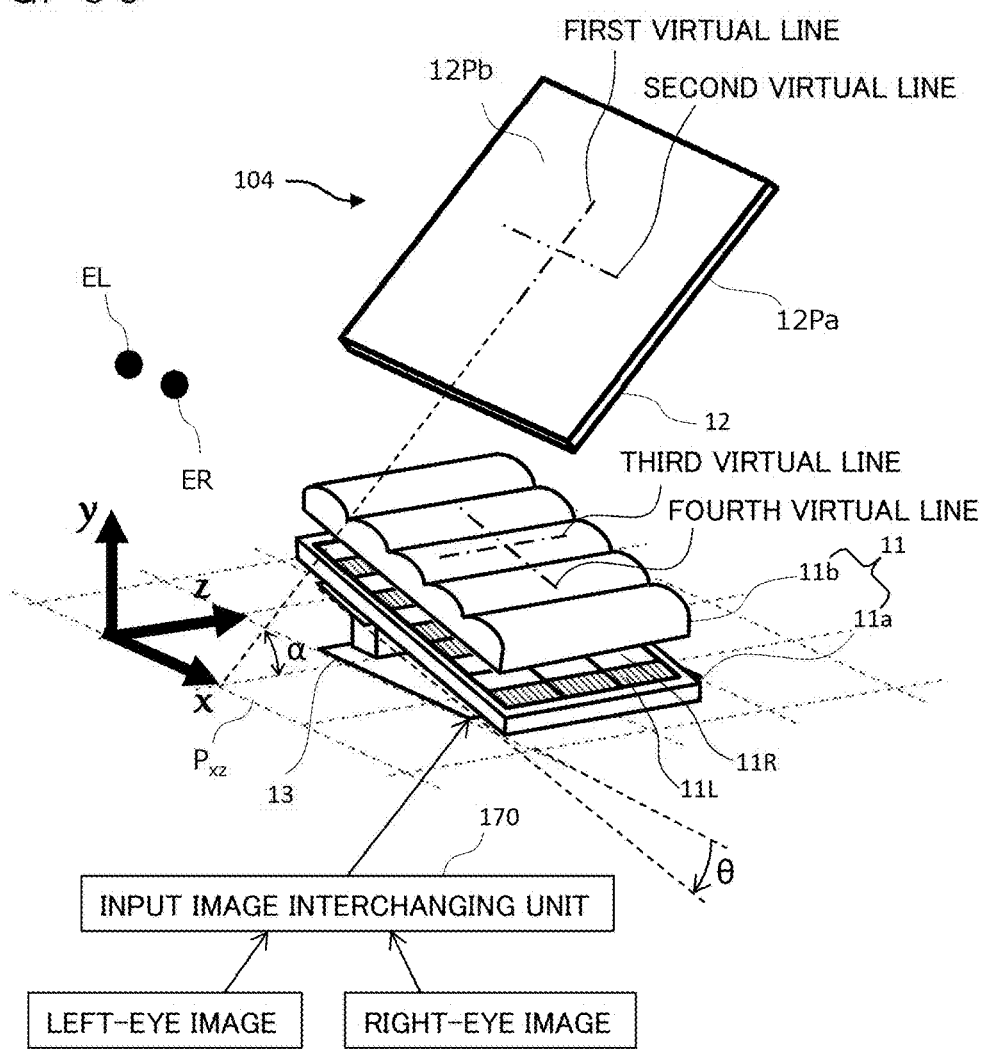
FIG. 69 is an explanatory diagram that illustrates the configuration of a stereoscopic display apparatus.

FIG. 69 is an explanatory diagram that illustrates the configuration of a stereoscopic display apparatus 104 according to this embodiment. The configuration of the stereoscopic display apparatus 104 is similar to that according to Embodiment 1 except for an input image interchanging unit 170. The input image interchanging unit 170 receives a left-eye image and a right-eye image as inputs, performs an image interchanging process, and outputs an image after the process to the naked-eye stereoscopic display 11.

FIG. 70 is a block diagram that illustrates an example of the configuration of the input image interchanging unit 170. As illustrated in FIG. 70, the input image interchanging unit 170 includes an area parameter storing unit 170a and an image interchanging unit 170b.

The area parameter storing unit 170a is a storage unit such as a memory and stores a plurality of area parameters referred by the image interchanging unit 170b. For example, inside a left-eye image and a right-eye image, the number of images to be interchanged with each other and the sizes of the images are calculated using the calculation method described above for each ΔZ, and a plurality thereof are stored as area parameters. The value of ΔZ may be given as a constant on the premise that observation is made from a predetermined position in advance or may be configured to be input by the observer from the outside in accordance with a predetermined position.

The image interchanging unit 170b may be configured as hardware acquired by combining a logic circuit and a storage unit such as a memory. Alternatively, it may be configured such that the image interchanging unit 170b is configured by a computer including a central processing unit (CPU) and memories such as a read only memory (ROM) and a random access memory (RAM), and the CPU expands a control program stored in the ROM into the RAM and executes the control program, whereby the control program functions as the image interchanging unit 170b.

FIG. 71 is a flowchart that illustrates the sequence of an image interchanging process performed by the input image interchanging unit 170. FIGS. 72A to 72C are schematic diagrams that illustrate an example of image generation performed by the input image interchanging unit 170. The image interchanging process using the input image interchanging unit 170 according to this embodiment will be described with reference to a flowchart illustrated in FIG. 71 and a conceptual diagram illustrated in FIGS. 72A to 72C.

First, the image interchanging unit 170b acquires area parameters from the area parameter storing unit 170a (Step S21). For example, as illustrated in FIG. 72A, values (a position and a size of an image corresponding to each area) that can be used for specifying areas LA and LB and RA and RB are acquired. Next, the image interchanging unit 170b acquires input images (Step S22). For example, a left-eye image and a right-eye image as illustrated in FIG. 72B are acquired.

Next, the image interchanging unit 170b extracts images specified by the area parameters from the input images (Step S23). Next, the image interchanging unit 170b interchanges the extracted images with each other (Step S24). For example, as illustrated in FIGS. 72B and 72C, an image of the left-eye image corresponding to the area LA and an image of the right-eye image corresponding to the area RA are interchanged with each other. Furthermore, by interchanging the image of the left-eye image corresponding to the area LB and the image of the right-eye image corresponding to the area RB with each other, an input image of left-eye pixels and an input image of right-eye pixels as illustrated in FIG. 72C are generated. Next, the image interchanging unit 170b outputs the generated images to the naked-eye stereoscopic display 11 (Step S25).

As above, the input image interchanging unit 170 (image processing unit), in two or more images projected by the naked-eye stereoscopic display 11 (projector), interchanges a left-eye image (one image) and a right-eye image (the other image) in a reverse viewing area (an arbitrary area is selected from areas arranged in the first direction) with each other and inputs resultant images to the naked-eye stereoscopic display 11.

In this embodiment, an area of reverse viewing is determined based on the light ray angle of primary light contributing to the formation of a stereoscopic view area of the naked-eye stereoscopic display 11 and a predetermined position at which the observer is located, images of a left-eye image and a right-eye image corresponding to the determined area are interchanged with each other, and left-eye pixels and right-eye pixels of the naked-eye stereoscopic display 11 are displayed.

In addition, similar to Embodiment 1, by arranging the naked-eye stereoscopic display 11 to be inclined by an angle θ in the x-axis direction, the left side and the right side of an image incident to the spatial image forming device 12 are interchanged, and reverse viewing in all the faces of the image viewed by the observer at a predetermined position can be suppressed.

Here, while the image interchanging process performed by the image interchanging unit 170b has been described using the areas LA and LB and RA and RB, the image interchanging process can be similarly applied also to a case where the number of areas of reverse viewing is increased. FIG. 73 are schematic diagrams that illustrate an example of image generation performed by an input image interchanging unit. For example, in a case where ΔZ=110 mm, as illustrated in FIG. 73A, in a case where the sizes and the positions of images that can be used for specifying areas LA and LB and LC and LD and areas RA and RB and RC and RD are stored as values in the area parameter storing unit 170a, as illustrated in FIG. 73B, by interchanging the images with each other in the left-eye image and the right-eye image that are input, an input image of left-eye pixels and an input image of right-eye pixels as illustrated in FIG. 73C can be generated.

Since the sizes of the areas to be interchanged with each other are maintained as parameters for each ΔZ, an observer, for example, by changing the settings, can view a spatially formed image in which reverse viewing is suppressed in all the faces from an arbitrary observation position.

In addition, while this embodiment, similar to Embodiment 1, has a configuration in which the naked-eye stereoscopic display 11 is inclined, similar to Embodiment 2, a configuration in which the spatial image forming device 12 is inclined may be employed as well. Also in a state in which the spatial image forming device 12 is inclined, as described in this embodiment, by performing the process using the input image interchanging unit 170 based on a distance between the naked-eye stereoscopic display 11 and the spatial image forming device 12, reverse viewing is suppressed in all the faces of an image viewed by the observer at a predetermined position.

In addition, similar to Embodiment 6, left and right images are interchanged by eliminating the inclination of the x-axis direction arranged in the naked-eye stereoscopic display. In such a case, a spatially formed image viewed by both the left and right eyes of the observer are the same as that illustrated in FIG. 67B. In other words, also in this case, as described in this embodiment, by using Equation (4) to Equation (7), areas to be interchanged with each other can be calculated. Based on a result of the calculation, as described in this embodiment, left and right images of the areas to be interchanged with each other may be interchanged.

As above, also in a case where the inclination of the x-axis direction arranged in the naked-eye stereoscopic display 11 is eliminated, similar to Embodiment 6, by interchanging left and right images in advance and interchanging images of areas to be interchanged with each other, reverse viewing can be suppressed in all the faces.

In addition, also in a case where the inclination of the x-axis direction arranged in the spatial image forming device is eliminated like a relation of Embodiment 6 for Embodiment 4, by interchanging left and right images in advance, as described in this embodiment, reverse viewing can be suppressed in all the faces by interchanging images of the areas to be interchanged with other.

Embodiment 8

In Embodiment 7, while images are interchanged by acquiring areas to be interchanged with each other based on a predetermined observation position, the position of the observer may be dynamically acquired. In this embodiment, the position of an observer is dynamically acquired, areas of reverse viewing are acquired based on the acquired position, and images of a left-eye image and a right-eye image corresponding to the areas are interchanged with each other.

FIGS. 74A to 74C are explanatory diagrams that illustrate an example of images viewed by an observer. A left-eye image and a right-eye image illustrated in FIG. 74A are input to the stereoscopic display apparatus 102 (see FIG. 62) described in Embodiment 5.

For example, in the case that the distance ΔZ between the spatially formed image and the observer Vi is 350 mm, in images viewed by the left eye and the right eye of the observer, as illustrated in FIG. 74B, areas in which a left-eye image and a right-eye image are interchanged are present. The interchanged area becomes reverse viewing. Here, in a case where the observer Vi moves, and the distance between the spatial image forming device 12 and the observer Vi is changed to 250 mm, in images viewed by the left eye and the right eye of the observer, as illustrated in FIG. 74C, compared to the case illustrated in FIG. 74B, areas in which the left-eye image and the right-eye image are interchanged are increased. In other words, areas of reverse viewing are increased.

Thus, in this embodiment, based on the distance between the spatial image forming device 12 and the observer, areas in which the left-eye image and the right-eye image are interchanged with each other are dynamically specified, and images of portions corresponding to the dynamically-specified areas are interchanged, whereby the appearance of a reverse viewing area is further suppressed. The areas to be interchanged with each other, as described in Embodiment 7, are determined based on the light ray angle of primary light contributing to the formation of a stereoscopic view area of the naked-eye stereoscopic display 11 and the position of the observer.

Figure 75:
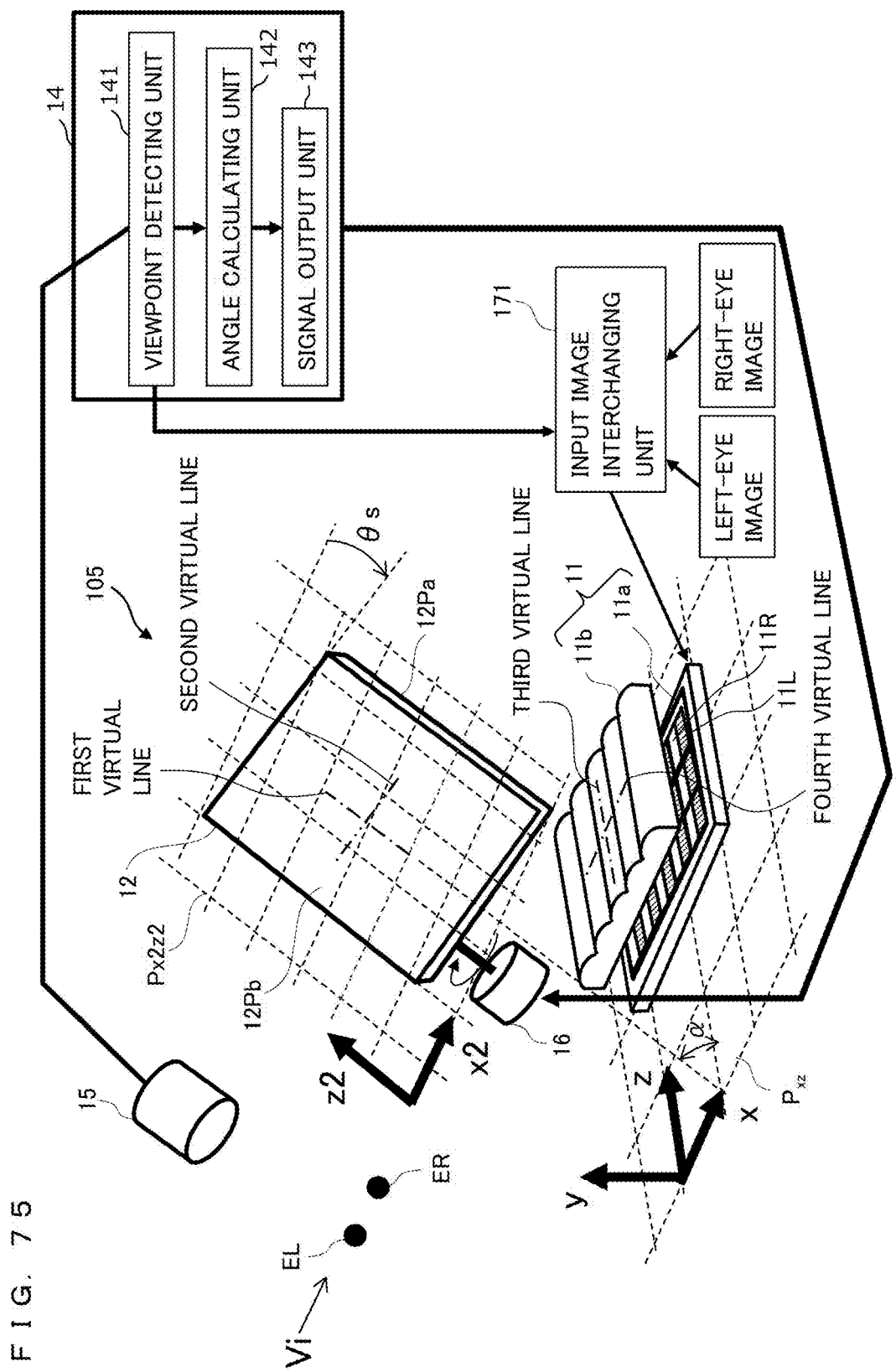
FIG. 75 is an explanatory diagram that illustrates the configuration of a stereoscopic display apparatus.

FIG. 75 is an explanatory diagram that illustrates the configuration of a stereoscopic display apparatus 105 according to this embodiment. The configuration of the stereoscopic display apparatus 105 is similar to that according to Embodiment 5 except for an input image interchanging unit 171. The input image interchanging unit 171 receives a left-eye image and a right-eye image as inputs, performs an image interchanging process based on the positions of both eyes of the observer Vi acquired from the viewpoint detecting unit 141, and outputs an image after the process to the naked-eye stereoscopic display 11.

FIG. 76 is a block diagram that illustrates an example of the configuration of the input image interchanging unit 171. As illustrate in FIG. 76, the input image interchanging unit 171 is configured by an area parameter storing unit 171a, an image interchanging unit 171b, a distance calculating unit 171c, and an area calculating unit 171d.

The area parameter storing unit 171a is a storage unit such as a memory and stores a plurality of area parameters referred by the area calculating unit 171d. For example, light ray angle θ L and spatial imaging width WS contributing to the formation of area in which primary light are dominant acquired from the luminance profile of the naked-eye stereoscopic display (see FIG. 34) are stored as area parameters.

The image interchanging unit 171b, the distance calculating unit 171c, and the area calculating unit 171d may be configured as hardware acquired by combining a logic circuit and a storage unit such as a memory. Alternatively, it may be configured such that such the image interchanging unit 170b is configured by a computer including a central processing unit (CPU) and memories such as a read only memory (ROM) and a random access memory (RAM), and the CPU expands a control program stored in the ROM into the RAM and executes the control program, whereby the control program functions as the image interchanging unit 170b.

FIG. 77 is a flowchart that illustrates the sequence of an image interchanging process performed by the input image interchanging unit 171. FIGS. 78A to 78C are schematic diagrams that illustrate an example of image generation performed by the input image interchanging unit 171. The image interchanging process using the input image interchanging unit 171 according to this embodiment will be described with reference to a flowchart illustrated in FIG. 77 and a conceptual diagram illustrated in FIGS. 78A to 78C. First, the distance calculating unit 171c acquires the positions of both eyes of an observer Vi from the viewpoint detecting unit 141 of the control unit 14 (Step S31). Next, the distance calculating unit 171c acquires a distance ΔZ between the reference point P and the observer Vi from the acquired positions of both the eyes of the observer Vi (Step S32). The area calculating unit 171d acquires area parameters stored in the area parameter storing unit 171a (Step S33).

Next, the area calculating unit 171d acquires areas to be interchanged with each other by using the distance ΔZ acquired by the distance calculating unit 171c based on the acquired area parameters (Step S34). The method of acquiring areas to be interchanged with each other using the distance ΔZ is as described in Embodiment 7. For example, in a case where the distance ΔZ is 400 mm, areas LA and LB and areas RA and RB as illustrated in FIG. 78A are acquired.

The image interchanging unit 171b acquires input images (a left-eye image and a right-eye image) (Step S35). For example, the left-eye image and the right-eye image as illustrated in FIG. 78B are acquired. Next, the image interchanging unit 171b extracts images corresponding to the areas acquired by the area calculating unit 171d from the input images (Step S36). Next, the image interchanging unit 171b interchanges the extracted images with each other (Step S37). For example, an image of the left-eye image corresponding to the area LA and an image of the right-eye image corresponding to the area RA as illustrated in FIGS. 78B and 78C are interchanged with each other, and an image of the left-eye image corresponding to the area LB and an image of the right-eye image corresponding to the area RB are interchanged with each other, whereby an input image of left-eye pixels and an input image of right-eye pixels as illustrated in FIG. 78C are generated. Next, the image interchanging unit 171b outputs the generated images to the naked-eye stereoscopic display 11 (Step S38).

As above, the input image interchanging unit 171 (image processing unit), in two or more images projected by the naked-eye stereoscopic display 11 (projector), dynamically interchanges a left-eye image (one image) and a right-eye image (the other image) in a reverse viewing area (an arbitrary area is selected from areas arranged in the first direction) with each other in accordance with the position of the observer Vi and inputs resultant images to the naked-eye stereoscopic display 11.

Figure 79:
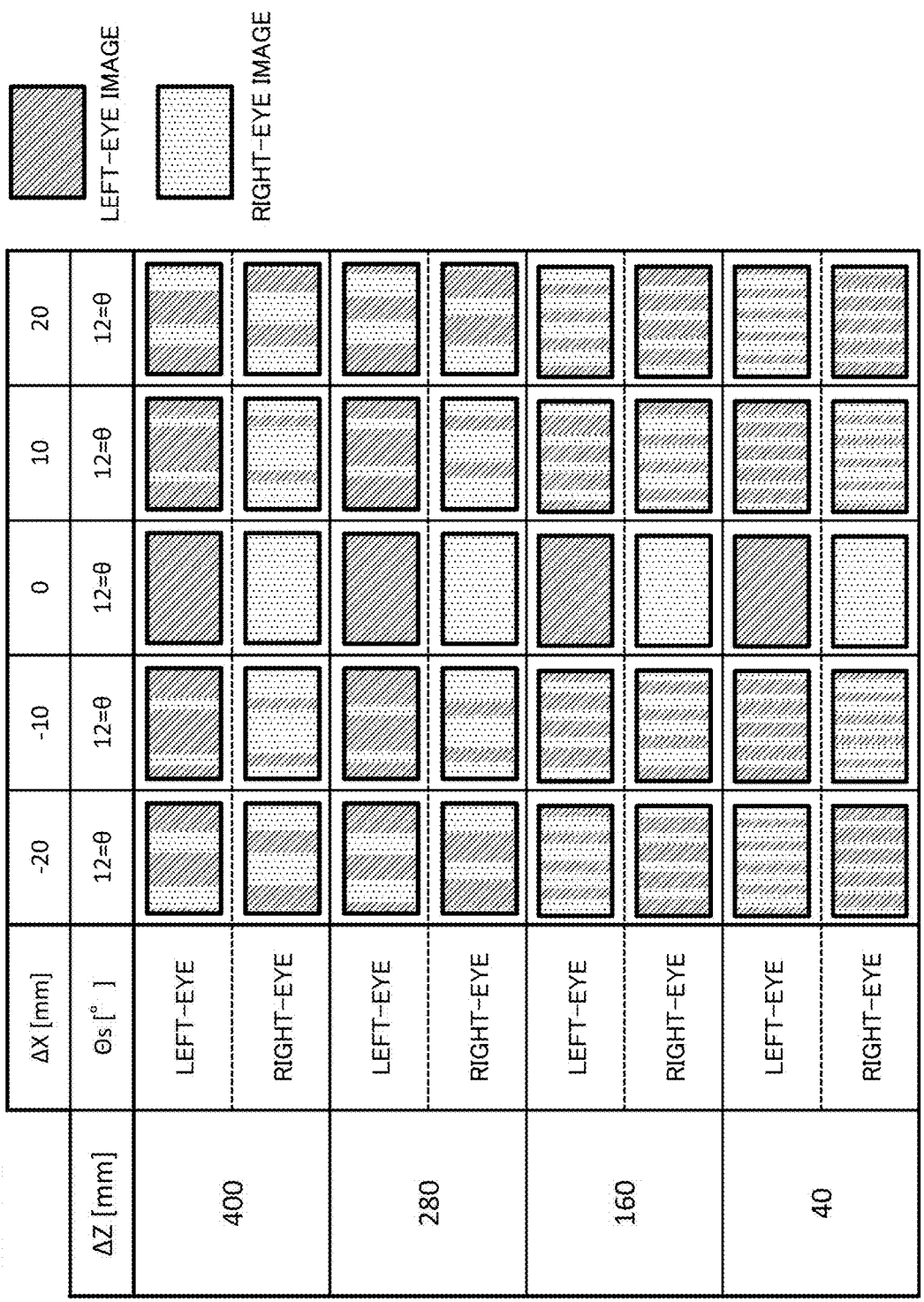
FIG. 79 is an explanatory diagram that illustrates a relation between the position of an observer and an image visually recognized by the observer.

FIGS. 79-80 is an explanatory diagram that illustrates a relation between the position of an observer and an image visually recognized by the observer, In this embodiment, an area of reverse viewing is determined based on the light ray angle of primary light contributing to the formation of a stereoscopic view area of the naked-eye stereoscopic display 11 and the position of the observer that is dynamically acquired, images of a left-eye image and a right-eye image corresponding to the determined area are interchanged with each other, and left-eye pixels and right-eye pixels of the naked-eye stereoscopic display 11 are displayed. In such a case, as illustrated in FIG. 79, when an image process is performed based on the distance ΔZ, in a case where ΔX=0, reverse viewing can be suppressed in all the faces of an image viewed by the observer, in a case where the observer moves from ΔX=0, reverse viewing areas appear. For this reason, similar to Embodiment 5, by acquiring ΔX from the position of the observer Vi and changing the inclination angle θs of the spatial image forming device 12 in accordance with ΔX, as illustrated in FIG. 80, also in a case where the observer is not present at ΔX=0, reverse viewing can be suppressed in all the faces of an image viewed by the observer Vi.

In addition, similar to Embodiment 5, while this embodiment has a configuration in which the spatial image forming device 12 is dynamically inclined according to the position of the observer, the configuration similar to that according to Embodiment 3 may be employed as well. Also in a case where the naked-eye stereoscopic display 11 is dynamically inclined according to the position of the observer Vi, as described in this embodiment, by performed the process using the input image interchanging unit, reverse viewing is suppressed in all the faces of an image viewed by the observer Vi.

In addition, similar to Embodiment 6, left and right images are interchanged by eliminating the inclination of the x-axis direction arranged in the spatial image forming device 12. In such a case, a spatially formed image viewed by both left and right eyes of the observer is as illustrated in FIG. 74B. Accordingly, also in a case where the inclination of the x-axis direction arranged in the spatial image forming device is eliminated, similar to Embodiment 6, by interchanging the left and right images in advance, as described in this embodiment, reverse viewing can be suppressed in all the faces by interchanging images of the areas to be interchanged with each other.

Furthermore, similar to the relation of Embodiment 4 for Embodiment 6, also in a case where the inclination of the x-axis direction arranged in the naked-eye stereoscopic display 11 is eliminated, by interchanging left and right images in advance as described in the present embodiment, reverse viewing can be suppressed in all the faces by interchanging images of the areas to be interchanged with each other.

The technical aspects (components) described in the embodiments may be combined, and, by combining such technical aspects, a new technical aspect can be formed.

The embodiments described here are examples in all the points and should not be considered for the purpose of limitations. The scope of the present invention is not the meaning described above but is intended to include a scope that is disclosed in the claims and is equivalent to the claims and all the changes within the scope.

What is claimed is:

1. A stereoscopic display apparatus comprising:
a projector of a planar shape that divides light rays into two or more directions and projects two or more images by using the divided light;
an optical device of a planar shape that outputs incident light incident from a first face from a second face; and
an image processing unit that interchanges two or more images projected by the projector with each other in an arbitrary area and inputs resultant images to the projector,
wherein the optical device outputs incident light incident from a first point on a projection surface of the projector to a second point having plane symmetry with respect to a plane of the optical device as a reference, and projects in the air a floating image corresponding to two images from the projector, and
wherein the image processing unit produces two or more images including a portion without parallax, the portion corresponding to an end portion of the floating image, and inputs the two or more images including the portion without parallax to the projector.

2. The stereoscopic display apparatus according to claim 1, wherein the images without parallax produced by the image processing unit are single-color images.

3. The stereoscopic display apparatus according to claim 2, wherein the single-color images are black images.

4. The stereoscopic display apparatus according to claim 1, further comprising a position detecting unit that detects two viewpoint positions of an observer,
wherein the position detection unit calculates the arbitrary area based on a distance between the second point and an intermediate point for the two viewpoint positions of the observer.

* * * * *